United States Patent
Kameyama et al.

(10) Patent No.: US 10,961,345 B2
(45) Date of Patent: *Mar. 30, 2021

(54) CURABLE COMPOSITION AND CURED PRODUCT OBTAINED BY CURING THE SAME

(71) Applicant: ENEOS CORPORATION, Tokyo (JP)

(72) Inventors: Atsushi Kameyama, Tokyo (JP); Ryuichi Ueno, Tokyo (JP); Hisashi Sone, Tokyo (JP); Shohei Takata, Tokyo (JP); Takashi Seki, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 186 days.

This patent is subject to a terminal disclaimer.

(21) Appl. No.: 16/086,101

(22) PCT Filed: Mar. 22, 2017

(86) PCT No.: PCT/JP2017/011465
§ 371 (c)(1),
(2) Date: Sep. 18, 2018

(87) PCT Pub. No.: WO2017/164238
PCT Pub. Date: Sep. 28, 2017

(65) Prior Publication Data
US 2020/0299458 A1    Sep. 24, 2020

(30) Foreign Application Priority Data

| Mar. 23, 2016 | (JP) | JP2016-059069 |
| Mar. 23, 2016 | (JP) | JP2016-059079 |
| Mar. 29, 2016 | (JP) | JP2016-066376 |
| Mar. 29, 2016 | (JP) | JP2016-066399 |
| May 30, 2016 | (JP) | JP2016-107736 |
| Sep. 27, 2016 | (JP) | JP2016-188872 |
| Sep. 27, 2016 | (JP) | JP2016-188873 |
| Sep. 27, 2016 | (JP) | JP2016-188874 |
| Sep. 27, 2016 | (JP) | JP2016-188876 |
| Sep. 27, 2016 | (JP) | JP2016-188879 |

(51) Int. Cl.
C08F 2/46      (2006.01)
C08F 2/50      (2006.01)
C08G 61/04     (2006.01)
C08G 65/26     (2006.01)

(52) U.S. Cl.
CPC ................ C08G 65/2603 (2013.01)

(58) Field of Classification Search
CPC ... C08F 2/46; C08F 2/50; C08G 61/04; C07D 493/08; C08L 87/00; C08K 5/1515
USPC ............. 522/27, 7, 6, 189, 184, 1, 71; 520/1
See application file for complete search history.

(56) References Cited

U.S. PATENT DOCUMENTS

2019/0161494 A1*    5/2019   Takata ............... C08L 87/00

FOREIGN PATENT DOCUMENTS

| GB | 787293 | 12/1957 |
| JP | 49-126658 | 12/1974 |
| JP | 2004-99445 | 4/2004 |
| JP | 2004-143362 | 5/2004 |
| JP | 2007-079481 | * 3/2007 |
| JP | 2007-79481 | 3/2007 |
| JP | 2008-31424 | 2/2008 |
| JP | 2011-132310 | 7/2011 |
| JP | 2012-136577 | 7/2012 |
| KR | 10-2002-0027381 | 4/2002 |
| TW | 200725180 | 7/2007 |
| WO | 2012/077546 | 6/2012 |

OTHER PUBLICATIONS

Kusaka et al, JP 2007-079481 Machine Translation, Mar. 29, 2017 (Year: 2017).*

(Continued)

*Primary Examiner* — Jessica Whiteley
(74) *Attorney, Agent, or Firm* — Wenderoth, Lind & Ponack, L.L.P.

(57) ABSTRACT

The present invention discloses a curable composition comprising: an epoxy compound represented by the following Formula (1); and one selected from the group consisting of: a thermal cationic polymerization initiator, an acid anhydride-based curing agent and a curing accelerator, and a photo-cationic polymerization initiator as well as the cured product therefrom. The above described curable composition is useful in that it allows for the production of a cured product having a high heat resistance.

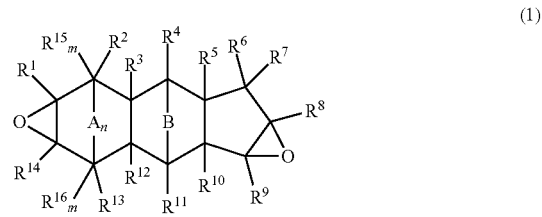

(1)

(In the Formula (1), A represents $CR^{17}R^{18}$; B represents $CR^{19}R^{20}$; $R^1$ to $R^{20}$ each independently represents a substituent selected from the group consisting of a hydrogen atom, an alkyl group and an alkoxy group; and n represents 0 or 1, with the proviso that when n is 0, m represents 1, and when n is 1, m represents 0.)

16 Claims, 1 Drawing Sheet

(56) References Cited

OTHER PUBLICATIONS

International Search Report dated Jun. 6, 2017 in International Application No. PCT/JP2017/011465.
Extended European Search Report dated Sep. 26, 2019 in corresponding European Patent Application No. 17770278.4.
International Preliminary Report on Patentability dated Oct. 4, 2018 in International Application No. PCT/JP2017/011465.
Notice of Review Opinion dated Oct. 16, 2020 in Taiwanese Patent Application No. 106109810, with Machine Translation.
Notice of Opinion on the Second Examination dated Oct. 27, 2020 in Chinese Patent Application No. 201780014231.X, with Machine Translation.
Notification of Reason for Refusal dated Dec. 2, 2020 in Korean Patent Application No. 10-2018-7024750, with Machine Translation.
Notice of Reasons for Refusal dated Dec. 11, 2020 in Japanese Patent Application No. 2018-521766, with Machine Translation.

* cited by examiner

CURABLE COMPOSITION AND CURED PRODUCT OBTAINED BY CURING THE SAME

CROSS-REFERENCE TO RELATED APPLICATIONS

The present patent application is based upon and claims the benefit of priority from previously filed Japanese Patent Application No. 2016-59069 (filed on Mar. 23, 2016), Japanese Patent Application No. 2016-59079 (filed on Mar. 23, 2016), Japanese Patent Application No. 2016-66376 (filed on Mar. 29, 2016), Japanese Patent Application No. 2016-66399 (filed on Mar. 29, 2016), Japanese Patent Application No. 2016-107736 (flied on May 30, 2016), Japanese Patent Application No. 2016-188872 (filed on Sep. 27, 2016), Japanese Patent Application No. 2016-188873 (filed on Sep. 27, 2016), Japanese Patent Application No. 2016-188874 (filed on Sep. 27, 2016), Japanese Patent Application No. 2016-188876 (filed on Sep. 27, 2016), and Japanese Patent Application No. 2016-188879 (flied on Sep. 27, 2016). The entire disclosures of the above described patent applications are incorporated herein by reference.

FIELD OF THE INVENTION

The present invention relates to a curable composition, and a cured product obtained by curing the same.

BACKGROUND OF THE INVENTION

Curable compositions containing epoxy compounds are used as materials for surface protective films for semiconductor devices and organic thin film elements (such as organic electro-luminescent elements and organic thin film solar cell elements), interlayer insulators, protective insulating films for printed alignment substrates, and fiber-reinforced composite materials and the like. Among these epoxy compounds, epoxy compounds containing an aromatic ring have been used as compounds which allow for the production of cured products having an excellent heat resistance and the like.

However, compounds containing an aromatic ring generally have a high dielectric constant due to having a high electron density, and accordingly, in the applications as described above, there has been a problem for use in the field of electronic materials. Further, these compounds are also associated with a problem that coloration and the like thereof lead to a reduction in the light transmittance of the resulting resin. In view of the above, alicyclic diamine compounds having no aromatic ring are drawing attention, in recent years. In addition, curable compositions for use in the applications as described above are required to be able to produce cured products having a high moisture resistance and heat resistance.

Among epoxy compounds, epoxy compounds having an alicyclic skeleton are known as compounds which allow for the production of cured products having an excellent heat resistance and the like. For example, Patent Document 1 discloses an epoxy compound which has an alicyclic skeleton with a specific structure and which allows for the production of a resin having an excellent heat resistance and the like.

Further, among these epoxy compounds, epoxy compounds having two or more alicyclic skeletons within the molecule are known as compounds which allow for the production of cured products having an excellent heat resistance, transparency and the like. For example, Patent Document 2 discloses a curable composition containing dicyclopentadiene diepoxide or tricyclopentadiene diepoxide. In addition, Patent Document 3 discloses a curable composition containing a diepoxybicyclohexyl compound. However, the epoxy compounds having alicyclic skeletons which are proposed in Patent Documents 2 and 3 have room for a further improvement, from the viewpoint of improving the heat resistance of the resulting cured products and decreasing the weight reduction upon curing.

PRIOR ART DOCUMENTS

Patent Documents

Patent Document 1: JP S49-126658 A
Patent Document 2: JP 2004-143362 A
Patent Document 3: JP 2008-31424 A

SUMMARY OF THE INVENTION

Problems to be Solved by the Invention

The present inventors have found out that, by incorporating into a curable composition: an epoxy compound represented by the following Formula (1); and one selected from the group consisting of: a thermal cationic polymerization initiator, an acid anhydride-based curing agent and a curing accelerator, and a photo-cationic polymerization initiator; it is possible to dramatically improve the heat resistance of a cured product obtained from the curable composition. The present invention has been made based on the above finding, and an object of the invention is to provide a curable composition which allows for the production of a cured product having an excellent heat resistance.

Further, the present inventors have found out that, by using an epoxy compound represented by the following Formula (1) and a thermal cationic polymerization initiator in combination, in a curable composition, it is possible to dramatically improve the heat resistance of a cured product obtained therefrom, as well as to decrease a reduction in weight upon curing the curable composition to an extremely low level. The present invention has been made based on the above finding, and it is another object of the present invention to provide a curable composition which has an excellent heat resistance, and in which the reduction in weight upon curing is reduced.

Still further, the present inventors have found out that, by incorporating into a curable composition an epoxy compound represented by the following Formula (1), and an acid anhydride-based curing agent and a curing accelerator, in combination, it is possible to dramatically improve the moisture resistance and the heat resistance of a cured product obtained therefrom. The present invention has been made based on the above finding, and it is still another object of the present invention to provide a curable composition which allows for the production of a cured product having an excellent moisture resistance and heat resistance.

Means for Solving the Problems

In other words, the present invention encompasses the following inventions.
(1) A curable composition comprising:
an epoxy compound represented by the following Formula (1):

[Chem. 1]

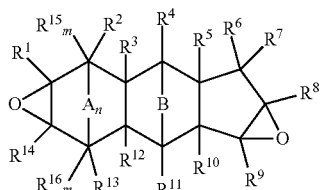

(1)

(wherein
A represents $CR^{17}R^{18}$;
B represents $CR^{19}R^{20}$;
$R^1$ to $R^{20}$ each independently represents a substituent selected from the group consisting of a hydrogen atom, an alkyl group and an alkoxy group; and
n represents 0 or 1,
with the proviso that when n is 0, m represents 1, and when n is 1, m represents 0); and
  one selected from the group consisting of: a thermal cationic polymerization initiator, an acid anhydride-based curing agent and a curing accelerator, and a photo-cationic polymerization initiator.
(2) The curable composition according to (1), further comprising one kind, or two or more kinds selected from the group consisting of an epoxy compound other than the epoxy compound represented by the Formula (1), an oxetane compound and a vinyl ether.
(3) The curable composition according to (1) or (2), wherein the thermal cationic polymerization initiator is selected from the group consisting of aromatic sulfonium salt-based thermal cationic polymerization initiators, aromatic iodonium salt-based thermal cationic polymerization initiators and aluminum complex-based thermal cationic polymerization initiators.
(4) The curable composition according to (3), wherein the thermal cationic polymerization initiator is an aromatic sulfonium salt-based thermal cationic polymerization initiator.
(5) The curable composition according to any one of (2) to (4), wherein, in cases where the curable composition does not include any of the epoxy compound other than the epoxy compound represented by the Formula (1), the oxetane compound or the vinyl ether, the content of the thermal cationic polymerization initiator is from 0.1 to 15 parts by mass with respect to 100 parts by mass of the epoxy compound represented by the Formula (1) contained in the curable composition; and in cases where the curable composition includes one kind, or two or more kinds selected from the group consisting of the epoxy compound other than the epoxy compound represented by the Formula (1), the oxetane compound and the vinyl ether, the content of the thermal cationic polymerization initiator is from 0.1 to 15 parts by mass with respect to 100 parts by mass of the total amount of the epoxy compound represented by the Formula (1), the epoxy compound other than the epoxy compound represented by the Formula (1), the oxetane compound and the vinyl ether.
(6) The curable composition according to (2), wherein, in cases where the curable composition does not include the epoxy compound other than the epoxy compound represented by the Formula (1), the content of the acid anhydride-based curing agent is from 0.6 to 1.2 equivalent with respect to one equivalent of the epoxy compound represented by the Formula (1) contained in the curable composition; and in cases where the curable composition includes the epoxy compound other than the epoxy compound represented by the Formula (1), the content of the acid anhydride-based curing agent is from 0.6 to 1.2 equivalent with respect to one equivalent of a mixture of epoxy compounds composed of the epoxy compound represented by the Formula (1) and the epoxy compound other than the epoxy compound represented by the Formula (1).
(7) The curable composition according to (2) or (6), wherein, in cases where the curable composition does not include the epoxy compound other than the epoxy compound represented by the Formula (1), the content of the curing accelerator is from 0.1 to 10 parts by mass with respect to 100 parts by mass of the epoxy compound represented by the Formula (1) contained in the curable composition; and in cases where the curable composition includes the epoxy compound other than the epoxy compound represented by the Formula (1), the content of the curing accelerator is from 0.1 to 10 parts by mass with respect to 100 parts by mass of the total amount of the epoxy compound represented by the Formula (1) and the epoxy compound other than the epoxy compound represented by the Formula (1).
(8) The curable composition according to (1), (6) or (7), wherein the curing accelerator is an imidazole-based curing accelerator.
(9) The curable composition according to any one of (3) to (8), wherein the content of the epoxy compound represented by the Formula (1) is from 10 to 99% by mass.
(10) The curable composition according to (1) or (2), wherein the photo-cationic polymerization initiator is an aromatic sulfonium salt-based photo-cationic polymerization initiator.
(11) The curable composition according to (2) or (10), wherein, in cases where the curable composition does not include any of the epoxy compound other than the epoxy compound represented by the Formula (1), the oxetane compound or the vinyl ether, the content of the photo-cationic polymerization initiator is from 0.1 to 20 parts by mass with respect to 100 parts by mass of the epoxy compound represented by the Formula (1) contained in the curable composition; and in cases where the curable composition includes one kind, or two or more kinds selected from the group consisting of the epoxy compound other than the epoxy compound represented by the Formula (1), the oxetane compound and the vinyl ether, the content of the photo-cationic polymerization initiator is from 0.1 to 20 parts by mass with respect to 100 parts by mass of the total amount of the epoxy compound represented by the Formula (1), the epoxy compound other than the epoxy compound represented by the Formula (1), the oxetane compound and the vinyl ether.
(12) The curable composition according to (10) or (11), wherein the content of the epoxy compound represented by the Formula (1) is from 1 to 50% by mass.
(13) The curable composition according to any one of (2) to (12), wherein the epoxy compound other than the epoxy compound represented by the Formula (1) is selected from the group consisting of glycidyl ether-type epoxides, glycidyl ester-type epoxides and alicyclic epoxides.
(14) A method of producing a cured product, the method comprising the step of curing the curable composition according to any one of (1) to (13).
(15) A cured product from the curable composition according to any one of (1) to (13).

Effect of the Invention

The present invention provides a curable composition which allows for the production of a cured product having a high heat resistance.

Further, the present invention provides a curable composition capable of producing a cured product having a high heat resistance. According to the curable composition of the present invention, a reduction in weight which occurs upon curing the curable composition can be decreased to an extremely low level.

Still further, the present invention provides a curable composition which allows for obtaining a cured product with a dramatically improved heat resistance.

Yet still further, the present invention provides a curable composition which allows for the production of a cured product having a high moisture resistance and heat resistance.

DETAILED DESCRIPTION OF THE INVENTION

1. Definition

Figure 1:
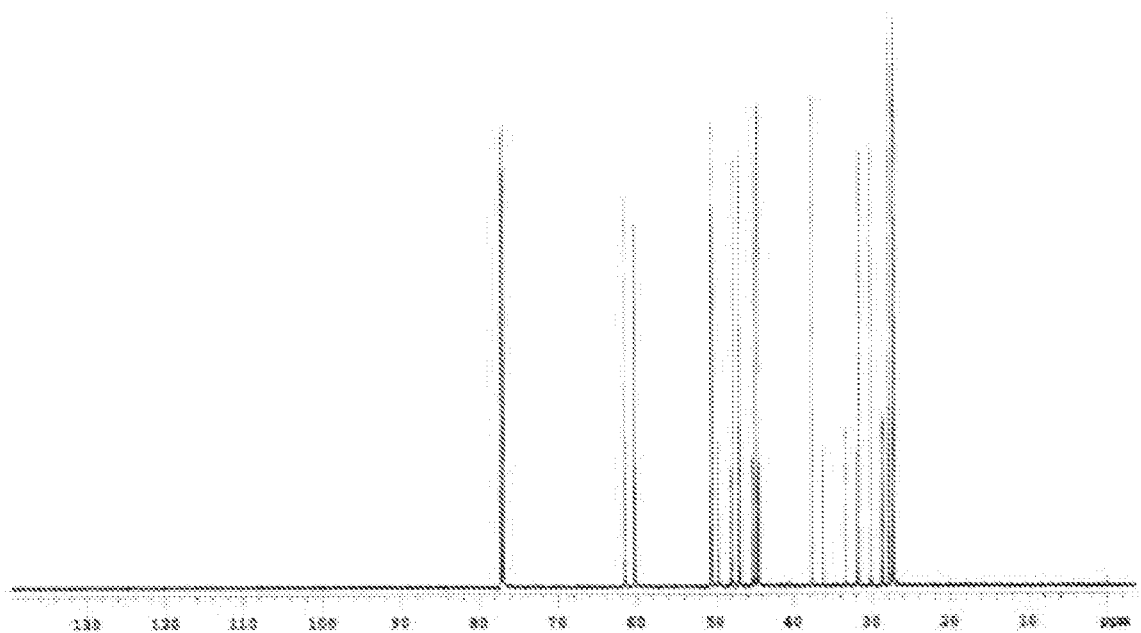
FIG. 1 shows a $^{13}$C-NMR chart of an epoxy compound (A-1) produced in Preparation Example 1.

In the present specification, the terms "part(s)", "%" and the like used to describe the composition are represented on a mass basis, unless otherwise specified.

In the present specification, the term "epoxy equivalent" is defined by the mass of an epoxy compound containing one equivalent of epoxy groups. In the case of a mixture composed of m kinds (wherein m is an integer of 2 or more) of epoxy compounds, the epoxy equivalent of the mixture is represented by the following equation:

$$\text{Epoxy equivalent of mixture of epoxy compounds} = \frac{\sum_{n=1}^{m} \text{Mass of epoxy compound } n}{\sum_{n=1}^{m} \frac{\text{Mass of epoxy compound } n}{\text{Epoxy equivalent of epoxy compound } n}} \quad [\text{Equation 1}]$$

The epoxy equivalent of an epoxy compound can be measured in accordance with JIS K7236.

2. Curable Composition

The curable composition according to the present invention is characterized in that it comprises:
an epoxy compound represented by the following Formula (1); and
one selected from the group consisting of: a thermal cationic polymerization initiator, an acid anhydride-based curing agent and a curing accelerator, and a photo-cationic polymerization initiator.

[Chem. 2]

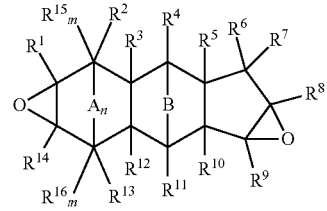

(1)

(In the Formula (1),
A represents $CR^{15}R^{18}$;
B represents $CR^{19}R^{20}$;
$R^1$ to $R^{20}$ each independently represents a substituent selected from the group consisting of a hydrogen atom, an alkyl group and an alkoxy group; and
n represents 0 or 1,
with the proviso that when n is 0, m represents 1, and when n is 1, m represents 0.)

In a curable composition obtained by using dicyclopentadiene diepoxide, which is an epoxy compound having a similar alicyclic skeleton, in combination with a thermal cationic polymerization initiator, a large reduction in weight occurs upon curing, making the curable composition difficult to handle. In contrast, when the epoxy compound represented by the above described Formula (1) is used in combination with a thermal cationic polymerization initiator, a reduction in weight which occurs upon curing the resulting curable composition can be decreased to an extremely low level.

Further, dicyclopentadiene diepoxide, which is an epoxy compound having a similar alicyclic skeleton, has a low curability, even if used in combination with an acid anhydride-based curing agent and a curing accelerator, and thus it is difficult to obtain a cured product from the resulting curable composition. In contrast, when the epoxy compound represented by the above described Formula (1) is used in combination with an acid anhydride-based curing agent and a curing accelerator, it is possible to easily produce a cured product from the resulting curable composition, as well as to obtain a cured product with a dramatically improved heat resistance.

The combined use of the epoxy compound represented by the above described Formula (1) with a thermal cationic polymerization initiator, in a curable composition, enables to dramatically improve the heat resistance of a cured product obtained by curing the resulting curable composition.

Further, the combined use of the epoxy compound represented by the above described Formula (1), with an acid anhydride-based curing agent and a curing accelerator, in a curable composition, enables to dramatically improve the moisture resistance and the heat resistance of a cured product obtained by curing the resulting curable composition.

In a cured product obtained by curing a curable composition containing dicyclopentadiene diepoxide, which is an epoxy compound having a similar alicyclic skeleton, and a photo-cationic polymerization initiator, there is room for improvement in the heat resistance. In contrast, when the epoxy compound represented by the above described Formula (1) and a photo-cationic polymerization initiator are incorporated into a curable composition in combination, the heat resistance of the resulting cured product can be dramatically improved. Further, the combined use thereof allows for improving the transparency of the resulting cured product. Still further, since the time required for curing can be markedly reduced as compared to the case of using a thermal cationic polymerization initiator, the productivity can also be improved.

(1) Epoxy Compound

The epoxy compound to be contained in the curable composition according to the present invention is preferably one wherein, in the above described Formula (1), A and B each independently represents $CR^{15}R^{16}$; $R^1$ to $R^{16}$ each independently represents a substituent selected from the group consisting of a hydrogen atom, an alkyl group and an alkoxy group; n represents 0 or 1, and in cases where n is 0, a cross-linked structure is not formed; and the alkyl group preferably has from 1 to 10 carbon atoms, and more preferably 1 to 5 carbon atoms. Further, the alkyl group may be a linear alkyl group or a branched alkyl group. The alkoxy group preferably has from 1 to 10 carbon atoms, and more preferably from 1 to 5 carbon atoms. It is particularly preferred that $R^1$ to $R^{16}$ be all hydrogen atoms. Further, the curable composition according to the present invention may contain two or more epoxy compounds represented by the above described Formula (1).

In the case of a curable composition containing the epoxy compound represented by the Formula (1) and a thermal cationic polymerization initiator, or a curable composition containing the epoxy compound represented by the Formula (1), an acid anhydride-based curing agent and a curing accelerator, the epoxy compound represented by the Formula (1) contained in the curable composition preferably has an epoxy equivalent of from 85 to 600 g/eq, more preferably from 90 to 600 g/eq, still more preferably from 85 to 300 g/eq, still more preferably from 90 to 300 g/eq, and still more preferably from 90 to 200 g/eq. The curable composition according to the present invention may further contain any of other compounds to be described later. However, the content of the epoxy compound represented by the Formula (1) contained in the curable composition according to the present invention is preferably from 10 to 99% by mass, more preferably from 10 to 80% by mass, still more preferably from 15 to 99% by mass, and still more preferably from 15 to 60% by mass, from the viewpoint of preventing a reduction in the heat resistance of the resulting cured product and/or a reduction in weight upon curing.

In the case of a curable composition containing the epoxy compound represented by the Formula (1) and a photo-cationic polymerization initiator, the epoxy equivalent of the epoxy compound represented by the Formula (1) contained in the curable composition is preferably from 85 to 600 g/eq, more preferably from 85 to 300 g/eq, and still more preferably from 85 to 200 g/eq. The curable composition according to the present invention may further contain any of other compounds to be described later. However, the content of the epoxy compound represented by the Formula (1) contained in the curable composition according to the present invention is preferably from 1 to 50% by mass, and more preferably from 5 to 40% by mass, from the viewpoint of improving the heat resistance of the resulting cured product. In one embodiment, it is preferred that the curable composition according to the present invention further contain an epoxy compound other than the epoxy compound represented by the Formula (1) and/or an oxetane compound.

(2) Method of Producing Epoxy Compound

An epoxy compound satisfying the above described Formula (1) to be contained in the curable composition according to the present invention can be synthesized by allowing a diolefin compound represented by the following Formula (2) with a peracid, such as hydrogen peroxide, peracetic acid or perbenzoic acid.

[Chem. 3]

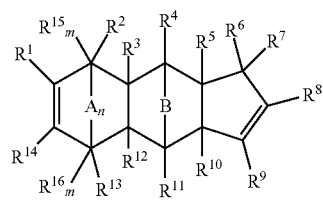

(2)

In one embodiment, an epoxy compound represented by the following Formula (4) can be obtained as the compound satisfying the above described Formula (1), by allowing a diolefin compound represented by the following Formula (3) as the diolefin compound satisfying the above described Formula (2) to react with meta-chloroperoxybenzoic acid. The compound represented by the following Formula (3) can be synthesized by the Diels-Alder reaction of butadiene and dicyclopentadiene.

[Chem. 4]

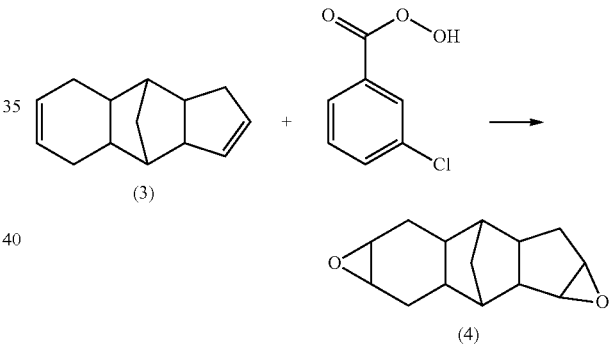

Further, in one embodiment, an epoxy compound represented by the following Formula (6) can be obtained as the compound satisfying the above described Formula (1), by allowing a diolefin compound represented by the following Formula (5) as the diolefin compound satisfying the above described Formula (2) to react with meta-chloroperoxybenzoic acid. The compound represented by the following Formula (5) can be synthesized by the Diels-Alder reaction of cyclopentadiene and dicyclopentadiene.

[Chem. 5]

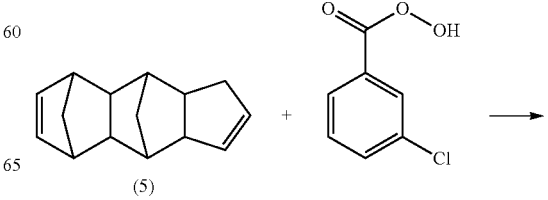

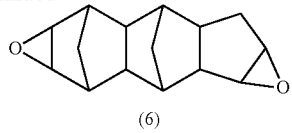

(6)

(3) Thermal Cationic Polymerization Initiator

Examples of cationic polymerization initiators which can be contained in the curable composition according to the present invention include thermal cationic polymerization initiators (initiators capable of generating cationic active species by the application of thermal energy thereto) and photo-cationic polymerization initiators (Initiators capable of generating cationic active species by the irradiation of light or an electron beam thereto). The combined use of the epoxy compound represented by the above described Formula (1) with a thermal cationic polymerization initiator enables to improve the heat resistance of the resulting cured product to an even higher level, as well as to decrease the reduction in the weight thereof which occurs upon curing. The above combination also enables to improve the transparency of the resulting cured product.

The thermal cationic polymerization initiator may be, for example: (i) an aromatic sulfonium salt-based thermal cationic polymerization initiator; (ii) a phosphonium salt-based thermal cationic polymerization initiator; (iii) a quaternary ammonium salt-based thermal cationic polymerization initiator; (iv) an aluminum complex-based thermal cationic polymerization initiator; (v) an aromatic iodonium salt-based thermal cationic polymerization initiator; (vi) an aromatic diazonium salt-based thermal cationic polymerization initiator; or (vii) a pyridinium-based thermal cationic polymerization initiator.

Examples of the aromatic sulfonium salt-based thermal cationic polymerization initiator include: hexafluoroantimonate salts such as (2-ethoxy-1-methyl-2-oxoethyl)methyl-2-naphthalenyisulfonium hexafluoroantimonate, 4-(methoxycarbonyloxy)phenylbenzylmethylsulfonium hexafluoroantimonate, 4-acetoxyphenyldimethylsulfonium hexafluoroantimonate, 4-hydroxyphenylbenzylmethylsulfonium hexafluoroantimonate, 4-hydroxyphenyl(o-methylbenzyl)methylsulfonium hexafluoroantimonate, 4-hydroxyphenyl(α-naphthylmethyl)methylsulfonium hexafluoroantimonate, diphenyl-4-(phenylthio)phenylsulfonium hexafluoroantimonate, triphenylsulfonium hexafluoroantimonate, bis[4-(di(4-(2-hydroxyethoxy))phenylsulfonio)phenyl]sulfide bishexafluoroantimonate, and bis[4-(diphenylsulfonio)phenyl]sulfide bishexafluoroantimonate; hexafluorophosphate salts such as (2-ethoxy-1-methyl-2-oxoethyl)methyl-2-naphthalenylsulfonium hexafluorophosphate, 4-acetoxyphenylbenzylmethylsulfonium hexafluorophosphate, 4-hydroxyphenyl(o-methylbenzyl)methylsulfonium hexafluorophosphate, 4-hydroxyphenyl(α-naphthylmethyl)methylsulfonium hexafluorophosphate, diphenyl-4-(phenylthio)phenylsulfonium hexafluorophosphate, triphenylsulfonium hexafluorophosphate, bis[4-(di(4-(2-hydroxyethoxy))phenylsulfonio)phenyl]sulfide bishexafluorophosphate, and bis[4-(diphenylsulfonio)phenyl]sulfide bishexafluorophosphate; hexafluoroarsenate salts such as 4-hydroxyphenyl(o-methylbenzyl)methylsulfonium hexafluoroarsenate, and 4-hydroxyphenylbenzylmethylsulfonium hexafluoroarsenate; tetrafluoroborate salts such as (2-ethoxy-1-methyl-2-oxoethyl)methyl-2-naphthalenylsulfonium tetrafluoroborate, 4-hydroxyphenyl(o-methylbenzyl)methylsulfonium tetrafluoroborate, 4-hydroxyphenylbenzylmethylsulfonium tetrafluoroborate, diphenyl-4-(phenylthio)phenylsulfonium tetrafluoroborate, triphenylsulfonium tetrafluoroborate, bis[4-(di(4-(2-hydroxyethoxy))phenylsulfonio)phenyl]sulfide bistetrafluoroborate, and bis[4-(diphenylsulfonio)phenyl]sulfide bistetrafluoroborate; trifluoromethanesulfonate salts such as 4-hydroxyphenyl(o-methylbenzyl)methylsulfonium trifluoromethanesulfonate, and 4-hydroxyphenylbenzylmethylsulfonium trifluoromethanesulfonate; trifluoromethanesulfonate salts such as diphenyl-4-(phenylthio)phenylsulfonium trifluoromethanesulfonate; bis(trifluoromethanesulfone)imide salts such as 4-hydroxyphenyl(α-naphthylmethyl)methylsulfonium bis(trifluoromethanesulfone)imide, and 4-hydroxyphenylbenzylmethylsulfonium bis(trifluoromethanesulfone)imide; tetrakis(pentafluorophenyl)borate salts such as (2-ethoxy-1-methyl-2-oxoethyl)methyl-2-naphthalenylsulfonium tetrakis(pentafluorophenyl)borate, 4-(methoxycarbonyloxy)phenylbenzylmethylsulfonium tetrakis(pentafluorophenyl)borate, 4-hydroxyphenyl(o-methylbenzyl)methylsulfonium tetrakis(pentafluorophenyl)borate, 4-hydroxyphenyl(α-naphthylmethyl)methylsulfonium tetrakis(pentafluorophenyl)borate, 4-hydroxyphenylbenzylmethylsulfonium tetrakis(pentafluorophenyl)borate, diphenyl-4-(phenylthio)phenylsulfonium tetrakis(pentafluorophenyl)borate, triphenylsulfonium tetrakis(pentafluorophenyl)borate, bis[4-(di(4-(2-hydroxyethoxy))phenylsulfonio)phenyl]sulfide tetrakis(pentafluorophenyl)borate, and bis[4-(diphenylsulfonio)phenyl]sulfide tetrakis(pentafluorophenyl)borate.

Examples of (ii) the phosphonium salt-based thermal cationic polymerization initiator include ethyltriphenylphosphonium hexafluoroantimonate, and tetrabutylphosphonium hexafluoroantimonate.

Examples of (iii) the quaternary ammonium salt-based thermal cationic polymerization initiator include N,N-dimethyl-N-benzylanilinium hexafluoroantimonate, N,N-diethyl-N-benzylanilinium tetrafluoroborate, N,N-dimethyl-N-benzylpyridinium hexafluoroantimonate, N,N-diethyl-N-benzylpyridinium trifluoromethanesulfonic acid, N,N-dimethyl-N-(4-methoxybenzyl)pyridinium hexafluoroantimonate, N,N-diethyl-N-(4-methoxybenzyl)pyridinium hexafluoroantimonate, N,N-diethyl-N-(4-methoxybenzyl)toluidinium hexafluoroantimonate, and N,N-dimethyl-N-(4-methoxybenzyl)toluidinium hexafluoroantimonate.

Examples of (iv) the aluminum complex-based thermal cationic polymerization initiator include aluminum carboxylates; aluminum alkoxide, aluminium chloride, aluminum (alkoxide) acetoacetic acid chelate, acetoacetonato aluminum, and ethylacetoacetato aluminum.

Examples of (v) the aromatic iodonium salt-based thermal cationic polymerization initiator include phenyliodonium hexafluorophosphate, diphenyliodonium hexafluoroantimonate, diphenyliodonium tetrafluoroborate, diphenyliodonium tetrakis(pentafluorophenyl)borate, diphenyliodonium hexafluorophosphate, diphenyliodonium trifluoromethanesulfonate, bis(dodecylphenyl)iodonium hexafluorophosphate, bis(dodecylphenyl)iodonium hexafluoroantimonate, bis(dodecylphenyl)iodonium tetrafluoroborate, bis(dodecylphenyl)iodonium tetrakis(pentafluorophenyl)borate, 4-methylphenyl-4-(1-methylethyl)phenyliodonium hexafluorophosphate, 4-methylphenyl-4-(1-methylethyl)phenyliodonium hexafluoroantimonate, 4-methylphenyl-4-(1-methylethyl)phenyliodonium tetrafluoroborate, and 4-methylphenyl-4-(1-methylethyl)phenyliodonium tetrakis(pentafluorophenyl)borate.

Examples of (vi) the aromatic diazonium salt-based thermal cationic polymerization initiator include phenyldiazonium hexafluorophosphate, phenyldiazonium hexafluoroantimonate, phenyldiazonium tetrafluoroborate and phenyldiazonium tetrakis(pentafluorophenyl)borate.

Examples of (vii) the pyridinium-based thermal cationic polymerization initiator include 1-benzyl-2-cyanopyridinium hexafluorophosphate, 1-benzyl-2-cyanopyridinium hexafluoroantimonate, 1-benzyl-2-cyanopyridinium tetrafluoroborate, 1-benzyl-2-cyanopyridinium tetrakis(pentafluorophenyl)borate, 1-(naphthylmethyl)-2-cyanopyridinium hexafluorophosphate, 1-(naphthylmethyl)-2-cyanopyridinium hexafluoroantimonate, 1-(naphthylmethyl)-2-cyanopyridinium tetrafluoroborate, and 1-(naphthylmethyl)-2-cyanopyridinium tetrakis(pentafluorophenyl)borate.

These thermal cationic polymerization initiators may be used alone, or as a mixture of two or more kinds thereof.

Among these, an aromatic sulfonium salt-based thermal cationic polymerization initiator is more preferred, and a monoaryl-based thermal cationic polymerization initiator, such as 4-acetoxyphenyldimethylsulfonium hexafluoroantimonate, is particularly preferred. The combined use of any of these specific thermal cationic polymerization initiators with the epoxy compound represented by the Formula (1) enables to improve the heat resistance of the resulting cured product to an even higher level, as well as to further decrease the reduction in the weight thereof which occurs upon curing. The above combination also enables to improve the transparency of the resulting cured product.

In cases where the curable composition according to the present invention does not contain any of an epoxy compound other than the epoxy compound represented by the Formula (1) to be described later, an oxetane compound to be described later or a vinyl ether to be described later, the content of the thermal cationic polymerization initiator in the curable composition is preferably from 0.1 to 15 parts by mass, and more preferably from 0.3 to 7 parts by mass with respect to 100 parts by mass of the epoxy compound represented by the Formula (1) contained in the curable composition. Further, in cases where the curable composition according to the present invention contains one kind, or two or more kinds selected from the group consisting of the epoxy compound other than the epoxy compound represented by the Formula (1), the oxetane compound and the vinyl ether, the content of the thermal cationic polymerization initiator in the curable composition is preferably from 0.1 to 15 parts by mass, and more preferably from 0.3 to 7 parts by mass with respect to 100 parts by mass of the total amount of the epoxy compound represented by the Formula (1), the epoxy compound other than the epoxy compound represented by the Formula (1), the oxetane compound and the vinyl ether. When the content of the thermal cationic polymerization initiator is adjusted within the above described numerical range, the heat resistance of the resulting cured product can be improved to an even higher level. Further, the weight reduction of the cured product upon curing can further be decreased. In addition, the transparency of the cured product can be further improved.

The cationic polymerization initiator to be contained in the curable composition according to the present invention is more preferably selected from the group consisting of aromatic sulfonium salt-based thermal cationic polymerization initiators, aromatic iodonium salt-based thermal cationic polymerization initiators and aluminum complex-based thermal cationic polymerization initiators. Further, the cationic polymerization initiator to be contained in the curable composition according to the present invention is still more preferably an aromatic sulfonium salt-based thermal cationic polymerization initiator.

(4) Acid Anhydride-Based Curing Agent

Examples of the acid anhydride-based curing agent to be contained in the curable composition according to the present invention include hexahydrophthalic anhydride, methylhexahydrophthalic anhydride, tetrahydrophthalic anhydride, methyltetrahydrophthalic anhydride, endomethylenetetrahydrophthalic anhydride, methylnadic anhydride, methylbutenyltetrahydrophthalic anhydride, hydrogenated methylnadic anhydride, trialkyltetrahydrophthalic anhydride, cyclohexanetricarboxylic anhydride, methylcyclohexenedicarboxylic anhydride, methylcyclohexanetetracarboxylic acid dianhydride, maleic anhydride, phthalic anhydride, succinic anhydride, dodecenylsuccinic anhydride, octenylsuccinic anhydride, pyromellitic anhydride, trimellitic anhydride, alkylstyrene-maleic anhydride copolymer, chlorendic anhydride, polyazelaic anhydride, benzophenone tetracarboxylic anhydride, ethylene glycol bisanhydrotrimellitate, glycerol tristrimellitate, glycerin bis(anhydrotrimellitate) monoacetate, benzophenonetetracarboxylic acid, polyadipic anhydride, polysebacic anhydride, poly(ethyloctadecanedioic acid) anhydride, poly(phenylhexadecanedioic acid) anhydride, HET anhydride, and norbornane-2,3-dicarboxylic anhydride.

Among these, hexahydrophthalic anhydride and methylhexahydrophthalic anhydride are preferred, because the combined use of any of these with the epoxy compound represented by the Formula (1) allows for improving the heat resistance and the transparency of the resulting cured product to an even higher level. The curable composition according to the present invention can contain one kind, or two or more kinds of the acid anhydride-based curing agents described above.

From the viewpoint of improving the heat resistance of the resulting cured product, the content of the acid anhydride-based curing agent in the curable composition according to the present invention, in cases where the curable composition does not contain the epoxy compound other than the epoxy compound represented by the Formula (1) to be described later, is preferably from 0.5 to 1.5 equivalent, more preferably from 0.6 to 1.2 equivalent, and still more preferably from 0.8 to 1.2 equivalent with respect to one equivalent of the epoxy compound represented by the Formula (1) contained in the curable composition. Further, in cases where the curable composition according to the present invention contains the epoxy compound other than the epoxy compound represented by the Formula (1), the content of the acid anhydride-based curing agent in the curable composition is preferably from 0.5 to 1.5 equivalent, more preferably from 0.6 to 1.2 equivalent, and still more preferably from 0.8 to 1.2 equivalent with respect to one equivalent of a mixture of epoxy compounds composed of the epoxy compound represented by the Formula (1) and the epoxy compound other than the epoxy compound represented by the Formula (1).

(5) Curing Accelerator

Examples of the curing accelerator to be contained in the curable composition according to the present invention include: phosphines and quaternary salts thereof, such as triphenylphosphine, triphenylbenzylphosphonium tetraphenylborate, tetrabutylphosphonium diethylphosphorodithioate, tetraphenylphosphonium bromide, tetrabutylphosphonium acetate, tetra-n-butylphosphonium bromide, tetra-n-butylphosphonium benzotriazolate, tetra-n-butylphosphonium tetrafluoroborate, tetra-n-butylphosphonium tetraphenylborate, methyltriphenylphosphonium bromide, ethyltriphenylphosphonium bromide, ethyltriphenylphosphonium iodide, ethyltriphenylphosphonium acetate, methyltri-n-butylphosphonium dimethylphosphate, n-butyltriphenylphosphonium bromide, benzyltriphenylphosphonium chloride, and tetraphenylphosphonium tetraphenylborate; Imidazoles such as 2-ethyl-4-methylimidazole, 1,2-dimethylimidazole, 1-benzyl-2-phenylimidazole, 2-methylimidazole, 2-phenylimidazole, 1-(2-cyanoethyl)-2-ethyl-4-methylimidazole, 2,4-diamino-6-[2-methylimidazolyl-(1)]ethyl-s-triazine, 2-phenylimidazoline, and 2,3-dihydro-1H-pyrrolo[1,2-a]benzimidazole; tertiary amines and quaternary salts thereof such as, tris(dimethylaminomethyl)phenol, benzyldimethylamine, and tetrabutylammonium bromide; super strong basic organic compounds such as 1,8-diazabicyclo(5,4,0)undecene-7 and 1,5-diazabicyclo(4,3,0)nonene-5; organic metal carboxylates such as zinc octylate, zinc laurate, zinc stearate, and tin octylate; metal-organic chelate compounds such as benzoylacetone zinc chelate, dibenzoylmethane zinc chelate and ethyl acetoacetate zinc chelate; and tetra-n-butylsulfonium-o,o-diethyl phosphorodithionate.

Among these, an imidazole-based curing accelerator is particularly preferred, because the combined use thereof with the epoxy compound represented by the Formula (1) allows for improving the heat resistance of the resulting cured product to an even higher level.

The curable composition according to the present invention may contain one kind, or two or more kinds of the curing accelerators as described above.

From the viewpoint of improving the heat resistance of the resulting cured product, the content of the curing accelerator in the curable composition according to the present invention, in cases where the curable composition does not contain the epoxy compound other than the epoxy compound represented by the Formula (1) to be described later, Is preferably from 0.1 to 10 parts by mass, more preferably from 0.2 to 8 parts by mass, and still more preferably from 0.5 to 6 parts by mass with respect to 100 parts by mass of the epoxy compound represented by the Formula (1). Further, in cases where the curable composition according to the present invention contains the epoxy compound other than the epoxy compound represented by the Formula (1), the content of the curing accelerator in the curable composition is preferably from 0.1 to 10 parts by mass, more preferably from 0.2 to 8 parts by mass, and still more preferably from 0.5 to 6 parts by mass with respect to 100 parts by mass of the total amount of the epoxy compound represented by the Formula (1) and the epoxy compound other than the epoxy compound represented by the Formula (1).

(6) Photo-Cationic Polymerization Initiator

The photo-cationic polymerization initiator to be contained in the curable composition according to the present invention is one which generates cationic species or Lewis acid when irradiated with an active energy ray such as a visible ray, UV light, an X ray or an electron beam, thereby initiating a polymerization reaction of a cationically polymerizable compound. As the photo-cationic polymerization initiator to be contained in the curable composition according to the present invention, it is possible to use, for example, a compound such as an onium salt, a metallocene complex, or an iron-allene complex. Examples of the onium salt which can be used include aromatic sulfonium salts, aromatic iodonium salts, aromatic diazonium salts, aromatic phosphonium salts and aromatic selenium salts. As the counter ions for these salts, anions such as $CF_3SO_3^-$, $BF_4^-$, $PF_6^-$, $AsF_6^-$, and $SbF_6^-$ are used. Among these, it is more preferred to use an aromatic sulfonium salt-based photo-cationic polymerization initiator, since it exhibits an excellent curing performance due to having UV absorption properties even in the wavelength range of 300 nm or more, and allows for providing a cured product having a good mechanical strength and adhesion strength. The curable composition according to the present invention may contain two or more kinds of the photo-cationic polymerization initiators.

Examples of the aromatic sulfonium salt include diphenyl-4-(phenylthio)phenylsulfonium hexafluorophosphate, 4,4'-bis(diphenylsulfonio)diphenylsulfide bishexafluorophosphate, 4,4'-bis[di(β-hydroxyethoxy)phenylsulfonio]diphenylsulfide bishexafluoroantimonate, 4,4'-bis[di(β-hydroxyethoxy)phenylsulfonio]diphenylsulfide bishexafluorophosphate, 7-[di(p-toluyl)sulfonio]-2-isopropylthioxanthone hexafluoroantimonate, 7-[di(p-toluyl)sulfonio]-2-isopropylthioxanthone tetrakis(pentafluorophenyl)borate, 4-phenylcarbonyl-4'-diphenylsulfonio-diphenylsulfide hexafluorophosphate, 4-(p-tert-butylphenylcarbonyl)-4'-diphenylsulfonio-diphenylsulfide hexafluoroantimonate, 4-(p-tert-butylphenylcarbonyl)-4'-di(p-toluyl)sulfonio-diphenylsulfide tetrakis(pentafluorophenyl)borate, diphenyl-4-(phenylthio)phenylsulfonium hexafluoroantimonate, triphenylsulfonium trifluoromethanesulfonate, bis[4-(diphenylsulfonio)phenyl]sulfide bishexafluoroantimonate, and (4-methoxyphenyl)diphenylsulfonium hexafluoroantimonate.

Examples of the aromatic iodonium salt include diphenyliodonium tetrakis(pentafluorophenyl)borate, diphenyliodonium hexafluorophosphate, diphenyliodonium hexafluoroantimonate, di(4-nonylphenyl)iodonium hexafluorophosphate, (4-methoxyphenyl)phenyliodonium hexafluoroantimonate, and bis(4-t-butylphenyl)iodonium hexafluorophosphate.

Examples of the aromatic diazonium salt include benzenediazonium hexafluoroantimonate, benzenediazonium hexafluorophosphate, benzenediazonium tetrafluoroborate, and 4-chlorobenzenediazonium hexafluorophosphate.

Examples of the aromatic phosphonium salt include benzyltriphenylphosphonium hexafluoroantimonate.

Examples of the aromatic selenium salt include triphenylselenium hexafluorophosphate.

Examples of the iron-allene complex include xylenecyclopentadienyl iron (II) hexafluoroantimonate, cumenecyclopentadienyl iron (II) hexafluorophosphate, and xylenecyclopentadienyl iron (II) tris(trifluoromethylsulfonyl)methanaide.

In cases where the curable composition according to the present invention does not contain any of the epoxy compound other than the epoxy compound represented by the Formula (1) to be described later, the oxetane compound to be described later, or the vinyl ether to be described later, the content of the photo-cationic polymerization initiator in the curable composition is preferably from 0.1 to 20 parts by mass, and more preferably from 0.3 to 15 parts by mass with respect to 100 parts by mass of the epoxy compound represented by the Formula (1) contained in the curable composition. Further, in cases where the curable composition according to the present invention contains one kind, or two or more kinds selected from the group consisting of the epoxy compound other than the epoxy compound represented by the Formula (1), the oxetane compound and the vinyl ether, the content of the photo-cationic polymerization initiator in the curable composition is preferably from 0.1 to 20 parts by mass, and more preferably from 0.3 to 15 parts by mass with respect to 100 parts by mass of the total amount of the epoxy compound represented by the Formula (1), the epoxy compound other than the epoxy compound represented by the Formula (1), the oxetane compound and the vinyl ether. When the content of the photo-cationic polymerization initiator is adjusted within the above described numerical range, the heat resistance of the resulting cured product can be improved to an even higher level. In addition, the transparency of the cured product can further be improved.

(7) Epoxy Compound Other than Epoxy Compound Represented by the Formula (1)

The curable composition according to the present invention may contain an epoxy compound other than the epoxy compound represented by the Formula (1) (in the present specification, sometimes also referred to as "the other epoxy compound"), depending on the application. Examples of the epoxy compound other than the epoxy compound represented by the Formula (1) include glycidyl ether-type epoxides, glycidyl ester-type epoxides, glycidyl amine-type epoxides and alicyclic epoxides; as well as oligomers and polymers therefrom.

Examples of the glycidyl ether-type epoxide include: glycidyl ethers of divalent phenols such as bisphenol A diglycidyl ether, bisphenol F diglycidyl ether, bisphenol S diglycidyl ether, tetramethyl biphenol diglycidyl ether, hydrogenated bisphenol A diglycidyl ether, and brominated bisphenol A diglycidyl ether; glycidyl ethers of polyvalent phenols such as dihydroxynaphthyl cresol triglycidyl ether, tris(hydroxyphenyl)methane triglycidyl ether, tetrakis(hydroxyphenyl)ethane tetraglycidyl ether, dinaphthyltriol triglycidyl ether, phenol novolac glycidyl ether, cresol novolac glycidyl ether, xylylene skeleton-containing phenol novolac glycidyl ethers, dicyclopentadiene skeleton-containing phenol novolac glycidyl ethers, biphenyl skeleton-containing phenol novolac glycidyl ethers, terpene skeleton-containing phenol novolac glycidyl ethers, bisphenol A novolac glycidyl ether, bisphenol F novolac glycidyl ether, bisphenol S novolac glycidyl ether, bisphenol AP novolac glycidyl ether, bisphenol C novolac glycidyl ether, bisphenol E novolac glycidyl ether, bisphenol Z novolac glycidyl ether, biphenol novolac glycidyl ether, tetramethyl bisphenol A novolac glycidyl ether, dimethyl bisphenol A novolac glycidyl ether, tetramethyl bisphenol F novolac glycidyl ether, dimethyl bisphenol F novolac glycidyl ether, tetramethyl bisphenol S novolac glycidyl ether, dimethyl bisphenol S novolac glycidyl ether, tetramethyl-4,4'-biphenol novolac glycidyl ether, trishydroxyphenylmethane novolac glycidyl ether, resorcinol novolac glycidyl ether, hydroquinone novolac glycidyl ether, pyrogallol novolac glycidyl ether, dilsopropylidene novolac glycidyl ether, 1,1-di-4-hydroxyphenylfluorene novolac glycidyl ether, phenolated polybutadiene novolac glycidyl ether, ethylphenol novolac glycidyl ether, butylphenol novolac glycidyl ether, octylphenol novolac glycidyl ether, naphthol novolac glycidyl ether, and hydrogenated phenol novolac glycidyl ether; glycidyl ethers of divalent alcohols such as ethylene glycol diglycidyl ether, propylene glycol diglycidyl ether, tetramethylene glycol diglycidyl ether, 1,6-hexanediol diglycidyl ether, cyclohexanedimethylol diglycidyl ether, polyethylene glycol diglycidyl ether, and polypropylene glycol diglycidyl ether; glycidyl ethers of polyols such as trimethylolpropane triglycidyl ether, glycerin triglycidyl ether, pentaerythritol tetraglycidyl ether, sorbitol hexaglycidyl ether, and polyglycerin polyglycidyl ether; and triglycidyl isocyanurate.

Examples of the glycidyl ester-type epoxide include: glycidyl esters of carboxylic acids such as glycidyl methacrylate, phthalic acid diglycidyl ester, isophthalic acid diglycidyl ester, terephthalic acid diglycidyl ester, cyclohexanedicarboxylic acid diglycidyl ester, and trimellitic acid triglycidyl ester; and glycidyl ester-type polyepoxides.

Examples of the glycidyl amine-type epoxide include: glycidyl aromatic amines such as N,N-diglycidylaniline, N,N-diglycidyltoluidine, N,N,N',N'-tetraglycidyldiaminodiphenylmethane, N,N,N',N'-tetraglycidyldlaminodiphenylsulfone, and N,N,N',N'-tetraglycidyldiethyldiphenylmethane; and glycidyl heterocyclic amines such as bis(N,N-diglycidylaminocyclohexyl)methane (hydride of N,N,N',N'-tetraglycidyldiaminodiphenylmethane), N,N,N',N'-tetraglycidyl-1,3-(bisaminomethyl)cyclohexane (hydride of N,N,N',N'-tetraglycidylxylylene diamine), trisglycidylmelamine, triglycidyl-p-aminophenol, N-glycidyl-4-glycidyloxypyrrolidone.

Examples of the alicyclic epoxide include vinyl cyclohexene dioxide, limonene dioxide, dicyclopentadiene dioxide, bis(2,3-epoxycyclopentyl) ether, ethylene glycol bisepoxy dicyclopentyl ether, 3,4-epoxy-6-methylcyclohexylmethyl 3',4'-epoxy-6'-methylcyclohexane carboxylate, 3,4-epoxycyclohexylmethyl 3,4-epoxycyclohexane carboxylate, 3,4-epoxy-1-methylcyclohexyl 3,4-epoxy-1-methylhexane carboxylate, 3,4-epoxy-3-methylcyclohexylmethyl 3,4-epoxy-3-methylhexane carboxylate, 3,4-epoxy-5-methylcyclohexylmethyl 3,4-epoxy-5-methylcyclohexane carboxylate, 2-(3,4-epoxycyclohexyl-5,5-spiro-3,4-epoxy)cyclohexane-metadioxane, methylenebis(3,4-epoxycyclohexane), (3,3',4,4'-diepoxy)bicyclohexyl, 1,2-epoxy-(2-oxiranyl)cyclohexane adduct of 2,2-bis(hydroxymethyl)-1-butanol, and tetrahydroindene diepoxide. The curable composition according to the present invention may contain one kind, or two or more kinds of epoxy compounds other than the epoxy compound represented by the Formula (1), such as those as described above.

The content of the above described epoxy compound other than the epoxy compound represented by the Formula (1) is preferably from 1 to 90% by mass, and more preferably from 5 to 85% by mass with respect to the amount of curable composition, from the viewpoint of improving the heat resistance of the resulting cured product.

In one preferred embodiment, the epoxy compound other than the epoxy compound represented by the Formula (1) contained in the curable composition according to the present invention is selected from the group consisting of glycidyl ether-type epoxides, glycidyl ester-type epoxides and alicyclic epoxides.

(8) Reactive Diluent

The curable composition according to the present invention may further contain a reactive diluent in order to reduce the viscosity. Examples of the reactive diluent include a monoepoxy compound produced by the method described in Preparation Example 4, butyl glycidyl ether, 2-ethylhexyl glycidyl ether, glycidyl ether of a mixture of C12 and C13 alcohols, and 1,2-epoxy-4-vinylcyclohexane. The curable composition may contain one kind, or two or more kinds of the reactive diluents as described above. The mixing ratio of the reactive diluent may be adjusted as appropriate such that the curable composition containing the reactive diluent has a desired viscosity.

(9) Oxetane Compound

The curable composition according to the present invention may contain an oxetane compound. Examples of the oxetane compound include 1,4-bis[(3-ethyl-3-oxetanylmethoxy)methyl] benzene, 3-ethyl-3-hydroxymethyloxetane, 3-ethyl-3-(phenoxymethyl)oxetane, di[(3-ethyl-3-oxetanyl)methyl] ether, 3-ethyl-3-(2-ethylhexyloxymethyl) oxetane, 3-ethyl-3-(cyclohexyloxymethyl)oxetane, phenol novolac oxetane, 1,3-bis[(3-ethyloxetan-3-yl)]methoxybenzene, oxetanyl silsesquioxane, oxetanyl silicate, bis[1-ethyl (3-oxetanyl)]methyl ether, 4,4'-bis[(3-ethyl-3-oxetanyl) methoxymethyl] biphenyl, 4,4'-bis(3-ethyl-3-oxetanylmethoxy)biphenyl, ethylene glycol (3-ethyl-3-oxetanylmethyl) ether, diethylene glycol bis(3-ethyl-3-oxetanylmethyl) ether, bis(3-ethyl-3-oxetanylmethyl) diphenoate, trimethylolpropane propane tris(3-ethyl-3-oxetanylmethyl) ether, pentaerythritol tetrakis(3-ethyl-3-oxetanylmethyl) ether, and phenol novolac-type oxetane compounds. The curable composition according to the present invention may contain one kind, or two or more kinds of the oxetane compounds as described above.

The content of the oxetane compound in the curable composition according to the present invention is preferably from 1 to 90% by mass, and more preferably from 5 to 85% by mass, from the viewpoint of improving the heat resistance of the resulting cured product.

(10) Vinyl Ether Compound

The curable composition according to the present invention may contain a vinyl ether compound. Examples of the vinyl ether compound include: monofunctional vinyl ethers such as methyl vinyl ether, ethyl vinyl ether, propyl vinyl ether, and butyl vinyl ether; polyfunctional vinyl ethers such as ethylene glycol divinyl ether, butanediol divinyl ether, cyclohexanedimethanol divinyl ether, cyclohexanediol divinyl ether, trimethylolpropane trivinyl ether, pentaerythritol tetravinyl ether, glycerol trivinyl ether, triethylene glycol divinyl ether, and diethylene glycol divinyl ether; vinyl ether compounds containing a hydroxyl group such as hydroxyethyl vinyl ether, hydroxybutyl vinyl ether, cyclohexanedimethanol monovinyl ether, cyclohexanediol monovinyl ether, 9-hydroxynonyl vinyl ether, propylene glycol monovinyl ether, neopentyl glycol monovinyl ether, glycerol divinyl ether, glycerol monovinyl ether, trimethylolpropane divinyl ether, trimethylolpropane monovinyl ether, pentaerythritol monovinyl ether, pentaerythritol divinyl ether, pentaerythritol trivinyl ether, diethylene glycol monovinyl ether, triethylene glycol monovinyl ether, tetraethylene glycol monovinyl ether, tricyclodecanediol monovinyl ether, and tricyclodecane dimethanol monovinyl ether; and vinyl ethers containing different types of functional groups, such as 2-(2-vinyloxyethoxy)ethyl acrylate, and 2-(2-vinyloxyethoxy)ethyl methacrylate. The curable composition according to the present invention may contain one kind, or two or more kinds of the vinyl ether compounds as described above.

The content of the vinyl ether compound in the curable composition according to the present invention is preferably from 1 to 90% by mass, and more preferably from 5 to 85% by mass, from the viewpoint of improving the heat resistance of the resulting cured product.

(11) Compound Containing Hydroxyl Group

The curable composition according to the present invention may further contain a compound containing a hydroxyl group. Incorporation of a compound containing a hydroxyl group into the curable composition allows a moderate curing reaction to proceed. Examples of the compound containing a hydroxyl group include ethylene glycol, diethylene glycol, and glycerin. The curable composition according to the present invention may contain one kind, or two or more kinds of the compounds containing a hydroxyl group, such as those described above.

The content of the compound containing a hydroxyl group in the curable composition according to the present invention is preferably from 0.1 to 10% by mass, and more preferably from 0.2 to 8% by mass, from the viewpoint of improving the heat resistance of the resulting cured product.

(12) Other Components

The curable composition according to the present invention may further contain a solvent. Examples of the solvent include methyl ethyl ketone, ethyl acetate, toluene, methanol, and ethanol.

The curable composition according to the present Invention may contain various types of additives to the extent that the properties of the composition are not impaired. Examples of the additives include fillers, silane coupling agents, mold release agents, coloring agents, flame retardants, antioxidants, photostabilizers and plasticizers, antifoaming agents, photostabilizers, coloring agents such as pigments and dyes, plasticizers, pH adjusting agents, coloration inhibitors, matting agents, deodorants, weather resistant agents, antistatic agents, yarn friction reducing agents, slip agents, and ion exchangers.

(13) Production of Curable Composition

The curable composition according to the present invention can be produced in accordance with technical common knowledge widely known to those skilled in the art, and the method of producing the curable composition and the components to be further included in the curable composition can be selected as appropriate.

3. Cured Product (1) Conditions for Curing

The cured product according to the present invention is obtained by curing the above described curable composition according to the present invention. The method of curing the curable composition is not particularly limited, and the composition can be cured by heating or irradiation of light, as appropriate.

In cases where the curable composition is cured by heating, the heating of the curable composition is preferably carried out in multiple stages, taking into consideration the degree of reactivity of the epoxy compound. This allows for a sufficient curing reaction to proceed. For example, the curing reaction can be carried out by performing a first heating at a temperature of from 100 to 130° C. for 10 to 150 minutes, a second heating at 140 to 160° C. for 10 to 150 minutes, a third heating at 170 to 200° C. for 60 to 180 minutes, and a fourth heating at 210 to 250° C. for 10 to 150 minutes. Alternatively, the curing reaction can also be carried out, for example, by performing a first heating at a temperature of from 100 to 130° C. for 10 to 150 minutes, a second heating at 140 to 200° C. for 10 to 150 minutes, and a third heating at 210 to 250° C. for 10 to 150 minutes. Still alternatively, the curing reaction can also be carried out, for example, by performing a first heating at a temperature of from 80 to 100° C. for 10 to 150 minutes, a second heating at 110 to 120° C. for 10 to 150 minutes, a third heating at 130 to 140° C. for 60 to 180 minutes, a fourth heating at 150 to 170° C. for 10 to 150 minutes, a fifth heating at 180 to 200° C. for 60 to 180 minutes and a sixth heating at 210 to 230° C. for 60 to 240 minutes. Still alternatively, the curing reaction can be carried out, for example, by performing a first heating at a temperature of 100 to 110° C. for 10 to 150 minutes, a second heating at 120 to 150° C. for 10 to 150 minutes, a third heating at 160 to 220° C. for 10 to 150 minutes, and a fourth heating at 230 to 250° C. for 10 to 150 minutes. However, the heating conditions are not limited to those described above, and the heating is preferably carried out varying the conditions as appropriate, in view of the content of the epoxy compound and the properties of other compounds and the like contained in the curable composition.

In cases where the curable composition is cured by the irradiation of an active energy ray, such as a visible ray, UV light, an X ray or an electron beam, the type of the active energy ray used and the conditions for irradiation are preferably selected as appropriate, depending on the composition of the curable composition. In one embodiment, it is preferred that the irradiation of UV light is carried out such that the accumulated amount of light, which is represented as the product of the irradiation intensity and the irradiation time, is adjusted within the range of from 10 to 5,000 mJ/cm$^2$. When the accumulated amount of light irradiated to the curable composition is adjusted within the above described numerical range, it is possible to allow active species derived from the photo-cationic polymerization initiator to be generated sufficiently. This also allows for an improvement in the productivity.

(2) Applications of Cured Product

Specific examples of the application of the curable composition according to the present invention and the cured product obtained therefrom include: coating materials for coating on substrates such as metals, resin films, glass, paper and wood, surface protective films for semiconductor devices and organic thin film elements (for example, organic electroluminescent elements and organic thin film solar cell elements), hard coating agents, anti-fouling films and anti-reflection films; adhesive agents, tacky materials; various types of optical members such as lenses, prisms, filters, image display materials, lens arrays, sealing materials and reflector materials for optical semiconductor devices, sealing materials for semiconductor devices, optical waveguides, light guide plates, light diffusion plates, diffraction elements and optical adhesive agents; and materials such as casting materials, Interlayer insulators, insulating films for printed alignment substrates and fiber-reinforced composite materials.

Aspect I of the present invention, which is one preferred aspect of the present invention, encompasses the following inventions.

(1) A curable composition comprising:
an epoxy compound represented by the following Formula (1):

[Chem. 6]

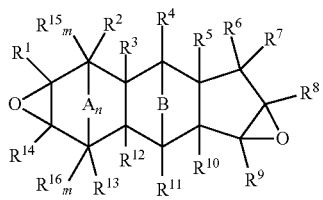

(1)

(wherein
A represents $CR^{17}R^{18}$;
B represents $CR^{19}R^{20}$;
$R^1$ to $R^{20}$ each independently represents a substituent selected from the group consisting of a hydrogen atom, an alkyl group and an alkoxy group;
n represents 1; and
m represents 0); and
a thermal cationic polymerization initiator.

(2) The curable composition according to (1), further comprising one kind, or two or more kinds selected from the group consisting of an epoxy compound other than the epoxy compound represented by the Formula (1), an oxetane compound and a vinyl ether.

(3) The curable composition according to (1) or (2), wherein the cationic polymerization initiator is selected from the group consisting of aromatic sulfonium salt-based thermal cationic polymerization initiators, aromatic iodonium salt-based thermal cationic polymerization initiators and aluminum complex-based thermal cationic polymerization initiators.

(4) The curable composition according to any one of (1) to (3), wherein the cationic polymerization initiator is an aromatic sulfonium salt-based thermal cationic polymerization initiator.

(5) The curable composition according to any one of (1) to (4), wherein the content of the epoxy compound represented by the Formula (1) is from 10 to 99% by mass.

(6) The curable composition according to any one of (1) to (5), wherein, in cases where the curable composition does not include any of the epoxy compound other than the epoxy compound represented by the Formula (1), the oxetane compound or the vinyl ether, the content of the thermal cationic polymerization initiator is from 0.1 to 15 parts by mass with respect to 100 parts by mass of the epoxy compound represented by the Formula (1) contained in the curable composition; and in cases where the curable composition includes one kind, or two or more kinds selected from the group consisting of the epoxy compound other than the epoxy compound represented by the Formula (1), the oxetane compound and the vinyl ether, the content of the thermal cationic polymerization initiator is from 0.1 to 15 parts by mass with respect to 100 parts by mass of the total amount of the epoxy compound represented by the Formula (1), the epoxy compound other than the epoxy compound represented by the Formula (1), the oxetane compound and the vinyl ether.

(7) The curable composition according to (2), wherein the epoxy compound other than the epoxy compound represented by the Formula (1) is selected from the group consisting of glycidyl ether-type epoxides, glycidyl ester-type epoxides and alicyclic epoxides.

(8) A cured product from the curable composition according to any one of (1) to (7).

According to Aspect I of the present invention, it is possible to provide a curable composition capable of producing a cured product having a high heat resistance. Further, according to the curable composition of the present invention, a reduction in weight which occurs upon curing the curable composition can be decreased to an extremely low level.

According to Aspect I of the present invention, the epoxy compound represented by the Formula (1) contained in the curable composition according to the present invention preferably has an epoxy equivalent of from 90 to 600 g/eq, more preferably from 90 to 300 g/eq, and still more preferably from 90 to 200 g/eq. The curable composition according to the present invention may contain any of other compounds to be described later. However, the content of the epoxy compound represented by the Formula (1) contained in the curable composition according to the present invention is preferably from 10 to 99% by mass, and more preferably from 15 to 99% by mass, from the viewpoint of improving the heat resistance of the resulting cured product and decreasing the weight reduction upon curing.

Aspect II of the present invention, which is one preferred aspect of the present invention, encompasses the following inventions.

(1) A curable composition comprising:
an epoxy compound represented by the following Formula (1):

[Chem. 7]

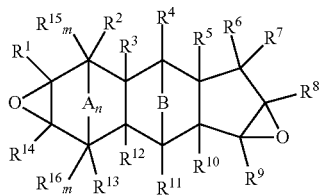

(wherein
A represents $CR^{17}R^{18}$;
B represents $CR^{19}R^{20}$;
$R^1$ to $R^{20}$ each independently represents a substituent selected from the group consisting of a hydrogen atom, an alkyl group and an alkoxy group;
n represents 1; and
m represents 0);
an acid anhydride-based curing agent; and
a curing accelerator.
(2) The curable composition according to (1), further comprising an epoxy compound other than the epoxy compound represented by the Formula (1).
(3) The curable composition according (2), wherein, in cases where the curable composition does not include the epoxy compound other than the epoxy compound represented by the Formula (1), the content of the acid anhydride-based curing agent is from 0.6 to 1.2 equivalent with respect to one equivalent of the epoxy compound represented by the Formula (1) contained in the curable composition; and in cases where the curable composition includes the epoxy compound other than the epoxy compound represented by the Formula (1), the content of the acid anhydride-based curing agent is from 0.6 to 1.2 equivalent with respect to one equivalent of a mixture of epoxy compounds composed of the epoxy compound represented by the Formula (1) and the epoxy compound other than the epoxy compound represented by the Formula (1).
(4) The curable composition according to (2) or (3), wherein, in cases where the curable composition does not include the epoxy compound other than the epoxy compound represented by the Formula (1), the content of the curing accelerator is from 0.1 to 10 parts by mass with respect to 100 parts by mass of the epoxy compound represented by the Formula (1) contained in the curable composition; and in cases where the curable composition includes the epoxy compound other than the epoxy compound represented by the Formula (1), the content of the curing accelerator is from 0.1 to 10 parts by mass with respect to 100 parts by mass of a mixture of epoxy compounds composed of the epoxy compound represented by the Formula (1) and the epoxy compound other than the epoxy compound represented by the Formula (1).
(5) The curable composition according to any one of (1) to (4), wherein the curing accelerator is an imidazole-based curing accelerator.
(6) The curable composition according to (2), wherein the epoxy compound other than the epoxy compound represented by the Formula (1) is selected from the group consisting of glycidyl ether-type epoxides, glycidyl ester-type epoxides and alicyclic epoxides.
(7) A cured product from the curable composition according to any one of (1) to (6).

According to Aspect II of the present invention, it is possible to provide a curable composition which allows for the production of a cured product having a high heat resistance.

According to Aspect II of the present invention, the epoxy compound represented by the Formula (1) contained in the curable composition according to the present invention preferably has an epoxy equivalent of from 90 to 600 g/eq, more preferably from 90 to 300 g/eq, and still more preferably from 90 to 200 g/eq. The content of the epoxy compound represented by the Formula (1) in the curable composition according to the present invention is preferably from 10 to 80% by mass, and more preferably from 15 to 60% by mass.

Aspect III of the present invention, which is one preferred aspect of the present invention, encompasses the following inventions.
(1) A curable composition comprising:
an epoxy compound represented by the following Formula (1):

[Chem. 8]

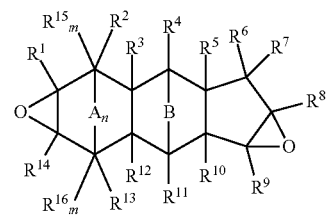

(wherein
A represents $CR^{17}R^{18}$;
B represents $CR^{19}R^{20}$;
$R^1$ to $R^{20}$ each independently represents a substituent selected from the group consisting of a hydrogen atom, an alkyl group and an alkoxy group;
n represents 0; and
m represents 1); and
a thermal cationic polymerization initiator.
(2) The curable composition according to (1), further comprising one kind, or two or more kinds selected from the group consisting of an epoxy compound other than the epoxy compound represented by the Formula (1), an oxetane compound and a vinyl ether.
(3) The curable composition according to (1) or (2), wherein the cationic polymerization initiator is selected from the group consisting of aromatic sulfonium salt-based thermal cationic polymerization initiators, aromatic iodonium salt-based thermal cationic polymerization initiators and aluminum complex-based thermal cationic polymerization initiators.
(4) The curable composition according to any one of (1) to (3), wherein the cationic polymerization initiator is an aromatic sulfonium salt-based thermal cationic polymerization initiator.
(5) The curable composition according to any one of (1) to (4), wherein the content of the epoxy compound represented by the Formula (1) is from 10 to 99% by mass.
(6) The curable composition according to any one of (2) to (5), wherein, in cases where the curable composition does not include any of the epoxy compound other than the epoxy compound represented by the Formula (1), the oxetane compound or the vinyl ether, the content of the thermal cationic polymerization initiator is from 0.1 to 15 parts by mass with respect to 100 parts by mass of the epoxy compound represented by the Formula (1) contained in the curable composition; and in cases where the curable composition includes one kind, or two or more kinds selected from the group consisting of the epoxy compound other than the epoxy compound represented by the Formula (1), the oxetane compound and the vinyl ether, the content of the thermal cationic polymerization initiator is from 0.1 to 15 parts by mass with respect to 100 parts by mass of the total amount of the epoxy compound represented by the Formula (1), the epoxy compound other than the epoxy compound represented by the Formula (1), the oxetane compound and the vinyl ether.

(7) The curable composition according to any one of (2) to (7), wherein the epoxy compound other than the epoxy compound represented by the Formula (1) is selected from the group consisting of glycidyl ether-type epoxides, glycidyl ester-type epoxides and alicyclic epoxides.

(8) A cured product from the curable composition according to any one of (1) to (7).

According to Aspect III of the present invention, it is possible to provide a curable composition which allows for obtaining a cured product with a dramatically improved heat resistance.

According to Aspect III of the present invention, the epoxy compound represented by the Formula (1) contained in the curable composition according to the present invention preferably has an epoxy equivalent of from 85 to 600 g/eq, more preferably from 85 to 300 g/eq, and still more preferably from 85 to 150 g/eq. The curable composition according to the present invention may contain any of other compounds to be described later. However, the content of the epoxy compound represented by the Formula (1) contained in the curable composition according to the present invention is preferably from 10 to 99% by mass, and more preferably from 15 to 99% by mass, from the viewpoint of improving the heat resistance of the resulting cured product.

Aspect IV of the present invention, which is one preferred aspect of the present invention, encompasses the following Inventions.

(1) A curable composition comprising:
an epoxy compound represented by the following Formula (1):

[Chem. 9]

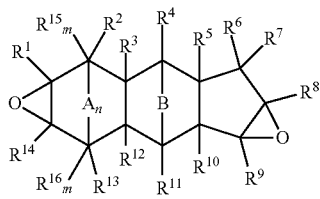

(1)

(wherein
A represents $CR^{17}R^{18}$;
B represents $CR^{19}R^{20}$;
$R^1$ to $R^{20}$ each independently represents a substituent selected from the group consisting of a hydrogen atom, an alkyl group and an alkoxy group;
n represents 0; and
m represents 1); and
an acid anhydride-based curing agent; and
a curing accelerator.

(2) The curable composition according to (1), further comprising an epoxy compound other than the epoxy compound represented by the Formula (1).

(3) The curable composition according (2), wherein, in cases where the curable composition does not include the epoxy compound other than the epoxy compound represented by the Formula (1), the content of the acid anhydride-based curing agent is from 0.6 to 1.2 equivalent with respect to one equivalent of the epoxy compound represented by the Formula (1) contained in the curable composition; and in cases where the curable composition includes the epoxy compound other than the epoxy compound represented by the Formula (1), the content of the acid anhydride-based curing agent is from 0.6 to 1.2 equivalent with respect to one equivalent of a mixture of epoxy compounds composed of the epoxy compound represented by the Formula (1) and the epoxy compound other than the epoxy compound represented by the Formula (1).

(4) The curable composition according to (2) or (3), wherein, in cases where the curable composition does not include the epoxy compound other than the epoxy compound represented by the Formula (1), the content of the curing accelerator is from 0.1 to 10 parts by mass with respect to 100 parts by mass of the epoxy compound represented by the Formula (1) contained in the curable composition; and in cases where the curable composition includes the epoxy compound other than the epoxy compound represented by the Formula (1), the content of the curing accelerator is from 0.1 to 10 parts by mass with respect to 100 parts by mass of a mixture of epoxy compounds composed of the epoxy compound represented by the Formula (1) and the epoxy compound other than the epoxy compound represented by the Formula (1).

(5) The curable composition according to any one of (1) to (4), wherein the curing accelerator is an imidazole-based curing accelerator.

(6) The curable composition according to any one of (2) to (5), wherein the epoxy compound other than the epoxy compound represented by the Formula (1) is selected from the group consisting of glycidyl ether-type epoxides, glycidyl ester-type epoxides and alicyclic epoxides.

(7) A cured product from the curable composition according to any one of (1) to (6).

According to Aspect IV of the present invention, it is possible to provide a curable composition which allows for the production of a cured product having a high moisture resistance and heat resistance.

According to Aspect IV of the present invention, the epoxy compound represented by the Formula (1) contained in the curable composition according to the present invention preferably has an epoxy equivalent of from 85 to 600 g/eq, more preferably from 85 to 300 g/eq, and still more preferably from 85 to 150 g/eq. The content of the epoxy compound represented by the Formula (1) in the curable composition according to the present invention is preferably from 10 to 80% by mass, and more preferably from 15 to 60% by mass.

Aspect V of the present invention, which is one preferred aspect of the present invention, encompasses the following inventions.

(1) A curable composition comprising:
an epoxy compound represented by the following Formula (1):

[Chem. 10]

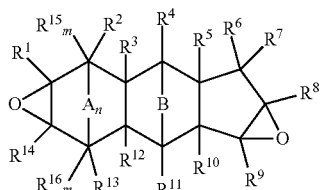

(1)

(wherein

A represents $CR^{17}R^{18}$;

B represents $CR^{19}R^{20}$;

$R^1$ to $R^{20}$ each independently represents a substituent selected from the group consisting of a hydrogen atom, an alkyl group and an alkoxy group; and n represents 0 or 1, with the proviso that when n is 0, m represents 1, and when n is 1, m represents 0); and a photo-cationic polymerization initiator.

(2) The curable composition according to (1), further comprising one kind, or two or more kinds selected from the group consisting of an epoxy compound other than the epoxy compound represented by the Formula (1), an oxetane compound and a vinyl ether.

(3) The curable composition according to (1) or (2), wherein the photo-cationic polymerization initiator is an aromatic sulfonium salt-based photo-cationic polymerization initiator.

(4) The curable composition according to any one of (1) to (3), wherein the content of the epoxy compound represented by the Formula (1) is from 1 to 50% by mass.

(5) The curable composition according to any one of (2) to (4), wherein the epoxy compound other than the epoxy compound represented by the Formula (1) is selected from the group consisting of glycidyl ether-type epoxides, glycidyl ester-type epoxides and alicyclic epoxides.

(6) The curable composition according to any one of (2) to (5) wherein, in cases where the curable composition does not include any of the epoxy compound other than the epoxy compound represented by the Formula (1), the oxetane compound or the vinyl ether, the content of the photo-cationic polymerization initiator is from 0.1 to 20 parts by mass with respect to 100 parts by mass of the epoxy compound represented by the Formula (1) contained in the curable composition; and in cases where the curable composition includes one kind, or two or more kinds selected from the group consisting of the epoxy compound other than the epoxy compound represented by the Formula (1), the oxetane compound and the vinyl ether, the content of the photo-cationic polymerization initiator is from 0.1 to 20 parts by mass with respect to 100 parts by mass of the total amount of the epoxy compound represented by the Formula (1), the epoxy compound other than the epoxy compound represented by the Formula (1), the oxetane compound and the vinyl ether.

(7) A cured product from the curable composition according to any one of (1) to (6).

According to Aspect V of the present invention, it is possible to provide a curable composition which allows for obtaining a cured product with a dramatically improved heat resistance.

According to Aspect V of the present invention, the epoxy compound represented by the Formula (1) contained in the curable composition according to the present invention preferably has an epoxy equivalent of from 85 to 600 g/eq, more preferably from 85 to 300 g/eq, and still more preferably from 85 to 200 g/eq. The curable composition according to the present invention may further contain any of other compounds to be described later. However, the content of the epoxy compound represented by the Formula (1) contained in the curable composition according to the present invention is preferably from 1 to 50% by mass, and more preferably from 5 to 40% by mass, from the viewpoint of improving the heat resistance the resulting cured product. In one embodiment, it is preferred that the curable composition according to the present invention further contain the epoxy compound other than the epoxy compound represented by the Formula (1) and/or the oxetane compound.

EXAMPLES

The present invention will now be described in further detail by way of Examples. However, the present invention is in no way limited by these Examples.

1. Preparation Example 1: Production of Epoxy Compound (A-1) Satisfying Formula (1)

Into a reaction vessel equipped with a thermometer, an agitator, a reflux tube and a dropping device, 23.5 kg of chloroform, and 1.6 kg of a compound represented by the following Formula (3) and satisfying the above described Formula (2) were charged. To the reactor, 4.5 kg of meta-chloroperoxybenzoic acid was added dropwise while stirring at 0° C. The temperature was then raised to room temperature, and a reaction was allowed to proceed for 12 hours.

Subsequently, by-produced meta-chlorobenzoic acid was removed by filtration, and the filtrate was then washed with a 1N aqueous solution of sodium hydroxide three times, followed by washing with saturated saline. After drying the organic layer with magnesium sulfate, the magnesium sulfate was removed by filtration to concentrate the filtrate, thereby obtaining a coarse product.

A quantity of 2 kg of toluene was added to the coarse product, to dissolve the coarse product at room temperature. To the resultant, 6 kg of heptane was added dropwise to allow crystallization to occur. The resultant was matured at 5° C. for one hour. The resulting crystallization product was filtered, and washed with hexane. Thereafter, the crystallization product was dried under reduced pressure for 24 hours, to obtain 1.4 kg of an epoxy compound (A-1) which is represented by the following Formula (4) and which satisfies the above described Formula (1), as a white solid. The epoxy equivalent of the thus obtained epoxy compound (A-1) was measured in accordance with JIS K7236, and it was determined to be 122 g/eq. The structure of the resulting epoxy compound (A-1) was analyzed by $^{13}$C-NMR, to confirm that the epoxy compound (A-1) of interest had been obtained. The $^{13}$C-NMR chart of the epoxy compound (A-1) is shown in FIG. 1.

[Chem. 11]

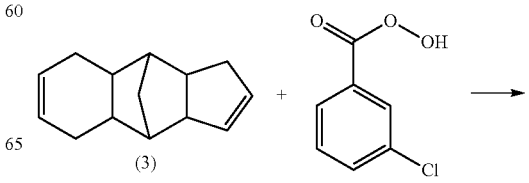

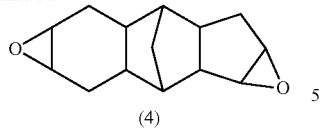

(4)

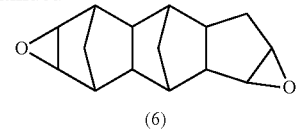

(6)

2. Preparation Example 2: Synthesis of Epoxy Compound (A-2) Satisfying Formula (1)

Into a reaction vessel equipped with a thermometer, an agitator, a reflux tube and a dropping device, 59.2 kg of chloroform, and 4.0 kg of a compound represented by the following Formula (5) and satisfying the above described Formula (2) were charged. To the reactor, 10.6 kg of meta-chloroperoxybenzoic acid was added dropwise while stirring at −10° C. The temperature was then raised to room temperature, and a reaction was allowed to proceed for 12 hours.

Subsequently, by-produced meta-chlorobenzoic acid was removed by filtration, and the filtrate was then washed with 42.0 kg of a 5% aqueous solution of sodium sulfite. The organic layer was further washed with 41.6 kg of a 1N aqueous solution of sodium hydroxide four times, followed by washing with 48.0 kg of saturated saline. After drying the organic layer with magnesium sulfate, the magnesium sulfate was removed by filtration to concentrate the filtrate, thereby obtaining 5.1 kg of a coarse product.

Figure 2:
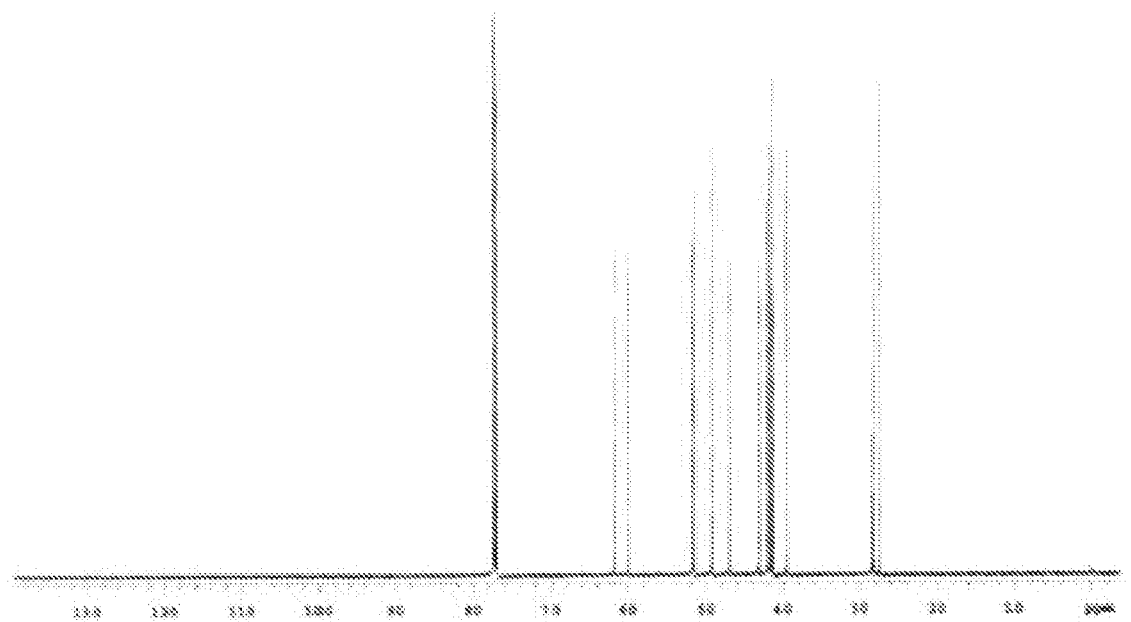
FIG. 2 shows a $^{13}$C-NMR chart of an epoxy compound (A-2) produced in Preparation Example 2.

A quantity of 3.5 kg of toluene was added to the coarse product, to dissolve the coarse product at room temperature. To the resultant, 13.7 kg of heptane was added dropwise to allow crystallization to occur. The resultant was matured at 5° C. for one hour. The resulting crystallization product was filtered, and washed with heptane. Thereafter, the crystallization product was dried under reduced pressure at 35° C. for 12 hours, to obtain 2.8 kg of an epoxy compound (A-2) which is represented by the following Formula (6) and which satisfies the above described Formula (1), as a white solid. The epoxy equivalent of the thus obtained epoxy compound (A-2) was measured in accordance with JIS K7236, and it was determined to be 180 g/eq. Note, however, that since the measured value (180 g/eq) of the epoxy equivalent of the resulting epoxy compound (A-2) did not coincide with the theoretical value (115 g/eq) of the epoxy equivalent of the epoxy compound (A-2) calculated from the chemical structure of the epoxy compound (A-2), the theoretical value 115 g/eq was used as the epoxy equivalent of the epoxy compound (A-2), when determining the content of an acid anhydride-based curing agent to be used. The structure of the resulting epoxy compound (A-2) was analyzed by $^{13}$C-NMR, to confirm that the epoxy compound (A-2) of interest had been obtained. The $^{13}$C-NMR chart of the epoxy compound (A-2) is shown in FIG. 2.

[Chem. 12]

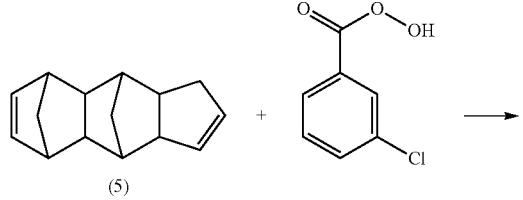

3. Preparation Example 3: Synthesis of Epoxy Compound (A-3) Satisfying Formula (1)

Into a reaction vessel equipped with a thermometer, an agitator, a reflux tube and a dropping device, 59.2 kg of chloroform, and 4.0 kg of a compound represented by the following Formula (3) and satisfying the above described Formula (2) were charged. To the reactor, 10.6 kg of meta-chloroperoxybenzoic acid was added dropwise while stirring at −10° C. The temperature was then raised to room temperature, and a reaction was allowed to proceed for 12 hours.

Subsequently, by-produced meta-chlorobenzoic acid was removed by filtration, and the filtrate was then washed with 42.0 kg of a 5% aqueous solution of sodium sulfite. The organic layer was further washed with 41.6 kg of a 1N aqueous solution of sodium hydroxide four times, followed by washing with 48.0 kg of saturated saline. After drying the organic layer with magnesium sulfate, the magnesium sulfate was removed by filtration to concentrate the filtrate, thereby obtaining 5.1 kg of a coarse product.

A quantity of 3.5 kg of toluene was added to the coarse product, to dissolve the coarse product at room temperature. To the resultant, 13.7 kg of heptane was added dropwise to allow crystallization to occur. The resultant was matured at 5° C. for one hour. The resulting crystallization product was filtered, and washed with heptane. Thereafter, the crystallization product was dried under reduced pressure at 35° C. for 12 hours, to obtain 2.8 kg of an epoxy compound (A-3) which is represented by the following Formula (4) and which satisfies the above described Formula (1), as a white solid.

[Chem. 13]

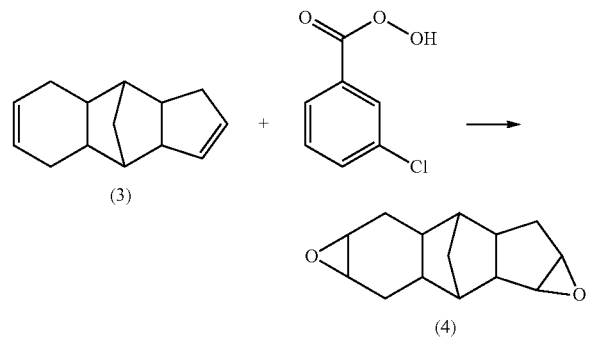

4. Preparation Example 4: Production of Monoepoxy Compound as Reactive Diluent

Production Example of Monoepoxy Compound

Into a reaction vessel equipped with a thermometer, an agitator, a reflux tube and a dropping device, 3,132 g of a diolefin compound represented by the following Formula (7), 3,132 g of toluene and sodium acetate were charged. To the reactor, 3,783 g of a 38% aqueous solution of peracetic acid was added dropwise over five hours, while stirring at −5° C. While continuing to stir the mixture at −5° C., a reaction was allowed to proceed for 17 hours.

Subsequently, a 10% aqueous solution of sodium sulfite was used to carry out a neutralization treatment, followed by a liquid separation operation. The resultant was then subjected to distillation at a pressure of 2 hPa and a bottom temperature of from 130 to 140° C., to obtain 2,109 g of a colorless transparent liquid. In the $^{13}$C-NMR spectrum and the precise mass measurement by LC-MS, the [M+H]$^+$ of the thus obtained liquid was determined to be 191.1439, which corresponds to the theoretical structure. Accordingly, it was confirmed that the resulting liquid was a monoepoxy compound of interest satisfying the following Formula (8). The viscosity of the resulting monoepoxy compound was measured using a Type E viscometer, to be 11.0 mPa·s.

[Chem. 14]

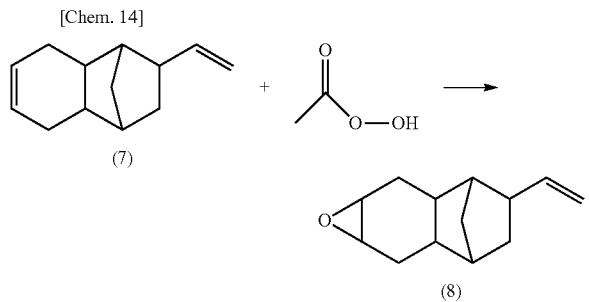

I. Examples of Aspect I of the Present Invention

I-1. Examples I 1: Preparation of Curable Compositions Containing Epoxy Compound (A-2) and Evaluation Thereof (Part 1: Combination with the Other Epoxy Compounds and Thermal Cationic Polymerization Initiator, and Comparison with Dicyclopentadiene Diepoxide (the Other Epoxy Compound (I B-1)))

(1) Example I 1-1

Production of Curable Composition

Tricyclopentadiene diepoxide obtained as the epoxy compound (A-2) by the method described in the above Preparation Example 2, the other epoxy compound (I B-2) and a thermal cationic polymerization initiator were mixed to achieve the following composition, to obtain a curable composition.

<Composition of Curable Composition>
Epoxy compound (A-2) 75 parts by mass (tricyclopentadiene diepoxide obtained by the method described in the above Preparation Example 2)
the other epoxy compound (I B-2) 25 parts by mass (bisphenol A-type liquid epoxy resin, manufactured by Nippon Steel & Sumikin Chemical Co., Ltd., trade name YD-128)
Thermal cationic polymerization initiator (I D-1) 2 parts by mass (an aromatic sulfonium salt: 4-acetoxyphenyldimethylsulfonium hexafluoroantimonate, manufactured by Sanshin Chemical Industry Co., Ltd., trade name: SI-150L)

<Evaluation of Physical Properties>
(Weight Reduction Rate)

The curable composition obtained as described above was heated in a hot air circulating oven at 130° C. for one hour, at 150° C. for one hour, at 190° C. for two hours, and then at 240° C. for one hour, to obtain a cured product. The weight reduction rate of the resulting cured product was calculated as follows, and summarized in Tables I-1 and I-2.

Weight reduction rate (%)=(weight of curable composition−weight of cured product from curable composition)/weight of curable composition× 100

(Heat Resistance)

The glass transition temperature of the cured product obtained as described above was measured by increasing the temperature from 30 to 300° C. at a rate of 10° C./min, using a differential scanning calorimeter, DSC7020, manufactured by Hitachi High-Tech Science Corporation, and the thus measured value was taken as the heat resistance of the cured product. The glass transition temperature as used herein refers to a value measured in accordance with JIS K7121, based on "Midpoint Glass Transition Temperature: T$_{mg}$" described in the section of "Method for Measuring Transition Temperature of Plastics". The measurement results are summarized in Tables I-1 and I-2.

(Overall Evaluation)

The overall evaluation of the curable composition obtained in the above described Example was carried out according to the following evaluation criteria. The evaluation results are summarized in Tables I-1 and I-2.

○: The resulting cured product has a weight reduction rate of less than 5% and a heat resistance of 230° C. or higher.

x: The resulting cured product has a weight reduction rate of 5% or more and/or a heat resistance of less than 230° C., and thus has problems in practical use.

(2) Example I 1-2

A curable composition was obtained in the same manner as in Example I 1-1, except that the composition of the curable composition was changed as described below.

<Composition of Curable Composition>
Epoxy compound (A-2) 60 parts by mass (tricyclopentadiene diepoxide obtained by the method described in the above Preparation Example 2)
the other epoxy compound (I B-3) 40 parts by mass (3,4-epoxycyclohexylmethyl 3,4-epoxycyclohexane carboxylate, manufactured by Daicel Corporation, trade name: CELLOXIDE 2021P, epoxy equivalent: 131 g/eq)
Thermal cationic polymerization initiator (I D-1) 2 parts by mass (an aromatic sulfonium salt: 4-acetoxyphenyldimethylsulfonium hexafluoroantimonate, manufactured by Sanshin Chemical Industry Co., Ltd., trade name: SI-150L)

The curable composition obtained as described above was heated in the same manner as in Example I 1-1, to obtain a cured product.

The weight reduction rate and the glass transition temperature of the thus obtained cured product were measured in the same manner as in Example I 1-1. The measurement results are summarized in Tables I-1 and I-2.

(3) Example I 1-3

A curable composition was obtained in the same manner as in Example I 1-1, except that the composition of the curable composition was changed as shown in Tables I-1 and I-2, to obtain a curable composition.

The curable composition obtained as described above was heated in the same manner as in Example I 1-1, to obtain a cured product.

The weight reduction rate and the glass transition temperature of the thus obtained cured product were measured in the same manner as in Example I 1-1. The measurement results are summarized in Tables I-1 and I-2.

(4) Examples I 1-4 to I 1-7

Curable compositions were obtained in the same manner as in Example I 1-1, except that the compositions of the curable compositions were changed to those shown in Tables I-1 and I-2.

The curable compositions obtained as described above were heated in a hot air circulating oven at 140° C. for one hour, at 180° C. for one hour, and then at 220° C. for two hours, to obtain cured products.

The weight reduction rate and the glass transition temperature of each of the thus obtained cured products were measured in the same manner as in Example I 1-1. The measurement results are summarized in Tables I-1 and I-2.

(5) Comparative Example I 1-1

A curable composition was obtained in the same manner as in Example I 1-1, except that the composition of the curable composition was changed as shown in Tables I-1 and I-2, to obtain a curable composition.

The curable composition obtained as described above was heated in a hot air circulating oven at 140° C. for one hour, at 160° C. for one hour, at 180° C. for one hour, at 220° C. for one hour, and then at 240° C. for two hours, to obtain a cured product.

The weight reduction rate and the glass transition temperature of the thus obtained cured product were measured in the same manner as in Example I 1-1. The measurement results are summarized in Tables I-1 and I-2.

(6) Comparative Examples I 1-2 to I 1-4

Curable compositions were obtained in the same manner as in Example I 1-1, except that the compositions of the curable compositions were changed to those shown in Tables I-1 and I-2.

The curable compositions obtained as described above were heated in a hot air circulating oven at 130° C. for one hour, at 150° C. for one hour, at 180° C. for one hour, and then at 200° C. for two hours, to obtain cured products.

The weight reduction rate and the glass transition temperature of each of the thus obtained cured products were measured in the same manner as in Example I 1-1. The measurement results are summarized in Tables I-1 and I-2.

(7) Comparative Example I 1-5

A curable composition was obtained in the same manner as in Example I 1-1, except that the composition of the curable composition was changed as shown in Tables I-1 and I-2, to obtain a curable composition.

The curable composition obtained as described above was heated in a hot air circulating oven at 110° C. for one hour, at 180° C. for one hour, at then at 220° C. for two hours, to obtain a cured product.

The weight reduction rate and the glass transition temperature of the thus obtained cured product were measured in the same manner as in Example I 1-1. The measurement results are summarized in Tables I-1 and I-2.

(8) Comparative Example I 1-6

A curable composition was obtained in the same manner as in Example I 1-1, except that dicyclopentadiene diepoxide (the other epoxy compound (I B-1)) represented by the following Formula was used instead of tricyclopentadiene diepoxide (epoxy compound (A-2)) in the curable composition.

[Chem. 15]

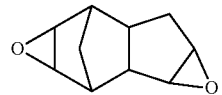

The curable composition obtained as described above was heated in a hot air circulating oven at 130° C. for one hour, at 140° C. for one hour, at 160° C. for one hour, at 190° C. for one hour, and then at 240° C. for two hours, to obtain a cured product.

The weight reduction rate and the glass transition temperature of the thus obtained cured product were measured in the same manner as in Example I 1-1. The measurement results are summarized in Tables I-1 and I-2.

(9) Comparative Examples I 1-7 to I 1-10

Curable compositions were obtained in the same manner as in Example I 1-1, except that the compositions of the curable compositions were changed to those shown in Tables I-1 and I-2.

The curable compositions obtained as described above were heated in a hot air circulating oven at 130° C. for one hour, at 140° C. for one hour, at 160° C. for one hour, at 190° C. for one hour, and then at 240° C. for two hours, to obtain cured products.

The weight reduction rate and the glass transition temperature of each of the thus obtained cured products were measured in the same manner as in Example I 1-1. The measurement results are summarized in Tables I-1 and I-2.

(Overall Evaluation)

The overall evaluation of each of the curable compositions obtained in the above described Examples I 1-2 to I 1-7 and Comparative Examples I 1-1 to I 1-10 was carried out according to the evaluation criteria described in Example I 1-1. The evaluation results are summarized in Tables I-1 and I-2.

TABLE 1

| Table I-1 | | Example I 1-1 | Example I 1-2 | Example I 1-3 | Example I 1-4 | Example I 1-5 | Example I 1-6 | Example I 1-7 |
|---|---|---|---|---|---|---|---|---|
| Composition of curable | Epoxy compound (A-2) | 75 | 60 | 50 | 25 | 75 | 50 | 25 |

TABLE 1-continued

| Table I-1 | | Example I 1-1 | Example I 1-2 | Example I 1-3 | Example I 1-4 | Example I 1-5 | Example I 1-6 | Example I 1-7 |
|---|---|---|---|---|---|---|---|---|
| composition (parts by mass) | the other epoxy compound (I B-2) | 25 | | 50 | 75 | | | |
| | the other epoxy compound (I B-3) | | 40 | | | 25 | 50 | 75 |
| | Thermal cationic polymerization initiator (I D-1) | 2 | 2 | 2 | 2 | 2 | 2 | 2 |
| Weight reduction rate of cured product (%) | | 0 | 3 | 0 | 0 | 0 | 1 | 0 |
| Heat resistance (° C.) | | 247 | 253 | 257 | 258 | 245 | 247 | 234 |
| Overall evaluation | | ○ | ○ | ○ | ○ | ○ | ○ | ○ |

TABLE 2

| Table I-2 | | Comparative Example I 1-1 | Comparative Example I 1-2 | Comparative Example I 1-3 | Comparative Example I 1-4 | Comparative Example I 1-5 | Comparative Example I 1-6 | Comparative Example I 1-7 | Comparative Example I 1-8 | Comparative Example I 1-9 | Comparative Example I 1-10 |
|---|---|---|---|---|---|---|---|---|---|---|---|
| Composition of curable composition (parts by mass) | Epoxy compound (A-2) | | | | | | | | | | |
| | the other epoxy compound (I B-1) | | | | | | 75 | 50 | 25 | 75 | 50 |
| | the other epoxy compound (I B-2) | 100 | 75 | 50 | 25 | | 25 | 50 | 75 | | |
| | the other epoxy compound (I B-3) | | 25 | 50 | 75 | 100 | | | | 25 | 75 |
| | Thermal cationic polymerization initiator (I D-1) | 2 | 2 | 2 | 2 | 1 | 2 | 2 | 2 | 2 | 2 |
| Weight reduction rate of cured product (%) | | 1 | 0 | 1 | 1 | 1 | 19 | 15 | 8 | 7 | 5 |
| Heat resistance (° C.) | | 188 | 220 | 157 | 188 | 175 | 262 | 248 | 239 | 264 | 161 |
| Overall evaluation | | x | x | x | x | x | x | x | x | x | x |

I-2. Examples I 2: Preparation of Curable Compositions Containing Epoxy Compound (A-2) and Evaluation Thereof (Part 2: Combination with the Other Epoxy Compounds, Oxetane Compound, and Thermal Cationic Polymerization Initiator)

(1) Example I 2-1

Production of Curable Composition

Tricyclopentadiene diepoxide (epoxy compound (A-2)) obtained in the above described Preparation Example 2, an oxetane compound and a thermal cationic polymerization initiator were mixed to achieve the following composition, to obtain a curable composition.

<Composition of Curable Composition>

| | |
|---|---|
| Epoxy compound (A-2) (tricyclopentadiene diepoxide obtained by the method described in the above Preparation Example 2) | 75 parts by mass |
| Oxetane compound (I C-1) (1,4-bis[(3-ethyl-3-oxetanylmethoxy)methyl]benzene, manufactured by Toagosei Co., Ltd., trade name: ARONE OXETANE OXT-121) | 25 parts by mass |
| Thermal cationic polymerization initiator (I D-1) (an aromatic sulfonium salt, 4-acetoxyphenyldimethylsulfonium hexafluoroantimonate, manufactured by Sanshin Chemical Industry Co. Ltd., trade name: SI-150L) | 2 parts by mass |

The curable composition obtained as described above was heated in a hot air circulating oven at 100° C. for one hour, at 130° C. for one hour, at 160° C. for one hour, and then at 230° C. for two hours, to obtain a cured product.

The glass transition temperature of the thus obtained cured product was measured in the same manner as in Example I 1-1. The measurement results are summarized in Table 1-3.

(2) Examples I 2-2 to I 2-3

Curable compositions were obtained in the same manner as in Example I 2-1, except that the compositions of the curable compositions were changed to those shown in Table 1-3.

The curable compositions obtained as described above were heated in the same manner as in Example I 2-1, to obtain cured products.

The glass transition temperature of each of the thus obtained cured products was measured in the same manner as in Example I 2-1. The measurement results are summarized in Table 1-3.

(3) Comparative Examples I 2-1 to I 2-3

Curable compositions were obtained in the same manner as in Example I 2-1, except that the compositions of the curable compositions were changed to those shown in Table 1-3.

The curable compositions obtained as described above were heated in a hot air circulating oven at 130° C. for one hour, at 150° C. for one hour, at then at 180° C. for two hours, to obtain cured products.

The glass transition temperature of each of the thus obtained cured products was measured in the same manner as in Example I 2-1. The measurement results are summarized in Table 1-3.

(4) Comparative Examples I 2-4 and I 2-5

Curable compositions were obtained in the same manner as in Example I 2-1, except that the compositions of the curable compositions were changed to those shown in Table 1-3.

The curable compositions obtained as described above were heated in a hot air circulating oven at 120° C. for one hour, at 140° C. for one hour, and then at 220° C. for two hours, to obtain cured products.

The glass transition temperature of each of the thus obtained cured products was measured in the same manner as in Example I 1-1. The measurement results are summarized in Table 1-3.

(5) Comparative Example I 2-6

A curable composition was obtained in the same manner as in Example I 2-1, except that the composition of the curable composition was changed to that shown in Table I-3.

The curable composition obtained as described above was heated in a hot air circulating oven at 110° C. for one hour, at 130° C. for one hour, and then at 240° C. for two hours, to obtain a cured product.

The glass transition temperature of the thus obtained cured product was measured in the same manner as in Example I 1-1. The measurement results are summarized in Table 1-3.

I-3. Examples I 3: Preparation of Curable Compositions Containing Epoxy Compound (A-2) and Evaluation Thereof (Part 3: Combination with the Other Epoxy Compounds and Thermal Cationic Polymerization Initiator)

(1) Examples I 3-1 to I 3-7 and Comparative Examples I 3-1 to I 3-7

Curable compositions were prepared in the same manner as in Example I 1-1, except that the following components were used at the compositions shown in Tables I-4 and 1-5.
(i) Epoxy Compound (A-2)
Tricyclopentadiene diepoxide obtained by the method described in the above Preparation Example 2 was used.
(ii) The Other Epoxy Compound (I B-1)
Dicyclopentadiene diepoxide described in the above Comparative Example I 1-6 was used.
(iii) The Other Epoxy Compound (I B-2)
A bisphenol A-type liquid epoxy resin, manufactured by Nippon Steel & Sumikin Chemical Co., Ltd., trade name: YD-128, was used.
(iv) The Other Epoxy Compound (I B-3)
3',4'-Epoxycyclohexylmethyl 3,4-epoxycyclohexane carboxylate, manufactured by Daicel Corporation, trade name: CELLOXIDE 2021P, was used.
(v) The Other Epoxy Compound (I B-6)
A bisphenol F-type liquid epoxy resin, manufactured by Nippon Steel & Sumikin Chemical Co., Ltd., trade name: YDF-170, was used.
(vi) The Other Epoxy Compound (I B-8)
Triglycidyl isocyanurate, manufactured by Nissan Chemical Industries, Ltd., trade name: TEPIC-S, was used.
(vii) The Other Epoxy Compound (I B-10)
Cyclohexanedicarboxylic acid diglycidyl ester, a reagent manufactured by Tokyo Chemical Industry Co., Ltd., was used.
(viii) The Other Epoxy Compound (I B-12)
1,2-Epoxy-(2-oxiranyl)cyclohexane adduct of 2,2-bis(hydroxymethyl)-1-butanol, manufactured by Daicel Corporation, trade name: EHPE 3150, was used.

TABLE 3

| Table I-3 | | Example I 2-1 | Example I 2-2 | Example I 2-3 | Comparative Example I 2-1 | Comparative Example I 2-2 | Comparative Example I 2-3 | Comparative Example I 2-4 | Comparative Example I 2-5 | Comparative Example I 2-6 |
|---|---|---|---|---|---|---|---|---|---|---|
| Composition of curable composition (parts by mass | Epoxy compound (A-2) | 75 | 60 | 25 | | | | | | |
| | the other epoxy compound (I B-2) | | | | 75 | | | 75 | | |
| | the other epoxy compound (I B-3) | | | | | 75 | 50 | | 75 | |
| | the other epoxy compound (I B-14) | | | | | | | | | 75 |
| | Oxetane compound (I C-1) | 25 | 50 | 75 | 25 | 25 | 50 | 25 | 25 | 25 |
| | Thermal cationic polymerization initiator (I D-1) | 2 | 2 | 2 | 2 | 2 | 2 | 2 | 2 | 2 |
| Heat resistance (° C.) | | 185 | 181 | 180 | 166 | 96 | 120 | 175 | 160 | 153 |

(ix) The Other Epoxy Compound (I B-15)

An epoxy compound produced by the method described in Example 3 in JP 49-126658 A was used.

(x) The Other Epoxy Compound (I B-16)

Tetrahydroindene diepoxide produced by the method described in JP 2012-116390 A was used.

(xi) The Other Epoxy Compound (I B-17)

1,2-Epoxy-4-vinylcyclohexane, manufactured by Daicel Corporation, trade name: CELLOXIDE 2000, was used.

(xii) Thermal Cationic Polymerization Initiator (I D-1)

4-Acetoxyphenyldimethylsulfonium hexafluoroantimonate, manufactured by Sanshin Chemical Industry Co., Ltd., trade name: SI-150L, was used.

(2) Evaluation of Physical Properties (Weight Reduction Rate of Cured Product from Curable Composition)

Each of the curable compositions obtained as described above was heated under each of the following conditions, to obtain a cured product.

(a) Example I 3-1

The curable composition obtained as described above was heated in a hot air circulating oven at 170° C. for one hour, at 190° C. for one hour, and then at 220° C. for two hours, to obtain a cured product.

(b) Example I 3-2

The curable composition obtained as described above was heated in a hot air circulating oven at 110° C. for one hour, at 140° C. for one hour, and then at 220° C. for two hours, to obtain a cured product.

(c) Example I 3-3

The curable composition obtained as described above was heated in a hot air circulating oven at 120° C. for one hour, at 180° C. for one hour, and then at 230° C. for two hours, to obtain a cured product.

(d) Example I 3-4

The curable composition obtained as described above was heated in a hot air circulating oven at 150° C. for one hour, at 170° C. for one hour, and then at 220° C. for two hours, to obtain a cured product.

(e) Example I 3-5

The curable composition obtained as described above was heated in a hot air circulating oven at 160° C. for one hour, and then at 220° C. for two hours, to obtain a cured product.

(f) Example I 3-6

The curable composition obtained as described above was heated in a hot air circulating oven at 150° C. for one hour, at 180° C. for one hour, and then at 220° C. for two hours, to obtain a cured product.

(g) Example I 3-7

The curable composition obtained as described above was heated in a hot air circulating oven at 140° C. for one hour, at 160° C. for one hour, and then at 220° C. for two hours, to obtain a cured product.

(a') Comparative Example I 3-1

The curable composition obtained as described above was heated in a hot air circulating oven at 110° C. for one hour, and then at 240° C. for two hours, to obtain a cured product.

(b') Comparative Example I 3-2

The curable composition obtained as described above was heated in a hot air circulating oven at 110° C. for one hour, at 170° C. for one hour, and then at 220° C. for two hours, to obtain a cured product.

(d') Comparative Example I 3-3

The curable composition obtained as described above was heated in a hot air circulating oven at 130° C. for one hour, at 190° C. for one hour, and then at 230° C. for two hours, to obtain a cured product.

(c') Comparative Example I 3-4

The curable composition obtained as described above was heated in a hot air circulating oven at 120° C. for one hour, at 140° C. for one hour, and then at 220° C. for two hours, to obtain a cured product.

(d') Comparative Example I 3-5

The curable composition obtained as described above was heated in a hot air circulating oven at 150° C. for one hour, at 170° C. for one hour, and then at 210° C. for two hours, to obtain a cured product.

(e') Comparative Example I 3-6

The curable composition obtained as described above was heated in a hot air circulating oven at 130° C. for one hour, at 150° C. for one hour, at 180° C. for one hour, and then at 220° C. for three hours, to obtain a cured product.

(f') Comparative Example I 3-7

The curable composition obtained as described above was heated in a hot air circulating oven at 120° C. for one hour, at 130° C. for one hour, and then at 190° C. for two hours, to obtain a cured product.

The weight reduction rate of each of the cured products obtained as described above was calculated in the same manner as in Example I 1-1. The measurement results are summarized in Tables I-4 and I-5.

(Heat Resistance of Cured Product from Curable Composition)

The heat resistance of each of the cured products obtained as described above was measured in the same manner as in Example I 1-1. The measurement results are summarized in Tables I-4 and I-5.

(Overall Evaluation)

The overall evaluation of each of the curable compositions obtained in the above described Examples was carried out according to the following evaluation criteria. The evaluation results are summarized in Tables 1-4 and I-5.
o: The resulting cured product has a weight reduction rate of 5% or less and a heat resistance of 220° C. or higher.
x: The resulting cured product has a weight reduction rate of more than 5% and/or a heat resistance of less than 220° C., and thus has problems in practical use.

(ii) The Other Epoxy Compound (I B-1)
Dicyclopentadiene diepoxide described in the above Comparative Example I 1-6 was used.
(iii) The Other Epoxy Compound (I B-2)
A bisphenol A-type liquid epoxy resin, manufactured by Nippon Steel & Sumikin Chemical Co., Ltd., trade name: YD-128, was used.

TABLE 4

| Table I-4 | | Example I 3-1 | Example I 3-2 | Example I 3-3 | Example I 3-4 | Comparative Example I 3-1 | Comparative Example I 3-2 | Comparative Example I 3-3 | Comparative Example I 3-4 |
|---|---|---|---|---|---|---|---|---|---|
| Composition of curable composition (parts by mass) | Epoxy compound (A-2) | 25 | 50 | 50 | 50 | | | | |
| | the other epoxy compound (I B-3) | 25 | 25 | | 37.5 | 50 | 50 | | 87.5 |
| | the other epoxy compound (I B-6) | | | 50 | | | | 100 | |
| | the other epoxy compound (I B-8) | 50 | | | | 50 | | | |
| | the other epoxy compound (I B-12) | | 25 | | | | 50 | | |
| | the other epoxy compound (I B-17) | | | | 12.5 | | | | 12.5 |
| | Thermal cationic polymerization initiator (I D-1) | 2 | 2 | 2 | 2 | 2 | 2 | 2 | 2 |
| Weight reduction rate of cured product (%) | | 0 | 0 | 0 | 2 | 7 | 0 | 2 | 2 |
| Heat resistance (° C.) | | 237 | 226 | 252 | 238 | 134 | 199 | 144 | 200 |
| Overall evaluation | | o | o | o | o | x | x | x | x |

TABLE 5

| Table I-5 | | Example I 3-5 | Example I 3-6 | Example I 3-7 | Comparative Example I 3-5 | Comparative Example I 3-6 | Comparative Example I 3-7 |
|---|---|---|---|---|---|---|---|
| Composition of curable composition (parts by mass) | Epoxy compound (A-2) | 50 | 50 | 50 | | 50 | |
| | the other epoxy compound (I B-1) | | | | 50 | | |
| | the other epoxy compound (I B-2) | | | 25 | | | |
| | the other epoxy compound (I B-10) | 50 | | | 100 | | |
| | the other epoxy compound (I B-15) | | 25 | | | | 100 |
| | the other epoxy compound (I B-16) | | | 50 | | 50 | |
| | Thermal cationic polymerization initiator (I D-1) | 2 | 2 | 2 | 2 | 2 | 2 |
| Weight reduction rate of cured product (%) | | 0 | 1 | 5 | 1 | 1 | 7 |
| Heat resistance (° C.) | | 225 | 223 | 232 | 90 | 198 | 197 |
| Overall evaluation | | o | o | o | x | x | x |

I-4. Examples I 4: Preparation of Curable Compositions Containing Epoxy Compound (A-2) and Evaluation Thereof (Part 4: Combination with Various Types of Thermal Cationic Polymerization Initiators)

(1) Examples I 4-1 to I 4-5 and Comparative Examples I 4-1 to I 4-5

Curable compositions were prepared in the same manner as in Example I 1-1, except that the following components were used at the compositions shown in Tables I-6 and I-7.
(i) Epoxy Compound (A-2)
Tricyclopentadiene diepoxide obtained by the method described in the above Preparation Example 2 was used.

(iv) The Other Epoxy Compound (I 8-3)
3',4'-Epoxycyclohexylmethyl 3,4-epoxycyclohexane carboxylate, manufactured by Daicel Corporation, trade name: CELLOXIDE 2021P, was used.
(v) Thermal Cationic Polymerization Initiator (I D-3)
Bis[4-(di(4-(2-hydroxyethoxy))phenylsulfonio)phenyl] sulfide bishexafluoroantimonate, manufactured by ADEKA CORPORATION, ADEKA ARKLS SP-170, was used.
(vi) Thermal Cationic Polymerization Initiator (I D-4)
Diphenyl-4-(phenylthio)phenylsulfonium hexafluoroantimonate, manufactured by San-Apro Ltd., CPI-101A, was used.

(vii) Thermal Cationic Polymerization Initiator (I D-5)

4-Methylphenyl-4-(1-methylethyl)phenyliodonium tetrakis(pentafluorophenyl)borate, a reagent manufactured by Tokyo Chemical Industry Co., Ltd., was used.

(2) Evaluation of Physical Properties (Weight Reduction Rate of Cured Product of Curable Composition)

Each of the curable compositions obtained as described above was heated under each of the following conditions, to obtain a cured product.

(a) Example I 4-1

The curable composition obtained as described above was heated in a hot air circulating oven at 70° C. for one hour, at 130° C. for one hour, and then at 240° C. for two hours, to obtain a cured product.

(b) Example I 4-2

The curable composition obtained as described above was heated in a hot air circulating oven at 80° C. for one hour, at 140° C. for one hour, and then at 180° C. for two hours, to obtain a cured product.

(c) Example I 4-3

The curable composition obtained as described above was heated in a hot air circulating oven at 140° C. for one hour, at 160° C. for one hour, and then at 220° C. for two hours, to obtain a cured product.

(d) Example I 4-4

The curable composition obtained as described above was heated in a hot air circulating oven at 70° C. for one hour, at 140° C. for one hour, and then at 200° C. for two hours, to obtain a cured product.

(e) Example I 4-5

The curable composition obtained as described above was heated in a hot air circulating oven at 90° C. for one hour, and then at 240° C. for two hours, to obtain a cured product.

(a') Comparative Example I 4-1

The curable composition obtained as described above was heated in a hot air circulating oven at 70° C. for one hour, at 130° C. for one hour, and then at 170° C. for two hours, to obtain a cured product.

(b') Comparative Example I 4-2

The curable composition obtained as described above was heated in a hot air circulating oven at 80° C. for one hour, at 140° C. for one hour, and then at 180° C. for two hours, to obtain a cured product.

(c') Comparative Example I 4-3

The curable composition obtained as described above was heated in a hot air circulating oven at 130° C. for one hour, at 150° C. for one hour, and then at 230° C. for two hours, to obtain a cured product.

(d') Comparative Example I 4-4

The curable composition obtained as described above was heated in a hot air circulating oven at 80° C. for one hour, at 120° C. for one hour, and then at 240° C. for two hours, to obtain a cured product.

(e') Comparative Example I 4-5

The curable composition obtained as described above was heated in a hot air circulating oven at 120° C. for one hour, and then at 140° C. for two hours, to obtain a cured product.

The weight reduction rate of each of the cured products obtained as described above was calculated in the same manner as in Example I 1-1. The measurement results are summarized in Tables I-6 and I-7.

(Heat Resistance of Cured Product from Curable Composition)

The heat resistance of each of the cured products obtained as described above was measured in the same manner as in Example I 1-1. The measurement results are summarized in Tables I-6 and I-7.

(Overall Evaluation)

The overall evaluation of each of the curable compositions obtained in the above described Examples was carried out according to the following evaluation criteria. The evaluation results are summarized in Tables 1-6 and 1-7.

○: The resulting cured product has a weight reduction rate of 5% or less and a heat resistance of 130° C. or higher.

x: The resulting cured product has a weight reduction rate of more than 5% and/or a heat resistance of less than 130° C., and thus has problems in practical use.

TABLE 6

| Table I-6 | | Example I 4-1 | Example I 4-2 | Example I 4-3 | Comparative Example I 4-1 | Comparative Example I 4-2 | Comparative Example I 4-3 |
|---|---|---|---|---|---|---|---|
| Composition of curable composition (parts by mass) | Epoxy compound (A-2) | 50 | 50 | 50 | | | |
| | the other epoxy compound (I B-1) | | | | | 100 | |
| | the other epoxy compound (I B-2) | | 50 | | | | |
| | the other epoxy compound (I B-3) | 50 | | 50 | 100 | | 100 |

TABLE 6-continued

| Table I-6 | Example I 4-1 | Example I 4-2 | Example I 4-3 | Comparative Example I 4-1 | Comparative Example I 4-2 | Comparative Example I 4-3 |
|---|---|---|---|---|---|---|
| Thermal cationic polymerization initiator (I D-4) | 2 | 2 | | 2 | 2 | |
| Thermal cationic polymerization initiator (I D-5) | | | 2 | | | 2 |
| Weight reduction rate of cured product (%) | 0 | 0 | 0 | 0 | 0 | 11 |
| Heat resistance (° C.) | 261 | 239 | 134 | 123 | 110 | 87 |
| Overall evaluation | ○ | ○ | ○ | x | x | x |

TABLE 7

| Table I-7 | | Example I 4-4 | Example I 4-5 | Comparative Example I 4-4 | Comparative Example I 45 |
|---|---|---|---|---|---|
| Composition of curable composition (parts by mass) | Epoxy compound (A-2) | 50 | 50 | | |
| | the other epoxy compound (I B-2) | | 50 | | 100 |
| | the other epoxy compound (I B-3) | 50 | | 100 | |
| | Thermal cationic polymerization initiator (I D-3) | 2 | 2 | 2 | 2 |
| Weight reduction rate of cured product (%) | | 0 | 3 | 3 | 7 |
| Heat resistance (° C.) | | 133 | 248 | 109 | 230 |
| Overall evaluation | | ○ | ○ | x | x |

I-5. Examples I 5: Preparation of Curable Compositions Containing Epoxy Compound (A-2) and Evaluation Thereof (Part 5: Combination with Various Types of Oxetane Compounds and Thermal Cationic Polymerization Initiator)

(1) Examples I 5-1 and I 5-2, and Comparative Examples I 5-1 to I 5-5

Curable compositions were obtained in the same manner as in Example I 1-1, except that the following components were used at the compositions shown in Table I-8.

(i) Epoxy Compound (A-2)

Tricyclopentadiene diepoxide obtained by the method described in the above Preparation Example 2 was used.

(ii) The Other Epoxy Compound (I B-2)

A bisphenol A-type liquid epoxy resin, manufactured by Nippon Steel & Sumikin Chemical Co., Ltd., trade name: YD-128, was used.

(iii) The Other Epoxy Compound (I B-3)

3',4'-Epoxycyclohexyl methyl 3,4-epoxycyclohexane carboxylate, manufactured by Dalcel Corporation, trade name: CELLOXIDE 2021P, was used.

(iv) The Other Epoxy Compound (I B-14)

(3,3',4,4'-Diepoxy)bicyclohexyl produced by the method described in JP 2004-099467 A was used.

(v) Oxetane Compound (I C-2)

3-Ethyl-3-hydroxymethyloxetane, manufactured by Toagosel Co., Ltd., trade name: ARONE OXETANE OXT-101, was used.

(vi) Oxetane Compound (I C-3)

DI[(3-ethyl-3-oxetanyl)methyl]ether, manufactured by Toagosel Co., Ltd., trade name: ARONE OXETANE OXT-221, was used.

(vii) Oxetane Compound (I C-4)

3-Ethyl-3-(2-ethylhexyloxymethyl)oxetane, manufactured by Toagosel Co., Ltd., trade name: ARONE OXETANE OXT-212, was used.

(viii) Thermal Cationic Polymerization Initiator (I D-1)

4-Acetoxyphenyldimethylsulfonium hexafluoroantimonate, manufactured by Sanshin Chemical Industry Co., Ltd., trade name: SI-150L, was used.

(2) Evaluation of Physical Properties (Weight Reduction Rate of Cured Product from Curable Composition)

Each of the curable compositions obtained as described above was heated under each of the following conditions, to obtain a cured product.

(a) Example I 5-1

The curable composition obtained as described above was heated in a hot air circulating oven at 130° C. for one hour, at 140° C. for one hour, at 180° C. for one hour, at 220° C. for one hour, and then at 240° C. for two hours, to obtain a cured product.

(b) Example I 5-2

The curable composition obtained as described above was heated in a hot air circulating oven at 140° C. for one hour, at 170° C. for one hour, and then at 220° C. for two hours, to obtain a cured product.

(a') Comparative Example I 5-1

The curable composition obtained as described above was heated in a hot air circulating oven at 110° C. for one hour, at 130° C. for one hour, and then at 220° C. for two hours, to obtain a cured product.

(b') Comparative Example I 5-2

The curable composition obtained as described above was heated in a hot air circulating oven at 110° C. for one hour, at 140° C. for one hour, and then at 240° C. for two hours, to obtain a cured product.

(c') Comparative Example I 5-3

The curable composition obtained as described above was heated in a hot air circulating oven at 110° C. for one hour, at 120° C. for one hour, and then at 220° C. for two hours, to obtain a cured product.

(d') Comparative Example I 5-4

The curable composition obtained as described above was heated in a hot air circulating oven at 70° C. for one hour, at 120° C. for one hour, at 150° C. for one hour, and then at 230° C. for two hours, to obtain a cured product.

(e') Comparative Example I 5-5

The curable composition obtained as described above was heated in a hot air circulating oven at 130° C. for one hour, at 170° C. for one hour, and then at 220° C. for two hours, to obtain a cured product.

The weight reduction rate of each of the cured products obtained as described above was calculated in the same manner as in Example I 1-1. The measurement results are summarized in Table 1-8.

(Heat Resistance of Cured Product of Curable Composition)

The heat resistance of each of the cured products obtained as described above was measured in the same manner as in Example I 1-1. The measurement results are summarized in Table 1-8.

(Overall Evaluation)

The overall evaluation of each of the curable compositions obtained in the above described Examples was carried out according to the following evaluation criteria. The evaluation results are summarized in Table 1-8.

○: The resulting cured product has a weight reduction rate of 5% or less and a heat resistance of 180° C. or higher.

x: The resulting cured product has a weight reduction rate of more than 5% and/or a heat resistance of less than 180° C., and thus has problems in practical use.

TABLE 8

| Table I-8 | | Example I 5-1 | Example I 5-2 | Comparative Example I 5-1 | Comparative Example I 5-2 | Comparative Example I 5-3 | Comparative Example I 5-4 | Comparative Example I 5-5 |
|---|---|---|---|---|---|---|---|---|
| Composition of curable composition (parts by mass) | Epoxy compound (A-2) | 75 | 75 | | | | | |
| | the other epoxy compound (I B-2) | | | 75 | | | 75 | 75 |
| | the other epoxy compound (I B-3) | | | | 75 | | | |
| | the other epoxy compound (I B-14) | | | | | 75 | | |
| | Oxetane compound (I C-2) | | | | | | 25 | |
| | Oxetane compound (I C-3) | 25 | | 25 | 25 | 25 | | |
| | Oxetane compound (I C-4) | | 25 | | | | | 25 |
| | Thermal cationic polymerization initiator (I D-1) | 2 | 2 | 2 | 2 | 2 | 2 | 2 |
| Weight reduction rate of cured product (%) | | 2 | 5 | 2 | 2 | 2 | 11 | 8 |
| Heat resistance (° C.) | | 185 | 235 | 160 | 116 | 137 | 145 | 124 |
| Overall evaluation | | ○ | ○ | x | x | x | x | x |

II. Examples of Aspect II of the Present Invention

II-1, Examples II 1: Preparation of Curable
Compositions Containing Epoxy Compound (A-2)
and Evaluation Thereof (Part 1: Evaluation in the
Case of Using Acid Anhydride-Based Curing
Agent)

(1) Example II 1-1

Production of Curable Composition

The epoxy compound (A-2) (tricyclopentadiene diepoxide) obtained as described above, the other epoxy compound (II B-2), an acid anhydride-based curing agent, a curing accelerator and a polymerization initiator were mixed to achieve the following composition, to obtain a curable composition.

<Composition of Curable Composition>

| | |
|---|---|
| Epoxy compound (A-2) (tricyclopentadiene diepoxide obtained by the method described in the above Preparation Example 2) | 50 parts by mass |
| the other epoxy compound (II B-2) (bisphenol A-type liquid epoxy resin, manufactured by Nippon Steel & Sumikin Chemical Co., Ltd., trade name YD-128) | 50 parts by mass |
| Acid anhydride-based curing agent (a mixture of 4-methylhexahydrophthalic anhydride and hexahydrophthalic anhydride, manufactured by New Japan Chemical Co., Ltd., trade name: MH-700; an amount corresponding to 0.9 equivalent with respect to one equivalent of the epoxy compound (A-2) (tricyclopentadiene diepoxide)) | 106 parts by mass |
| Curing accelerator (II C-1) (2-ethyl-4-methylimidazole, manufactured by Shikoku Chemicals Corporation, trade name: 2E4MZ) | 1 part by mass |
| Compound containing a hydroxyl group (ethylene glycol, a reagent manufactured by Wako Pure Chemical Industries Ltd.) | 5 parts by mass |

The curable composition obtained as described above was heated in a hot air circulating oven at 120° C. for two hours, at 190° C. for one hour, and then at 240° C. for two hours, to obtain a cured product.

The glass transition temperature of the cured product obtained as described above was measured by increasing the temperature from 30 to 300° C. at a rate of 10° C./min, using a differential scanning calorimeter, DSC7020, manufactured by Hitachi High-Tech Science Corporation, and the thus measured value was taken as the heat resistance of the cured product. The glass transition temperature as used herein refers to a value measured in accordance with JIS K7121, based on "Midpoint Glass Transition Temperature: $T_{mg}$" described in the section of "Method for Measuring Transition Temperature of Plastics". The measurement results are summarized in Table II-1.

(2) Comparative Example II 1-1

A curable composition was obtained in the same manner as in Example II 1-1, except that the composition of the curable composition was changed to that shown in Table II-1.

The curable composition obtained as described above was heated in a hot air circulating oven at 100° C. for two hours, and then at 160° C. for four hours, to obtain a cured product.

The glass transition temperature of the thus obtained cured product was measured in the same manner as in Example II 1-1. The measurement results are summarized in Table II-1.

(3) Comparative Example II 1-2

A curable composition was obtained in the same manner as in Comparative Example II 1-1, except that a curing accelerator (II C-2) (tetra-n-butylsulfonium-o,o-diethyl phosphorodithionate, manufactured by Nippon Chemical Industrial Co., Ltd., trade name: HISHICOLIN PX-4ET) was used instead of the curing accelerator (II C-1) in the curable composition.

The curable composition obtained as described above was heated in the same manner as in Comparative Example II 1-1, to obtain a cured product.

The glass transition temperature of the thus obtained cured product was measured in the same manner as in Example II 1-1. The measurement results are summarized in Table II-1.

(4) Comparative Example II 1-3

A curable composition was obtained in the same manner as in Example II 1-1, except that 34 parts by mass of an amine-based curing agent (1,3-bisaminomethylcyclohexane; a reagent manufactured by Tokyo Chemical Industry Co., Ltd.) was used instead of the acid anhydride-based curing agent in the curable composition, and that no curing accelerator was used.

The curable composition obtained as described above was heated in a hot air circulating oven at 100° C. for one hour, at 120° C. for one hour, and then at 150° C. for one hour to cure the composition. However, a curing failure occurred due to the volatilization of the curing agent during the heating, and the composition had problems in practical use.

(5) Comparative Example II 1-4

A curable composition was obtained in the same manner as in Example II 1-1, except that a phenol-based curing agent (a phenol novolac resin, manufactured by DIC Corporation trade name: TD-2131) was used instead of the acid anhydride-based curing agent, and a curing accelerator (II C-9) was used instead of the curing accelerator (II C-1), in the curable composition.

The curable composition obtained as described above was heated in a hot air circulating oven at 100° C. for one hour, at 120° C. for one hour, and then at 150° C. for one hour to cure the composition. However, the composition could not be sufficiently cured, and had problems in practical use.

II-2. Examples II 2: Preparation of Curable
Compositions Containing Epoxy Compound (A-2)
and Evaluation Thereof (Part 2: Combination with
Acid Anhydride-Based Curing Agent and Various
Types of Curing Accelerators)

(1) Examples II 2-1 to II 2-11

Production of Curable Compositions

Curable compositions were obtained in the same manner as in Example II 1-1, except that the compositions of the curable compositions were changed to those shown in Tables II-2 and II-3.

The curable compositions obtained as described above were heated in a hot air circulating oven at 100° C. for one hour, at 110° C. for one hour, at 120° C. for two hours, at 190° C. for one hour, and then at 240° C. for two hours, to obtain cured products.

The glass transition temperature of each of the thus obtained cured products was measured in the same manner as in Example II 1-1. The measurement results are summarized in Tables II-2 and II-3.

(2) Examples II 2 to II 12

Production of Curable Compositions

Curable compositions were obtained in the same manner as in Example II 1-1, except that the compositions of the curable compositions were changed to those shown in Tables II-2 and 11-3.

The curable compositions obtained as described above were heated in a hot air circulating oven at 120° C. for two hours, at 190° C. for one hour, and then at 240° C. for two hours, to obtain cured products.

The glass transition temperature of each of the thus obtained cured products was measured in the same manner as in Example II 1-1. The measurement results are summarized in Tables II-2 and II-3.

(3) Comparative Examples II 2-1 and II 2-2

Production of Curable Compositions

Curable compositions were obtained in the same manner as in Example II 1-1, except that the compositions of the curable compositions were changed to those shown in Tables II-2 and II-3.

The curable compositions obtained as described above were heated in a hot air circulating oven at 100° C. for two hours, and then at 160° C. for six hours, to obtain cured products.

The glass transition temperature of each of the thus obtained cured products was measured in the same manner as in Example II 1-1. The measurement results are summarized in Tables II-2 and 11-3.

(4) Comparative Example II 2-3

A curable composition was obtained in the same manner as in Example II 2-1, except that dicyclopentadiene diepoxide (the other epoxy compound (II B-1)) represented by the following Formula was used instead of the epoxy compound (A-2) (tricyclopentadiene diepoxide) In the curable composition. Note, however, that since the measured value (170 g/eq) of the epoxy equivalent of the epoxy compound (II B-1) did not coincide with the theoretical value (82 g/eq) of the epoxy equivalent of the epoxy compound (II B-1) calculated from the chemical structure of the epoxy compound (II B-1), the theoretical value 82 g/eq was used as the epoxy equivalent of the epoxy compound (II B-1), when determining the content of the acid anhydride-based curing agent.

[Chem. 16]

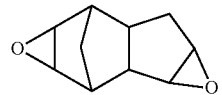

The curable composition obtained as described above was heated in a hot air circulating oven at 100° C. for two hours, and then at 160° C. for six hours to cure the composition. However, the composition was not cured and remained in a state of liquid.

II-3. Examples I 3: Preparation of Curable Compositions Containing Epoxy Compound (A-2) and Evaluation Thereof (Part 3: Comparison with the Case in which Epoxy Compound (A-2) and Compound Containing Hydroxy Group are not Incorporated)

(1) Example II 3-1

A curable composition was obtained in the same manner as in Example II 1-1, except that the composition of the curable composition was changed to that shown in Table 11-4.

The curable composition obtained as described above was heated in a hot air circulating oven at 120° C. for two hours, at 190° C. for one hour, and then at 240° C. for two hours, to obtain a cured product.

The glass transition temperature of the thus obtained cured product was measured in the same manner as in Example II 1-1. The measurement results are summarized in Table II-4.

(2) Comparative Example II 3-1

A curable composition was obtained in the same manner as in Example II 1-1, except that the composition of the curable composition was changed to that shown in Table 11-4.

The curable composition obtained as described above was heated in a hot air circulating oven at 110° C. for two hours, at 180° C. for four hours, and then at 220° C. for two hours, to obtain a cured product.

The glass transition temperature of the thus obtained cured product was measured in the same manner as in Example II 1-1. The measurement results are summarized in Table 11-4.

TABLE 9

| Table II-1 | | Example II 1-1 | Comparative Example II 1-1 | Comparative Example II 1-2 | Comparative Example II 1-3 | Comparative Example II 1-4 |
|---|---|---|---|---|---|---|
| Composition of curable composition (parts by mass) | Epoxy compound (A-2) | 50 | | | 100 | 100 |
| | the other epoxy compound (II B-2) | 50 | 100 | 100 | | |

TABLE 9-continued

| Table II-1 | Example II 1-1 | Comparative Example II 1-1 | Comparative Example II 1-2 | Comparative Example II 1-3 | Comparative Example II 1-4 |
|---|---|---|---|---|---|
| Acid anhydride-based curing agent | 106 | 81 | 81 | | |
| Amine-based curing agent | | | | 34 | |
| Phenol based curing agent | | | | | 81 |
| Curing accelerator (II C-1) | 1 | 1 | | | |
| Curing accelerator (II C-2) | | | 1 | | |
| Curing accelerator (II C-9) | | | | | 2 |
| Compound containing hydroxyl group | 5 | | | | |
| Heat resistance (° C.) | 164 | 158 | 148 | — | — |

TABLE 10

| | Table II-2 | Example II 2-1 | Example II 2-2 | Example II 2-3 | Example II 2-4 | Example II 2-5 | Example II 2-6 | Example II 2-7 |
|---|---|---|---|---|---|---|---|---|
| Composition of curable composition (parts by mass) | Epoxy compound (A-2) | 100 | 100 | 100 | 100 | 100 | 100 | 100 |
| | Acid anhydride-based curing agent | 131 (0.9 equivalent) | 131 (0.9 equivalent) | 131 (0.9 equivalent) | 131 (0.9 equivalent) | 131 (0.9 equivalent) | 131 (0.9 equivalent) | 131 (0.9 equivalent) |
| | Curing accelerator (II C-1) | 1 | | | | | | |
| | Curing accelerator (II C-2) | | 1 | | | | | |
| | Curing accelerator (II C-3) | | | 1 | | | | |
| | Curing accelerator (II C-4) | | | | 1 | | | |
| | Curing accelerator (II C-5) | | | | | 1 | | |
| | Curing accelerator (II C-6) | | | | | | 1 | |
| | Curing accelerator (II C-7) | | | | | | | 1 |
| | Compound containing hydroxyl group | 5 | 5 | 5 | 5 | 5 | 5 | 5 |
| Heat resistance (° C.) | | 253 | 248 | 246 | 254 | 251 | 245 | 236 |

TABLE 11

| | Table II-3 | Example II 2-8 | Example II 2-9 | Example II 2-10 | Example II 2-11 | Comparative Example II 2-1 | Comparative Example II 2-2 | Comparative Example II 2-3 |
|---|---|---|---|---|---|---|---|---|
| Composition of curable composition (parts by mass) | Epoxy compound (A-2) | 100 | 100 | 100 | 50 | | | |
| | the other epoxy compound (II B-1) | | | | | | | 100 |
| | the other epoxy compound (II B-3) | | | | 50 | 100 | 100 | |
| | Acid anhydride-based curing agent | 131 (0.9 equivalent) | 131 (0.9 equivalent) | 131 (0.9 equivalent) | 123 (0.9 equivalent) | 115 (0.9 equivalent) | 115 (0.9 equivalent) | 184 (0.9 equivalent) |

TABLE 11-continued

| Table II-3 | Example II 2-8 | Example II 2-9 | Example II 2-10 | Example II 2-11 | Comparative Example II 2-1 | Comparative Example II 2-2 | Comparative Example II 2-3 |
|---|---|---|---|---|---|---|---|
| Curing accelerator (II C-1) | | | | 1 | 1 | | 1 |
| Curing accelerator (II C-2) | | | | | | 1 | |
| Curing accelerator (II C-8) | 1 | | | | | | |
| Curing accelerator (II C-9) | | 1 | | | | | |
| Curing accelerator (II C-10) | | | 1 | | | | |
| Compound containing hydroxyl group | 5 | 5 | 5 | | | | |
| Heat resistance (° C.) | 247 | 252 | 257 | 222 | 199 | 192 | — |

TABLE 12

| Table II-4 | | Example II 3-1 | Comparative Example II 3-1 |
|---|---|---|---|
| Composition of curable composition (parts by mass) | Epoxy compound (A-2) | 50 | |
| | the other epoxy compound (II B-4) | 50 | 100 |
| | Acid anhydride based curing agent | 103 (0.9 equivalent) | 74 (0.9 equivalent) |
| | Curing accelerator (II C-1) | 1 | 1 |
| | Compound containing hydroxyl group | 5 | |
| | Heat resistance (° C.) | 194 | 185 |

The respective components used for the preparation of the respective curable compositions shown in Tables II-2 to II-4 are as follows.

the other epoxy compound (II B-3): 3,4-epoxycyclohexylmethyl 3,4-epoxycyclohexane carboxylate, manufactured by Daicel Corporation, trade name: CELLOXIDE 2021P the other epoxy compound (II B-4): a cresol novolac type epoxy resin, manufactured by DIC Corporation, trade name: EPICLON N-660

Curing accelerator (II C-3): 1,2-dimethylimidazole, manufactured by Shikoku Chemicals Corporation, trade name: 1.2DMZ Curing accelerator (II C-4): 1-benzyl-2-phenylimidazole, manufactured by Shikoku Chemicals Corporation, trade name: 1B2PZ Curing accelerator (II C-5): 1-cyanoethyl-2-ethyl-4-methylimidazole, manufactured by Shikoku Chemicals Corporation, trade name: 2E4MZ-CN Curing accelerator (II C-6): 1,8-diazabicyclo(5,4,0)undecene-7, a reagent manufactured by Tokyo Chemical Industry Co., Ltd.

Curing accelerator (II C-7): tetrabutylammonium bromide, a reagent manufactured by Tokyo Chemical Industry Co., Ltd.

Curing accelerator (II C-8): methyltri-n-butylphosphonium dimethylphosphate, manufactured by Nippon Chemical Industrial Co., Ltd., trade name: HISHICOLIN PX-4MP Curing accelerator (II C-9): triphenylphosphine, a reagent manufactured by Tokyo Chemical Industry Co., Ltd.

Curing accelerator (II C-10): 2-methylimidazole, manufactured by Shikoku Chemicals Corporation, trade name: 2MI II-4. Examples II 4: Preparation of Curable Compositions Containing Epoxy Compound (A-2) and Evaluation Thereof (Part 4: Combination with Various Types of the Other Epoxy Compounds and Acid Anhydride-Based Curing Agent)

(1) Examples II 4-1 to II 4-13 and Comparative Examples II 4-1 to II 4-14

Curable compositions were obtained in the same manner as in Example II 1-1, except that the following components were used at the compositions shown in Tables II-5 to 11-7.
(i) Epoxy Compound (A-2)
Tricyclopentadiene diepoxide obtained by the method described in the above Preparation Example 2 was used.
(ii) The Other Epoxy Compound (II B-2)
A bisphenol A-type liquid epoxy resin, manufactured by Nippon Steel & Sumikin Chemical Co., Ltd., trade name: YD-128, was used.
(iii) The Other Epoxy Compound (II B-3)
3',4'-Epoxycyclohexylmethyl 3,4-epoxycyclohexane carboxylate, manufactured by Daicel Corporation, trade name: CELLOXIDE 2021P, was used.
(iv) The Other Epoxy Compound (II B-5)
A phenol novolac type epoxy resin, manufactured by Nippon Steel & Sumikin Chemical Co., Ltd., trade name: YDPN-638, was used.
(v) The Other Epoxy Compound (II B-6)
A bisphenol F-type liquid epoxy resin, manufactured by Nippon Steel & Sumikin Chemical Co., Ltd., trade name: YDF-170, was used.
(vi) The Other Epoxy Compound (II B-7)
A hydrogenated bisphenol A-type liquid epoxy resin, manufactured by Mitsubishi Chemical Corporation, trade name: YX8000, was used.
(vii) The Other Epoxy Compound (II B-8)
Triglycidyl isocyanurate, manufactured by Nissan Chemical Industries, Ltd., trade name: TEPIC-S, was used.
(viii) The Other Epoxy Compound (II B-9)
Tetramethylene glycol diglycidyl ether, a reagent manufactured by Tokyo Chemical Industry Co., Ltd., was used.
(ix) The Other Epoxy Compound (II B-10)
Cyclohexanedicarboxylic acid diglycidyl ester, a reagent manufactured by Tokyo Chemical Industry Co., Ltd., was used.
(x) The Other Epoxy Compound (II B-11)
Vinyl cyclohexene dioxide, a reagent manufactured by Sigma-Aldrich Co., was used.
(xi) The Other Epoxy Compound (II B-12)
1,2-Epoxy-(2-oxiranyl)cyclohexane adduct of 2,2-bis(hydroxymethyl)-1-butanol, manufactured by Daicel Corporation, trade name: EHPE 3150, was used.

(xii) The Other Epoxy Compound (II B-13)

Limonene dioxide, a reagent manufactured by Sigma-Aldrich Co., was used.

(xiii) The Other Epoxy Compound (II B-14)

(3,3',4,4'-Diepoxy)bicyclohexyl, manufactured by Daicel Corporation, trade name: CELLOXIDE 8000, was used.

(xiv) The Other Epoxy Compound (II B-15)

An epoxy compound produced by the method described in Example 3 in JP 49-126658 A was used.

(xv) The Other Epoxy Compound (II B-16)

Tetrahydroindene diepoxide produced by the method described in JP 2012-116390 A was used.

(xvi) The Other Epoxy Compound (II B-18)

The monoepoxy compound produced by the method described in Preparation Example 4 was used.

(xvii) Acid Anhydride-Based Curing Agent

A mixture of 4-methylhexahydrophthalic anhydride and hexahydrophthalic anhydride, manufactured by New Japan Chemical Co., Ltd., trade name: MH-700, was used.

(xviii) Curing Accelerator (II C-1)

2-Ethyl-4-methylimidazole, manufactured by Shikoku Chemicals Corporation, trade name: 2E4MZ, was used.

(xix) Curing Accelerator (II C-6)

1,8-Diazabicyclo(5,4,0)undecene-7, a reagent manufactured by Tokyo Chemical Industry Co., Ltd., was used.

(xx) Compound Containing Hydroxyl Group

Ethylene glycol, a reagent manufactured by Wako Pure Chemical Industries, Ltd., was used.

(2) Evaluation of Physical Properties (Heat Resistance of Cured Product from Curable Composition)

Each of the curable compositions obtained as described above was heated under each of the following conditions, to obtain a cured product.

(a) Example II 4-1

The curable composition obtained as described above was heated in a hot air circulating oven at 120° C. for one hour, at 150° C. for one hour, and then at 220° C. for two hours, to obtain a cured product.

(b) Example II 4-2

The curable composition obtained as described above was heated in a hot air circulating oven at 90° C. for one hour, at 140° C. for one hour, and then at 180° C. for two hours, to obtain a cured product.

(c) Example II 4-3

The curable composition obtained as described above was heated in a hot air circulating oven at 90° C. for one hour, at 130° C. for one hour, and then at 160° C. for two hours, to obtain a cured product.

(d) Example II 4-4

The curable composition obtained as described above was heated in a hot air circulating oven at 90° C. for one hour, at 130° C. for one hour, and then at 170° C. for two hours, to obtain a cured product.

(e) Example II 4-5

The curable composition obtained as described above was heated in a hot air circulating oven at 100° C. for one hour, at 140° C. for one hour, and then at 240° C. for two hours, to obtain a cured product.

(f) Example II 4-6

The curable composition obtained as described above was heated in a hot air circulating oven at 60° C. for one hour, at 110° C. for one hour, at 160° C. for one hour, and then at 240° C. for two hours, to obtain a cured product.

(g) Example II 4-7

The curable composition obtained as described above was heated in a hot air circulating oven at 90° C. for one hour, at 130° C. for one hour, and then at 160° C. for two hours, to obtain a cured product.

(h) Example II 4-8

The curable composition obtained as described above was heated in a hot air circulating oven at 60° C. for one hour, at 120° C. for one hour, at 160° C. for one hour, and then at 210° C. for two hours, to obtain a cured product.

(i) Example II 4-9

The curable composition obtained as described above was heated in a hot air circulating oven at 70° C. for one hour, at 130° C. for one hour, and then at 240° C. for two hours, to obtain a cured product.

(j) Example II 4-10

The curable composition obtained as described above was heated in a hot air circulating oven at 90° C. for one hour, at 140° C. for one hour, at 180° C. for one hour, and then at 240° C. for two hours, to obtain a cured product.

(k) Example II 4-11

The curable composition obtained as described above was heated in a hot air circulating oven at 90° C. for one hour, at 140° C. for one hour, and then at 240° C. for two hours, to obtain a cured product.

(l) Example II 4-12

The curable composition obtained as described above was heated in a hot air circulating oven at 90° C. for one hour, at 140° C. for one hour, and then at 240° C. for two hours, to obtain a cured product.

(m) Example II 4-13

The curable composition obtained as described above was heated in a hot air circulating oven at 90° C. for one hour, and then at 180° C. for two hours, to obtain a cured product.

(a') Comparative Example II 4-1

The curable composition obtained as described above was heated in a hot air circulating oven at 120° C. for one hour, at 150° C. for one hour, and then at 170° C. for two hours, to obtain a cured product.

(b') Comparative Example II 4-2

The curable composition obtained as described above was heated in a hot air circulating oven at 90° C. for one hour, at 140° C. for one hour, and then at 180° C. for two hours, to obtain a cured product.

(c') Comparative Example II 4-3

The curable composition obtained as described above was heated in a hot air circulating oven at 90° C. for one hour, at 130° C. for one hour, and then at 160° C. for two hours, to obtain a cured product.

(d') Comparative Example II 4-4

The curable composition obtained as described above was heated in a hot air circulating oven at 80° C. for one hour, at 130° C. for one hour, and then at 170° C. for two hours, to obtain a cured product.

(e') Comparative Example II 4-5

The curable composition obtained as described above was heated in a hot air circulating oven at 100° C. for one hour, at 140° C. for one hour, and then at 240° C. for two hours, to obtain a cured product.

(f') Comparative Example II 4-6

The curable composition obtained as described above was heated in a hot air circulating oven at 60° C. for one hour, at 110° C. for one hour, at 160° C. for one hour, and then at 240° C. for two hours, to obtain a cured product.

(g') Comparative Example II 4-7

The curable composition obtained as described above was heated in a hot air circulating oven at 80° C. for one hour, at 120° C. for one hour, and then at 150° C. for two hours, to obtain a cured product.

(h') Comparative Example II 4-8

The curable composition obtained as described above was heated in a hot air circulating oven at 70° C. for one hour, at 100° C. for one hour, at 190° C. for one hour, and then at 240° C. for two hours, to obtain a cured product.

(i') Comparative Example II 4-9

The curable composition obtained as described above was heated in a hot air circulating oven at 70° C. for one hour, at 130° C. for one hour, and then at 240° C. for two hours, to obtain a cured product.

(j') Comparative Example II 4-10

The curable composition obtained as described above was heated in a hot air circulating oven at 110° C. for one hour, at 120° C. for one hour, at 130° C. for one hour, at 150° C. for one hour, and then at 240° C. for one hour, to obtain a cured product.

(k') Comparative Example II 4-11

The curable composition obtained as described above was heated in a hot air circulating oven at 90° C. for one hour, at 140° C. for one hour, and then at 240° C. for two hours, to obtain a cured product.

(l') Comparative Example II 4-12

The curable composition obtained as described above was heated in a hot air circulating oven at 90° C. for one hour, at 140° C. for one hour, and then at 180° C. for two hours, to obtain a cured product.

(m') Comparative Example II 4-13

The curable composition obtained as described above was heated in a hot air circulating oven at 90° C. for one hour, at 140° C. for one hour, and then at 180° C. for two hours, to obtain a cured product.

(n') Comparative Example II 4-14

The curable composition obtained as described above was heated in a hot air circulating oven at 90° C. for one hour, and then at 180° C. for two hours, to obtain a cured product.

The heat resistance of each of the cured products obtained as described above was measured in the same manner as in Example II 1-1. The measurement results are summarized in Tables II-5 to 11-7.

TABLE 13

| Table II-5 | | Example II 4-1 | Example II 4-2 | Example II 4-3 | Example II 4-4 | Example II 4-5 | Comparative Example II 4-1 | Comparative Example II 4-2 | Comparative Example II 4-3 | Comparative Example II 4-4 | Comparative Example II 4-5 |
|---|---|---|---|---|---|---|---|---|---|---|---|
| Composition of curable composition (parts by mass) | Epoxy compound (A-2) | 50 | 50 | 50 | 50 | 50 | | | | | |
| | the other epoxy compound (II B-3) | | | | 25 | | | | | 50 | |
| | the other epoxy compound (II B-5) | 50 | | | | | 100 | | | | |
| | the other epoxy compound (II B-6) | | | | | 50 | | | | | 100 |

TABLE 13-continued

| Table II-5 | Example II 4-1 | Example II 4-2 | Example II 4-3 | Example II 4-4 | Example II 4-5 | Comparative Example II 4-1 | Comparative Example II 4-2 | Comparative Example II 4-3 | Comparative Example II 4-4 | Comparative Example II 4-5 |
|---|---|---|---|---|---|---|---|---|---|---|
| the other epoxy compound (II B-7) |  | 50 |  |  |  |  | 100 |  |  |  |
| the other epoxy compound |  |  | 50 |  |  |  |  | 100 |  |  |
| the other epoxy compound (II B-12) |  |  |  | 25 |  |  |  |  | 50 |  |
| Acid anhydride curing agent | 108 | 104 | 141 | 115 | 110 | 84 | 76 | 151 | 99 | 89 |
| Curing accelerator (II C-1) | 2 | 2 | 2 | 2 | 2 | 2 | 2 | 2 | 2 | 2 |
| Compound containing hydroxyl group | 5 | 5 | 5 | 5 | 5 | 5 |  |  |  |  |
| Heat resistance (° C.) | 160 | 232 | 270 | 275 | 135 | 113 | 220 | 209 | 232 | 92 |

TABLE 14

| | Table II-6 | Example II 4-6 | Example II 4-7 | Example II 4-8 | Comparative Example II 4-6 | Comparative Example II 4-7 | Comparative Example II 4-8 |
|---|---|---|---|---|---|---|---|
| Composition of curable composition (parts by mass) | Epoxy compound (A-2) | 50 | 50 | 50 |  |  |  |
| | the other epoxy compound (II B-10) |  | 50 |  |  | 100 |  |
| | the other epoxy compound (II B-11) | 50 |  |  | 100 |  |  |
| | the other epoxy compound (II B-16) |  |  | 50 |  |  | 100 |
| | Acid anhydride-based curing agent | 174 | 119 | 159 | 216 | 106 | 187 |
| | Curing accelerator (II C-1) | 2 | 2 | 2 | 2 | 2 |  |
| | Curing accelerator (II C-6) |  |  |  |  |  | 2 |
| | Compound containing hydroxyl group | 5 | 5 | 5 |  |  |  |
| Heat resistance (° C.) | | 174 | 265 | 233 | 137 | 102 | 126 |

TABLE 15

| | Table II-7 | Example II 4-9 | Example II 4-10 | Example II 4-11 | Example II 4-12 | Example II 4-13 | Comparative Example II 4-9 | Comparative Example II 4-10 | Comparative Example II 4-11 | Comparative Example II 4-12 | Comparative Example II 4-13 | Comparative Example II 4-14 |
|---|---|---|---|---|---|---|---|---|---|---|---|---|
| Composition of curable composition (parts by mass) | Epoxy compound (A-2) | 50 | 50 | 50 | 67 | 50 |  |  |  |  |  |  |
| | the other epoxy compound (II B-2) |  |  |  |  |  |  |  |  | 67 |  |  |
| | the other epoxy compound (II B-3) |  |  |  |  |  |  |  |  |  | 67 |  |
| | the other epoxy compound (II B-9) |  | 50 |  |  |  |  | 100 |  |  |  |  |
| | the other epoxy compound (II B-13) |  |  | 50 |  |  |  |  | 100 |  |  |  |
| | the other epoxy compound (II B-14) | 50 |  |  |  |  | 100 |  |  |  |  |  |
| | the other epoxy compound (II B-15) |  |  |  |  | 50 |  |  |  |  |  | 100 |
| | the other epoxy compound (II B-18) |  |  |  | 33 |  |  |  |  | 33 | 33 |  |

TABLE 15-continued

| Table II-7 | Example II 4-9 | Example II 4-10 | Example II 4-11 | Example II 4-12 | Example II 4-13 | Comparative Example II 4-9 | Comparative Example II 4-10 | Comparative Example II 4-11 | Comparative Example II 4-12 | Comparative Example II 4-13 | Comparative Example II 4-14 |
|---|---|---|---|---|---|---|---|---|---|---|---|
| Acid anhydride-based curing agent | 144 | 134 | 140 | 114 | 156 | 156 | 137 | 150 | 80 | 104 | 180 |
| Curing accelerator (II C-1) | | 2 | 2 | 2 | 2 | 2 | 1 | 2 | 2 | 2 | 2 |
| Curing accelerator (II C-6) | 2 | | | | | | | | | | |
| Compound containing hydroxyl group | 5 | 5 | 5 | 5 | 5 | 2 | 5 | | 5 | 5 | 5 |
| Heat resistance (° C.) | 219 | 200 | 105 | 169 | 82 | 152 | 181 | 86 | 101 | 105 | 57 |

III. Examples of Aspect III of the Present Invention

III-1. Examples III 1; Preparation of Curable Compositions Containing Epoxy Compound A-1). And Evaluation Thereof (Part 1: Combination with the Other Epoxy Compounds and Thermal Cationic Polymerization Initiator)

(1) Example III 1-1

Production of Curable Composition

The epoxy compound (A-1) obtained as described above and a thermal cationic polymerization initiator were mixed to achieve the following composition, to obtain a curable composition.

<Composition of Curable Composition>

Epoxy compound (A-1) 100 parts by mass (the compound obtained by the method described in Preparation Example 1)

Thermal cationic polymerization initiator (III D-1) 2 parts by mass (an aromatic sulfonium salt: 4-acetoxyphenyldimethylsulfonium hexafluoroantimonate, manufactured by Sanshin Chemical Industry Co., Ltd., trade name: SI-150L)

The curable composition obtained as described above was injected into a metal mold having a size of 3 mm×30 mm×130 mm, and heated in a hot air circulating oven at 100° C. for one hour, at 110° C. for one hour, at 130° C. for one hour, at 150° C. for one hour, at 180° C. for two hours, and then at 220° C. for three hours, to obtain a cured product.

The glass transition temperature of the cured product obtained as described above was measured by increasing the temperature from 30 to 300° C. at a rate of 10° C./min, using a thermomechanical analyzer (manufactured by Hitachi High-Tech Science Corporation, trade name: TMA 7100), and the thus measured value was taken as the heat resistance of the cured product. Note that the glass transition temperature as used herein refers to the value at the intersection of a straight tangential line on the low temperature side and a straight tangential line on the high temperature side. The measurement results are summarized in Table III-1.

(2) Example III 1-2

A curable composition was obtained in the same manner as in Example III 1-1, except that the composition of the curable composition was changed as described below.

<Composition of Curable Composition>

| Epoxy compound (A-1) | 75 parts by mass (the compound obtained by the method described in Preparation Example 1) |
| the other epoxy compound (III B-1) | 25 parts by mass (a bisphenol A-type liquid epoxy resin, manufactured by Nippon Steel & Sumikin Chemical Co., Ltd., trade name: YD-128) |
| Thermal cationic polymerization initiator (III D-1) | 2 parts by mass (an aromatic sulfonium salt: 4-acetoxyphenyldimethylsulfonium hexafluoroantimonate, manufactured by Sanshin Chemical Industry Co., Ltd., trade name: SI-150L) |

The curable composition obtained as described above was injected into a metal mold in the same manner as in Example III 1-1, and heated in a hot air circulating oven at 100° C. for one hour, at 110° C. for one hour, at 130° C. for one hour, at 150° C. for one hour, at 180° C. for one hour, and then at 220° C. for five hours, to obtain a cured product.

The glass transition temperature of the thus obtained cured products was measured in the same manner as in Example III 1-1. The measurement results are summarized in Table III-1.

(3) Examples III 1-3 and III 1-4

Curable compositions were obtained in the same manner as in Example III 1-1, except that the compositions of the curable compositions were changed to those shown in Table III-1.

The curable compositions obtained as described above were heated in the same manner as in Example III 1-2 to obtain cured products.

The glass transition temperature of each of the thus obtained cured products was measured in the same manner as in Example III 1-1. The measurement results are summarized in Table III-1.

(4) Example III 1-5

A curable composition was obtained in the same manner as in Example III 1-1, except that the composition of the curable composition was changed as described below.

<Composition of Curable Composition>

| Epoxy compound (A-1) | 75 parts by mass (the compound obtained by the method described in Preparation Example 1) |
|---|---|
| the other epoxy compound (III B-2) | 25 parts by mass (3',4'-epoxycyclohexylmethyl 3,4-epoxycyclohexane carboxylate, manufactured by Daicel Corporation, trade name: CELLOXIDE 2021P) |
| Thermal cationic polymerization initiator (III D-1) | 1 part by mass (an aromatic sulfonium salt: 4-acetoxyphenyldimethylsulfonium hexafluoroantimonate, manufactured by Sanshin Chemical Industry Co., Ltd., trade name SI-150L) |

The curable composition obtained as described above was heated in the same manner as in Example III 1-1 to obtain a cured product.

The glass transition temperature of the thus obtained cured product was measured in the same manner as in Example III 1-1. The measurement results are summarized in Table III-1.

(5) Examples III 1-6 and III 1-7

Curable compositions were obtained in the same manner as in Example III 1-1, except that the compositions of the curable compositions were changed to those shown in Table III-1.

The curable compositions obtained as described above were heated in the same manner as in Example III 1-1, to obtain cured products.

The glass transition temperature of each of the thus obtained cured products was measured in the same manner as in Example III 1-1. The measurement results are summarized in Table III-1.

(6) Comparative Examples III 1-1 to II 1-3

Curable compositions were obtained in the same manner as in Example III 1-1, except that the compositions of the curable compositions were changed to those shown in Table III-1.

The curable compositions obtained as described above were heated in the same manner as in Example III 1-2, to obtain cured products.

The glass transition temperature of each of the thus obtained cured products was measured in the same manner as in Example III 1-1. The measurement results are summarized in Table III-1.

(7) Comparative Examples III 1-4 and III 1-5

Curable compositions were obtained in the same manner as in Example III 1-1, except that the compositions of the curable compositions were changed to those shown in Table III-1.

The curable compositions obtained as described above were heated in the same manner as in Example III 1-1, to obtain cured products.

The glass transition temperature of each of the thus obtained cured products was measured in the same manner as in Example III 1-1. The measurement results are summarized in Table III-1.

TABLE 16

| Table III-1 | | Example III 1-1 | Example III 1-2 | Example III 1-3 | Example III 1-4 | Example III 1-5 | Example III 1-6 | Example III 1-7 | Comparative Example III 1-1 | Comparative Example III 1-2 | Comparative Example III 1-3 | Comparative Example III 1-4 | Comparative Example III 1-5 |
|---|---|---|---|---|---|---|---|---|---|---|---|---|---|
| Composition of curable composition (parts by mass) | Epoxy compound (A-1) | 100 | 75 | 50 | 25 | 75 | 50 | 25 | | | | | |
| | the other epoxy compound (III B-1) | | 25 | 50 | 75 | | | | 25 | 50 | 75 | 100 | |
| | the other epoxy compound (III B-2) | | | | | 25 | 50 | 75 | 75 | 50 | 25 | | 100 |
| | Thermal cationic polymerization initiator (III D-1) | 2 | 2 | 2 | 2 | 1 | 1 | 1 | 2 | 2 | 2 | 2 | 1 |
| Heat resistance (° C.)[1] | | 236 | 239 | 187 | 165 | 230 | 226 | 212 | 166 | 162 | 155 | 150 | 179 |

Note
[1] heat resistance was measured by the method described in Example III 1-1.

III-2. Examples III 2: Preparation of Curable Compositions Containing Epoxy Compound (A-1) and Evaluation Thereof (Part 2: Combination with Various Types of the Other Epoxy Compounds and Thermal Cationic Polymerization Initiator)

(1) Example III 2-1

A curable composition was obtained in the same manner as in Example III 1-1, except that the composition of the curable composition was changed as described below.
<Composition of Curable Composition>

| | |
|---|---|
| Epoxy compound (A-1) | 50 parts by mass (the compound obtained by the method described in Preparation Example 1) |
| the other epoxy compound (III B-3) | 50 parts by mass (a cresol novolac type epoxy resin, manufactured by DIC Corporation, trade name: N-660) |
| Thermal cationic polymerization initiator (III D-1) | 2 parts by mass (an aromatic sulfonium salt: 4-acetoxyphenyldimethylsulfonium hexafluoroantimonate, manufactured by Sanshin Chemical Industry Co., Ltd., trade name: SI-150L) |

The curable composition obtained as described above was heated in a hot air circulating oven at 110° C. for one hour, at 130° C. for one hour, at 150° C. for one hour, at 180° C. for two hours, and then at 220° C. for three hours, to obtain a cured product.

The glass transition temperature of the thus obtained cured product was measured by increasing the temperature from 30 to 300° C. at a rate of 10° C./min, using a differential scanning calorimeter DSC7000X manufactured by Hitachi High-Tech Science Corporation, and the thus measured value was taken as the heat resistance of the cured product. The glass transition temperature as used herein refers to a value measured in accordance with JIS K7121, based on "Midpoint Glass Transition Temperature: $T_{mg}$" described in the section of "Method for Measuring Transition Temperature of Plastics". The measurement results are summarized in Table III-2.

(2) Example III 2-2

A curable composition was obtained in the same manner as in Example III 1-1, except that the composition of the curable composition was changed as described below.
<Composition of Curable Composition>

| | |
|---|---|
| Epoxy compound (A-1) | 50 parts by mass (the compound obtained by the method described in Preparation Example 1) |
| the other epoxy compound (III B-4) | 50 parts by mass (a phenol novolac type epoxy resin, manufactured by Nippon Steel & Sumikin Chemical Co., Ltd., trade name: YDPN-638) |
| Thermal cationic polymerization initiator (III D-1) | 2 parts by mass (an aromatic sulfonium salt: 4-acetoxyphenyldimethylsulfonium hexafluoroantimonate, manufactured by Sanshin Chemical Industry Co., Ltd., trade name: SI-150L) |

The curable composition obtained as described above was heated in the same manner as in Example III 2-1, to obtain a cured product.

The glass transition temperature of the thus obtained cured product was measured in the same manner as in Example III 2-1. The measurement results are summarized in Table III-2.

(3) Comparative Examples III 2-1 to III 2-4

Curable compositions were obtained in the same manner as in Example III 1-1, except that the compositions of the curable compositions were changed to those shown in Table III-2.

The curable compositions obtained as described above were heated in the same manner as in Example III 2-1, to obtain cured products.

The glass transition temperature of each of the thus obtained cured products was measured in the same manner as in Example III 2-1. The measurement results are summarized in Table III-2.

TABLE 17

| Table III-2 | | Example III 2-1 | Example III 2-2 | Comparative Example III 2-1 | Comparative Example III 2-2 | Comparative Example III 2-3 | Comparative Example III 2-4 |
|---|---|---|---|---|---|---|---|
| Composition of curable composition (parts by mass) | Epoxy compound(A-1) | 50 | 50 | | | | |
| | the other epoxy compound (III B-1) | | | 50 | 50 | | |
| | the other epoxy compound (III B-2) | | | | | 50 | 50 |
| | the other epoxy compound (III B-3) | 50 | | 50 | | 50 | |
| | the other epoxy compound (III B-4) | | 50 | | 50 | | 50 |
| | Thermal cationic polymerization initiator (III D-1) | 2 | 2 | 2 | 2 | 2 | 2 |
| Heat resistance (° C.)[1] | | 193 | 188 | 169 | 172 | 169 | 175 |

Note
[1] Heat resistance was measured by the method described in Example III 2-1.

III-3. Examples III 3: Preparation of Curable Compositions Containing Epoxy Compound (A-1) and Evaluation Thereof (Part 3: Combination with Oxetane Compound and Thermal Cationic Polymerization Initiator)

(1) Example III 3-1

A curable composition was obtained in the same manner as in Example III 1-1, except that the composition of the curable composition was changed as described below.
<Composition of Curable Composition>

| | |
|---|---|
| Epoxy compound (A-1) | 50 parts by mass (the compound obtained by the method described in Preparation Example 1) |
| Oxetane compound (III C-1) | 50 parts by mass (1,4-bis[(3-ethyl-3-oxetanylmethoxy)methyl]benzene, manufactured by Toagosei Co., Ltd., trade name: ARONE OXETANE OXT-121) |
| Thermal cationic polymerization initiator (III D-1) | 1 part by mass (an aromatic sulfonium salt: 4-acetoxyphenyldimethylsulfonium hexafluoroantimonate, manufactured by Sanshin Chemical Industry Co., Ltd., trade name: SI-150L) |

The curable composition obtained as described above was injected into a metal mold having a size of 3 mm×30 mm×130 mm, and heated in a hot air circulating oven at 110° C. for one hour, at 130° C. for one hour, at 150° C. for one hour, at 180° C. for two hours, and then at 220° C. for three hours, to obtain a cured product.

The glass transition temperature of the thus obtained cured product was measured in the same manner as in Example III 1-1. The measurement results are summarized in Table III-3.

(2) Comparative Examples III 3-1 and III 3-2

Curable compositions were obtained in the same manner as in Example III 1-1, except that the compositions of the curable compositions were changed to those shown in Table III-3.

The curable compositions obtained as described above were heated in the same manner as in Example III 3-1, to obtain cured products.

The glass transition temperature of each of the thus obtained cured products was measured in the same manner as in Example III 1-1. The measurement results are summarized in Table III-3.

TABLE 18

| Table III-3 | | Example III 3-1 | Comparative Example III 3-1 | Comparative Example III 3-2 |
|---|---|---|---|---|
| Composition of curable composition (parts by mass) | Epoxy compound (A-1) | 50 | | |
| | the other epoxy compound (III B-1) | | 50 | |
| | the other epoxy compound (III B-2) | | | 50 |
| | Oxetane compound (III C-1) | 50 | 50 | 50 |

TABLE 18-continued

| Table III-3 | Example III 3-1 | Comparative Example III 3-1 | Comparative Example III 3-2 |
|---|---|---|---|
| Thermal cationic polymerization initiator (III D-1) | 1 | 1 | 1 |
| Heat resistance (° C.)[1] | 203 | 140 | 149 |

Note
[1]Heat resistance was measured by the method described in Example III 1-1.

III-4, Examples II 4: Preparation of Curable Compositions Containing Epoxy Compound (A-1) and Evaluation Thereof. (Part 4: Combination with Various Types of the Other Epoxy Compounds and Thermal Cationic Polymerization Initiator)

(1) Example III 4-1 to III 4-5 and Comparative Example III 4-1 to 4 III-5

Curable compositions were obtained in the same manner as in Example III 1-1, except that the following components were used at the compositions shown in Table III-4.
(i) Epoxy Compound (A-1)
The epoxy compound (A-1) obtained by the method described in Preparation Example 1 was used.
(ii) The Other Epoxy Compound (III B-2)
3',4'-Epoxycyclohexylmethyl 3,4-epoxycyclohexane carboxylate, manufactured by Daicel Corporation, trade name: CELLOXIDE 2021P, was used.
(iii) The Other Epoxy Compound (III B-5)
A bisphenol F-type liquid epoxy resin, manufactured by Nippon Steel & Sumikin Chemical Co., Ltd., trade name: YDF-170, was used.
(iv) The Other Epoxy Compound (III B-6)
A hydrogenated bisphenol A-type liquid epoxy resin, manufactured by Mitsubishi Chemical Corporation, trade name: YX8000, was used.
(v) The Other Epoxy Compound (III B-7)
Triglycidyl isocyanurate, manufactured by Nissan Chemical Industries, Ltd., trade name: TEPIC-S, was used.
(vi) The Other Epoxy Compound (III B-11)
1,2-Epoxy-(2-oxiranyl)cyclohexane adduct of 2,2-bis(hydroxymethyl)-1-butanol, manufactured by Daicel Corporation, trade name: EHPE 3150, was used.
(vii) The Other Epoxy Compound (III B-15)
1,2-Epoxy-4-vinylcyclohexane, manufactured by Daicel Corporation, trade name: CELLOXIDE 2000, was used.
(viii) Thermal Cationic Polymerization Initiator (III D-1)
An aromatic sulfonium salt: 4-acetoxyphenyldimethylsulfonium hexafluoroantimonate, manufactured by Sanshin Chemical Industry Co., Ltd., trade name: SI-150L, was used.

(2) Evaluation of Physical Properties

Each of the curable compositions obtained as described above was heated under each of the following conditions, to obtain a cured product.

(a) Example III 4-1

The curable composition obtained as described above was injected into a metal mold in the same manner as in Example III 1-1, and heated in a hot air circulating oven at 120° C. for one hour, at 170° C. for one hour, and then at 220° C. for two hours, to obtain a cured product.

(b) Example III 4-2

The curable composition obtained as described above was injected into a metal mold in the same manner as in Example III 1-1, and heated in a hot air circulating oven at 160° C. for one hour, at 180° C. for one hour, and then at 220° C. for two hours, to obtain a cured product.

(c) Example III 4-3

The curable composition obtained as described above was injected into a metal mold in the same manner as in Example III 1-1, and heated in a hot air circulating oven at 120° C. for one hour, at 140° C. for one hour, and then at 220° C. for two hours, to obtain a cured product.

(d) Example III 4-4

The curable composition obtained as described above was injected into a metal mold in the same manner as in Example III 1-1, and heated in a hot air circulating oven at 120° C. for one hour, at 170° C. for one hour, and then at 230° C. for two hours, to obtain a cured product.

(e) Example III 4-5

The curable composition obtained as described above was Injected into a metal mold in the same manner as in Example III 1-1, and heated in a hot air circulating oven at 120° C. for one hour, at 140° C. for one hour, and then at 220° C. for two hours, to obtain a cured product.

(a') Comparative Example III 4-1

The curable composition obtained as described above was injected into a metal mold in the same manner as in Example III 1-1, and heated in a hot air circulating oven at 120° C. for one hour, and then at 220° C. for two hours, to obtain a cured product.

(b') Comparative Example III 4-2

The curable composition obtained as described above was injected into a metal mold in the same manner as in Example III 1-1, and heated in a hot air circulating oven at 110° C. for one hour, and then at 240° C. for two hours, to obtain a cured product.

(c') Comparative Example III 4-3

The curable composition obtained as described above was injected into a metal mold in the same manner as in Example III 1-1, and heated in a hot air circulating oven at 110° C. for one hour, at 170° C. for one hour, and then at 220° C. for two hours, to obtain a cured product.

(d') Comparative Example III 4-4

The curable composition obtained as described above was injected into a metal mold in the same manner as in Example III 1-1, and heated in a hot air circulating oven at 130° C. for one hour, at 190° C. for one hour, and then at 230° C. for two hours, to obtain a cured product.

(e') Comparative Example III 4-5

The curable composition obtained as described above was injected into a metal mold in the same manner as in Example III 1-1, and heated in a hot air circulating oven at 120° C. for one hour, at 140° C. for one hour, and then at 220° C. for two hours, to obtain a cured product.

The glass transition temperature of each of the thus obtained cured products was measured in the same manner as in Example III 2-1. The measurement results are summarized in Table III-4.

TABLE 19

| Table III-4 | | Example III 4-1 | Example III 4-2 | Example III 4-3 | Example III 4-4 | Example III 4-5 | Comparative Example III 4-1 | Comparative Example III 4-2 | Comparative Example III 4-3 | Comparative Example III 4-4 | Comparative Example III 4-5 |
|---|---|---|---|---|---|---|---|---|---|---|---|
| Composition of curable composition (parts by mass) | Epoxy compound (A-1) | 50 | 25 | 50 | 50 | 50 | | | | | |
| | the other epoxy compound (III B-2) | | 25 | 25 | | 37.5 | | 50 | 50 | | 87.5 |
| | the other epoxy compound (III B-5) | | | 50 | | | | | | 100 | |
| | the other epoxy compound (III B-6) | 50 | | | | | 100 | | | | |
| | the other epoxy compound (III B-7) | | 50 | | | | | 50 | | | |
| | the other epoxy compound (III B-11) | | | 25 | | | | | 50 | | |
| | the other epoxy compound (III B-15) | | | | 12.5 | | | | | | 12.5 |
| | Thermal cationic polymerization initiator (III D-1) | 2 | 2 | 2 | 2 | 2 | 2 | 2 | 2 | 2 | 2 |
| | Heat resistance (° C.)[1] | 263 | 250 | 241 | 249 | 232 | 148 | 134 | 199 | 144 | 200 |

Note
[1] Heat resistance was measured by the method described in Example III 2-1.

III-5. Examples III 5: Preparation of Curable Compositions Containing Epoxy Compound (A-1) and Evaluation Thereof (Part 5: Combination with Various Types of the Other Epoxy Compounds, Various Types of Oxetane Compounds, and Thermal Cationic Polymerization Initiator)

(1) Examples III 5-1 to III 5-4 and Comparative Examples III 5-1 to III 5-10

Curable compositions were obtained in the same manner as in Example III 1-1, except that the following components were used at the compositions shown in Tables III-5 and III-6.
(i) Epoxy Compound (A-1)
The epoxy compound (A-1) obtained by the method described in Preparation Example 1 was used.
(ii) The Other Epoxy Compound (III B-1)
A bisphenol A-type liquid epoxy resin, manufactured by Nippon Steel & Sumikin Chemical Co., Ltd., trade name: YD-128, was used.
(iii) The Other Epoxy Compound (III B-2)
3',4'-Epoxycyclohexylmethyl 3,4-epoxycyclohexane carboxylate, manufactured by Daicel Corporation, trade name: CELLOXIDE 2021P, was used.
(iv) The Other Epoxy Compound (III B-13)
(3,3',4,4'-Diepoxy)bicyclohexyl, manufactured by Daicel Corporation, trade name: CELLOXIDE 8000, was used.
(v) Oxetane Compound (III C-1)
1,4-Bis[(3-ethyl-3-oxetanylmethoxy)methyl] benzene, manufactured by Toagosei Co., Ltd., trade name: ARONE OXETANE OXT-121, was used.
(vi) Oxetane Compound (III C-2)
3-Ethyl-3-hydroxymethyloxetane, manufactured by Toagosei Co., Ltd., trade name: ARONE OXETANE OXT-101, was used.
(vii) Oxetane Compound (III C-3)
Di[(3-ethyl-3-oxetanyl)methyl]ether, manufactured by Toagosel Co., Ltd., trade name: ARONE OXETANE OXT-221, was used.
(viii) Oxetane Compound (III C-4)
3-Ethyl-3-(2-ethylhexyloxymethyl)oxetane, manufactured by Toagosel Co., Ltd., trade name: ARONE OXETANE OXT-212, was used.
(ix) Thermal Cationic Polymerization Initiator (III D-1)
An aromatic sulfonium salt: 4-acetoxyphenyldimethylsulfonium hexafluoroantimonate, manufactured by Sanshin Chemical Industry Co., Ltd., trade name: SI-150L, was used.

(2) Evaluation of Physical Properties

Each of the curable compositions obtained as described above was heated under each of the following conditions, to obtain a cured product.

(a) Example III 5-1

The curable composition obtained as described above was injected into a metal mold in the same manner as in Example 20 III 1-1, and heated in a hot air circulating oven at 70° C. for one hour, at 120° C. for one hour, at 150° C. for one hour, and then at 230° C. for two hours, to obtain a cured product.

(b) Example III 5-2

The curable composition obtained as described above was injected into a metal mold in the same manner as in Example III 1-1, and heated in a hot air circulating oven at 70° C. for one hour, at 120° C. for one hour, at 150° C. for one hour, and then at 230° C. for two hours, to obtain a cured product.

(c) Example III 5-3

The curable composition obtained as described above was injected into a metal mold in the same manner as in Example III 1-1, and heated in a hot air circulating oven at 70° C. for one hour, at 120° C. for one hour, at 150° C. for one hour, and then at 230° C. for two hours, to obtain a cured product.

(d) Example III 5-4

The curable composition obtained as described above was injected into a metal mold in the same manner as in Example III 1-1, and heated in a hot air circulating oven at 120° C. for one hour, at 140° C. for one hour, and then at 220° C. for two hours, to obtain a cured product.

(a') Comparative Example III 5-1

The curable composition obtained as described above was injected into a metal mold in the same manner as in Example III 1-1, and heated in a hot air circulating oven at 120° C. for one hour, at 140° C. for one hour, and then at 220° C. for two hours, to obtain a cured product.

(b') Comparative Example III 5-2

The curable composition obtained as described above was injected into a metal mold in the same manner as in Example III 1-1, and heated in a hot air circulating oven at 120° C. for one hour, at 140° C. for one hour, and then at 220° C. for two hours, to obtain a cured product.

(c') Comparative Example III 5-3

The curable composition obtained as described above was injected into a metal mold in the same manner as in Example III 1-1, and heated in a hot air circulating oven at 110° C. for one hour, at 130° C. for one hour, and then at 240° C. for two hours, to obtain a cured product.

(d') Comparative Example III 5-4

The curable composition obtained as described above was injected into a metal mold in the same manner as in Example III 1-1, and heated in a hot air circulating oven at 110° C. for one hour, at 130° C. for one hour, and then at 220° C. for two hours, to obtain a cured product.

(e') Comparative Example III 5-5

The curable composition obtained as described above was injected into a metal mold in the same manner as in Example III 1-1, and heated in a hot air circulating oven at 110° C. for one hour, at 140° C. for one hour, and then at 240° C. for two hours, to obtain a cured product.

(f') Comparative Example III 5-6

The curable composition obtained as described above was Injected into a metal mold in the same manner as in Example III 1-1, and heated in a hot air circulating oven at 110° C. for one hour, at 120° C. for one hour, and then at 220° C. for two hours, to obtain a cured product.

(g') Comparative Example III 5-7

The curable composition obtained as described above was injected into a metal mold in the same manner as in Example III 1-1, and heated in a hot air circulating oven at 70° C. for one hour, at 120° C. for one hour, at 150° C. for one hour, and then at 230° C. for two hours, to obtain a cured product.

(h') Comparative Example III 5-8

The curable composition obtained as described above was injected into a metal mold in the same manner as in Example III 1-1, and heated in a hot air circulating oven at 70° C. for one hour, at 120° C. for one hour, at 150° C. for one hour, and then at 230° C. for two hours, to obtain a cured product.

(I') Comparative Example III 5-9

The curable composition obtained as described above was injected into a metal mold in the same manner as in Example III 1-1, and heated in a hot air circulating oven at 130° C. for one hour, at 170° C. for one hour, and then at 220° C. for two hours, to obtain a cured product.

(j') Comparative Example III 5-10

The curable composition obtained as described above was injected into a metal mold in the same manner as in Example III 1-1, and heated in a hot air circulating oven at 125° C. for one hour, and then at 220° C. for two hours, to obtain a cured product.

The glass transition temperature of each of the thus obtained cured products was measured in the same manner as in Example III 2-1. The measurement results are summarized in Tables III-5 and III-6.

TABLE 20

| Table III-5 | | Example III 5-1 | Example III 5-2 | Comparative Example III 5-1 | Comparative Example III 5-2 | Comparative Example III 5-3 | Comparative Example III 5-4 | Comparative Example III 5-5 | Comparative Example III 5-6 |
|---|---|---|---|---|---|---|---|---|---|
| Composition of curable composition (parts by mass) | Epoxy compound (A-1) | 75 | 75 | | | | | | |
| | the other epoxy compound (III B-1) | | | 75 | | | 75 | | |
| | the other epoxy compound (III B-2) | | | | 75 | | | 75 | |
| | the other epoxy compound (III B-13) | | | | | 75 | | | 75 |
| | Oxetane compound (III C-1) | 25 | | 25 | 25 | 25 | | | |
| | Oxetane compound (III C-3) | | 25 | | | | 25 | 25 | 25 |
| | Thermal cationic polymerization initiator (III D-1) | 2 | 2 | 2 | 2 | 2 | 2 | 2 | 2 |
| Heat resistance (° C.)[1] | | 255 | 241 | 175 | 160 | 153 | 160 | 116 | 137 |

Note
[1] Heat resistance was measured by the method described in Example III 2-1.

TABLE 21

| Table III-6 | | Example III 5-3 | Example III 5-4 | Comparative Example III 5-7 | Comparative Example III 5-8 | Comparative Example III 5-9 | Comparative Example III 5-10 |
|---|---|---|---|---|---|---|---|
| Composition of curable composition (parts by mass) | Epoxy compound (A-1) | 75 | 75 | | | | |
| | the other epoxy compound (III B-1) | | | 75 | | 75 | |
| | the other epoxy compound (III B-2) | | | | 75 | | 75 |
| | Oxetane compound (III C-2) | 25 | | 25 | 25 | | |
| | Oxetane compound (III C-4) | | 25 | | | 25 | 25 |
| | Thermal cationic polymerization initiator (III D-1) | 2 | 2 | 2 | 2 | 2 | 2 |
| Heat resistance (° C.)[1] | | 253 | 258 | 145 | 245 | 124 | 257 |

Note
[1] Heat resistance was measured by the method described in Example III 2-1.

III-6. Examples III 6: Preparation of Curable Compositions Containing Epoxy Compound (A-1) and Evaluation Thereof (Part 6: Combination with Various Types of Thermal Cationic Polymerization Initiators)

(1) Examples III 6-1 III 6-4 and Comparative Examples III 6-1 to III 6-4

Curable compositions were obtained in the same manner as in Example III 1-1, except that the following components were used at the compositions shown in Table III-7.
(i) Epoxy Compound (A-1)
The epoxy compound (A-1) obtained by the method described in Preparation Example 1 was used.
(ii) The Other Epoxy Compound (III B-1)
A bisphenol A-type liquid epoxy resin, manufactured by Nippon Steel & Sumikin Chemical Co., Ltd., trade name: YD-128, was used.
(iii) The Other Epoxy Compound (III B-2)
3',4'-Epoxycyclohexylmethyl 3,4-epoxycyclohexane carboxylate, manufactured by Daicel Corporation, trade name: CELLOXIDE 2021P, was used.
(iv) Thermal Cationic Polymerization Initiator (III D-4)
Diphenyl-4-(phenylthio)phenylsulfonium hexafluoroantimonate, manufactured by San-Apro Ltd., CPI-101A, was used.
(v) Thermal Cationic Polymerization Initiator (III D-5)
4-Methylphenyl-4-(1-methylethyl)phenyliodonium tetrakis(pentafluorophenyl)borate, a reagent manufactured by Tokyo Chemical Industry Co., Ltd., was used.

(2) Evaluation of Physical Properties

Each of the curable compositions obtained as described above was heated under each of the following conditions, to obtain a cured product.

(a) Example III 6-1

The curable composition obtained as described above was injected into a metal mold in the same manner as in Example III 1-1, and heated in a hot air circulating oven at 60° C. for one hour, at 90° C. for one hour, at 190° C. for one hour, and then at 240° C. for two hours, to obtain a cured product.

(b) Example III 6-2

The curable composition obtained as described above was injected into a metal mold in the same manner as in Example III 1-1, and heated in a hot air circulating oven at 60° C. for one hour, at 140° C. for one hour, at 200° C. for one hour, and then at 240° C. for two hours, to obtain a cured product.

(c) Example III 6-3

The curable composition obtained as described above was injected into a metal mold in the same manner as in Example III 1-1, and heated in a hot air circulating oven at 100° C. for one hour, at 140° C. for one hour, and then at 200° C. for two hours, to obtain a cured product.

(d) Example III 6-4

The curable composition obtained as described above was injected into a metal mold in the same manner as in Example III 1-1, and heated in a hot air circulating oven at 140° C. for one hour, and then at 210° C. for two hours, to obtain a cured product.

(a') Comparative Example III 6-1

The curable composition obtained as described above was injected into a metal mold in the same manner as in Example III 1-1, and heated in a hot air circulating oven at 70° C. for one hour, at 130° C. for one hour, and then at 170° C. for two hours, to obtain a cured product.

(b') Comparative Example III 6-2

The curable composition obtained as described above was injected into a metal mold in the same manner as in Example III 1-1, and heated in a hot air circulating oven at 80° C. for one hour, at 140° C. for one hour, and then at 180° C. for two hours, to obtain a cured product.

(c') Comparative Example III 6-3

The curable composition obtained as described above was injected into a metal mold in the same manner as in Example III 1-1, and heated in a hot air circulating oven at 130° C. for one hour, at 150° C. for one hour, and then at 230° C. for two hours, to obtain a cured product.

(d') Comparative Example III 6-4

The curable composition obtained as described above was injected into a metal mold in the same manner as in Example III 1-1, and heated in a hot air circulating oven at 140° C. for one hour, at 160° C. for one hour, and then at 240° C. for two hours, to obtain a cured product.

The glass transition temperature of each of the thus obtained cured products was measured in the same manner as in Example III 2-1. The measurement results are summarized in Table III-7.

TABLE 22

| Table III-7 | | Example III 6-1 | Example III 6-2 | Example III 6-3 | Example III 6-4 | Comparative Example III 6-1 | Comparative Example III 6-2 | Comparative Example III 6-3 | Comparative Example III 6-4 |
|---|---|---|---|---|---|---|---|---|---|
| Composition of curable composition (parts by mass) | Epoxy compound (A-1) | 50 | 50 | 50 | 50 | | | | |
| | the other epoxy compound (III B-1) | | 50 | | 50 | | 100 | | 100 |
| | the other epoxy compound (III B-2) | 50 | | 50 | | 100 | | 100 | |
| | Thermal cationic polymerization initiator | 2 | 2 | | | 2 | 2 | | |

TABLE 22-continued

| Table III-7 | Example III 6-1 | Example III 6-2 | Example III 6-3 | Example III 6-4 | Comparative Example III 6-1 | Comparative Example III 6-2 | Comparative Example III 6-3 | Comparative Example III 6-4 |
|---|---|---|---|---|---|---|---|---|
| (III D-4) Thermal cationic polymerization initiator (III D-5) | | | 2 | 2 | | | 2 | 2 |
| Heat resistance (° C.)[1] | 165 | 164 | 128 | 213 | 123 | 110 | 87 | 198 |

Note
[1] Heat resistance was measured by the method described in Example III 2-1.

III-7. Examples III 7: Preparation of Curable Compositions Containing Epoxy Compound (A-1) and Evaluation Thereof (Part 7: Combination with Various Types of the Other Epoxy Compounds and Various Types of Thermal Cationic Polymerization Initiators)

(1) Examples III 7-1 to III 7-8 and Comparative Examples III 7-1 to III 7-8

Curable compositions were obtained in the same manner as in Example III 1-1, except that the following components were used at the compositions shown in Tables III-8 and III-9.
(i) Epoxy Compound (A-1)
The epoxy compound (A-1) obtained by the method described in Preparation Example 1 was used.
(ii) The Other Epoxy Compound (III B-1)
A bisphenol A-type liquid epoxy resin, manufactured by Nippon Steel & Sumikin Chemical Co., Ltd., trade name: YD-128, was used.
(iii) The Other Epoxy Compound (III B-2)
3',4'-Epoxycyclohexylmethyl 3,4-epoxycyclohexane carboxylate, manufactured by Dalcel Corporation, trade name: CELLOXIDE 2021P, was used.
(iv) The Other Epoxy Compound (III B-8)
Tetramethylene glycol diglycidyl ether, a reagent manufactured by Tokyo Chemical Industry Co., Ltd., was used.
(v) The Other Epoxy Compound (III B-9)
Cyclohexanedicarboxylic acid diglycidyl ester, a reagent manufactured by Tokyo Chemical Industry Co., Ltd., was used.
(vi) The Other Epoxy Compound (III B-10)
Vinyl cyclohexene dioxide, a reagent manufactured by Sigma-Aldrich Co., was used.
(vii) The Other Epoxy Compound (III B-14)
Tetrahydroindene diepoxide produced by the method described in JP 2012-116390 A was used.
(viii) The Other Epoxy Compound (III B-16)
The monoepoxy compound produced by the method described in Preparation Example 4 was used.
(ix) Thermal Cationic Polymerization Initiator (III D-1)
An aromatic sulfonium salt: 4-acetoxyphenyldimethylsulfonium hexafluoroantimonate, manufactured by Sanshin Chemical Industry Co., Ltd., trade name: SI-150L, was used.
(x) Thermal Cationic Polymerization Initiator (III D-2)
4-Hydroxyphenylbenzylmethylsulfonium hexafluoroantimonate, manufactured by Sanshin Chemical Industry Co., Ltd., trade name: SI-100L, was used.
(xi) Thermal Cationic Polymerization Initiator (III D-3)
Bis[4-(di(4-(2-hydroxyethoxy))phenylsulfonio)phenyl] sulfide bishexafluoroantimonate, manufactured by ADEKA CORPORATION, ADEKA ARKLS SP-170, was used.

(2) Evaluation of Physical Properties

Each of the curable compositions obtained as described above was heated under each of the following conditions, to obtain a cured product.

(a) Example III 7-1

The curable composition obtained as described above was injected into a metal mold in the same manner as in Example III 1-1, and heated in a hot air circulating oven at 120° C. for one hour, at 150° C. for one hour, and then at 200° C. for two hours, to obtain a cured product.

(b) Example III 7-2

The curable composition obtained as described above was injected into a metal mold in the same manner as in Example III 1-1, and heated in a hot air circulating oven at 110° C. for one hour, at 130° C. for one hour, and then at 220° C. for two hours, to obtain a cured product.

(c) Example III 7-3

The curable composition obtained as described above was Injected into a metal mold in the same manner as in Example III 1-1, and heated in a hot air circulating oven at 100° C. for one hour, and then at 240° C. for two hours, to obtain a cured product.

(d) Example III 7-4

The curable composition obtained as described above was injected into a metal mold in the same manner as in Example III 1-1, and heated in a hot air circulating oven at 150° C. for one hour, at 180° C. for one hour, and then at 210° C. for two hours, to obtain a cured product.

(e) Example III 7-5

The curable composition obtained as described above was injected into a metal mold in the same manner as in Example III 1-1, and heated in a hot air circulating oven at 120° C. for one hour, and then at 210° C. for two hours, to obtain a cured product.

(f) Example III 7-6

The curable composition obtained as described above was injected into a metal mold in the same manner as in Example III 1-1, and heated in a hot air circulating oven at 120° C. for one hour, at 160° C. for one hour, and then at 220° C. for two hours, to obtain a cured product.

(g) Example III 7-7

The curable composition obtained as described above was injected into a metal mold in the same manner as in Example III 1-1, and heated in a hot air circulating oven at 70° C. for one hour, at 120° C. for one hour, and then at 220° C. for two hours, to obtain a cured product.

(h) Example III 7-8

The curable composition obtained as described above was injected into a metal mold in the same manner as in Example III 1-1, and heated in a hot air circulating oven at 120° C. for one hour, at 190° C. for one hour, and then at 240° C. for two hours, to obtain a cured product.

(a') Comparative Example III 7-1

The curable composition obtained as described above was Injected into a metal mold in the same manner as in Example III 1-1, and heated in a hot air circulating oven at 150° C. for one hour, at 170° C. for one hour, and then at 210° C. for two hours, to obtain a cured product.

(b') Comparative Example III 7-2

The curable composition obtained as described above was injected into a metal mold in the same manner as in Example III 1-1, and heated in a hot air circulating oven at 120° C. for one hour, at 130° C. for one hour, and then at 190° C. for two hours, to obtain a cured product.

(c') Comparative Example III 7-3

The curable composition obtained as described above was injected into a metal mold in the same manner as in Example III 1-1, and heated in a hot air circulating oven at 115° C. for one hour, at 130° C. for one hour, at 190° C. for one hour, and then at 240° C. for two hours, to obtain a cured product.

(d') Comparative Example III 7-4

The curable composition obtained as described above was injected into a metal mold in the same manner as in Example III 1-1, and heated in a hot air circulating oven at 170° C. for one hour, and then at 210° C. for two hours, to obtain a cured product.

(e') Comparative Example III 7-5

The curable composition obtained as described above was injected into a metal mold in the same manner as in Example III 1-1, and heated in a hot air circulating oven at 120° C. for one hour, and then at 220° C. for two hours, to obtain a cured product.

(f') Comparative Example III 7-6

The curable composition obtained as described above was injected into a metal mold in the same manner as in Example III 1-1, and heated in a hot air circulating oven at 120° C. for one hour, and then at 220° C. for two hours, to obtain a cured product.

(g') Comparative Example III 7-7

The curable composition obtained as described above was injected into a metal mold in the same manner as in Example III 1-1, and heated in a hot air circulating oven at 80° C. for one hour, at 120° C. for one hour, at 240° C. for one hour, and then at 240° C. for two hours, to obtain a cured product.

(h') Comparative Example III 7-8

The curable composition obtained as described above was injected into a metal mold in the same manner as in Example III 1-1, and heated in a hot air circulating oven at 120° C. for one hour, and then at 140° C. for two hours, to obtain a cured product.

The glass transition temperature of each of the thus obtained cured products was measured in the same manner as in Example III 2-1. The measurement results are summarized in Tables III-8 and III-9.

TABLE 23

| Table III-8 | | Example III 7-1 | Example III 7-2 | Example III 7-3 | Example III 7-4 | Comparative Example III 7-1 | Comparative Example III 7-2 | Comparative Example III 7-3 | Comparative Example III 7-4 |
|---|---|---|---|---|---|---|---|---|---|
| Composition of curable composition (parts by mass) | Epoxy compound (A-1) | 50 | 50 | 50 | 50 | | | | |
| | the other epoxy compound (III B-1) | | | 50 | | | | 100 | |
| | the other epoxy compound (III B-8) | | | | 50 | | | | 100 |
| | the other epoxy compound (III B-9) | 50 | | | | 100 | | | |
| | the other epoxy compound (III B-14) | | 50 | | | | 100 | | |
| | Thermal cationic polymerization initiator (III D-1) | 2 | 2 | 2 | 2 | 2 | 2 | 2 | 2 |

TABLE 23-continued

| Table III-8 | | Example III 7-1 | Example III 7-2 | Example III 7-3 | Example III 7-4 | Comparative Example III 7-1 | Comparative Example III 7-2 | Comparative Example III 7-3 | Comparative Example III 7-4 |
|---|---|---|---|---|---|---|---|---|---|
| Thermal cationic polymerization initiator (III D-2) | | | | 2 | | | | 2 | |
| Heat resistance (° C.)[1] | | 119 | 230 | 253 | 186 | 90 | 197 | 158 | 76 |

Note
[1] Heat resistance was measured by the method described in Example III 2-1

TABLE 24

| Table III-9 | | Example III 7-5 | Example III 7-6 | Example III 7-7 | Example III 7-8 | Comparative Example III 7-5 | Comparative Example III 7-6 | Comparative Example III 7-7 | Comparative Example III 7-8 |
|---|---|---|---|---|---|---|---|---|---|
| Composition of curable composition (parts by mass) | Epoxy compound (A-1) | 50 | 50 | 50 | 50 | | | | |
| | the other epoxy compound (III B-1) | | | | 50 | | | | 100 |
| | the other epoxy compound (III B-2) | | 37.5 | 50 | | | 87.5 | 100 | |
| | the other epoxy compound (III B-10) | 50 | | | | 100 | | | |
| | the other epoxy compound (III B-16) | | 12.5 | | | | 12.5 | | |
| | Thermal cationic polymerization initiator (III D-1) | 2 | 2 | | | 2 | 2 | | |
| | Thermal cationic polymerization initiator (III D-3) | | | 2 | 2 | | | 2 | 2 |
| Heat resistance (° C.)[1] | | 246 | 227 | 161 | 239 | 236 | 211 | 109 | 230 |

Note
[1] Heat resistance was measured by the method described in Example III 2-1.

IV. Examples of Aspect IV of the Present Invention

IV-1. Examples IV 1: Preparation of Curable Composition Containing Epoxy Compound (A-3) and Evaluation Thereof (Part 1: Evaluation in the Case of Using Acid Anhydride-Type Curing Agent)

(1) Example IV 1-1

Production of Curable Composition

The epoxy compound (A-3) obtained as described above, the other epoxy compound (IV B-1), an acid anhydride-based curing agent, a curing accelerator and a compound containing a hydroxyl group were mixed to achieve the following composition, to prepare a curable composition.

<Composition of Curable Composition>

| Epoxy compound (A-3) | 75 parts by mass (the epoxy compound (A-3) obtained by the method described in the above Preparation Example 3 |
| the other epoxy compound (IV B-1) | 25 parts by mass (a bisphenol A-type liquid epoxy resin, manufactured by Nippon Steel & Sumikin Chemical Co., Ltd., trade name: YD-128) |
| Acid anhydride-based curing agent | 123 parts by mass (a mixture of 4-methylhexahydrophthalic anhydride and hexahydrophthalic anhydride, manufactured by New Japan Chemical Co., Ltd., trade name: MH-700; an amount corresponding to 0.9 equivalent with respect to one equivalent of the epoxy compound (A-3)) |
| Curing accelerator (IV C-1) | 2 parts by mass (2-ethyl-4-methylimidazole, manufactured by Shikoku Chemicals Corporation, trade name: 2E4MZ) |
| Compound containing a hydroxyl group | 5 parts by mass (ethylene glycol, a reagent manufactured by Wako Pure Chemical Industries, Ltd.) |

The curable composition obtained as described above was heated in a hot air circulating oven at 110° C. for one hour, at 120° C. for two hours, at 190° C. for one hour, and then at 240° C. for two hours, to obtain a cured product.

<<Performance Evaluation>>

<Moisture Resistance>

The water absorption rate of the cured product obtained as described above was measured in accordance with Method A described in JIS K7209, and the moisture resistance of the cured product was evaluated. The measurement results are summarized in Table IV-1.

<Heat Resistance>

The glass transition temperature of the thus obtained cured product was measured by increasing the temperature from 30 to 300° C. at a rate of 10° C./min, using a differential scanning calorimeter (manufactured by Hitachi High-Tech Science Corporation, trade name: DSC7020), and the thus measured value was taken as the heat resistance of the cured product. The glass transition temperature as used herein refers to a value measured in accordance with 3IS K7121, based on "Midpoint Glass Transition Temperature: $T_{mg}$" described in the section of "Method for Measuring Transition Temperature of Plastics". The measurement results are summarized in Table IV-1.

<Overall Evaluation>

The overall evaluation of the curable composition obtained in the above described Example was carried out according to the following evaluation criteria. The evaluation results are summarized in Table IV-1.

○: The resulting cured product has a water absorption rate of less than 0.50% and a heat resistance of 160° C. or higher.

The water absorption rate and the glass transition temperature of the thus obtained cured product were measured. The measurement results are summarized in Table IV-1.

(4) Comparative Example IV 1-2

A curable composition was obtained in the same manner as in Example IV 1, except that the composition of the curable composition was changed to that shown in Table IV-1.

The curable composition obtained as described above was heated in a hot air circulating oven at 100° C. for two hours, at 160° C. for two hours, and then at 220° C. for two hours, to obtain a cured product.

The water absorption rate and the glass transition temperature of the thus obtained cured product were measured. The measurement results are summarized in Table IV-1.

TABLE 25

| Table IV-1 | | Example IV 1-1 | Example IV 1-2 | Example IV 1-3 | Example IV 1-4 | Comparative Example IV 1-1 | Comparative Example IV 1-2 |
|---|---|---|---|---|---|---|---|
| Composition of curable composition (parts by mass) | Epoxy compound (A-3) | 75 | 50 | 75 | 50 | | |
| | the other epoxy compound (IV B-1) | 25 | 50 | | | 100 | |
| | the other epoxy compound (IV B-2) | | | 25 | 50 | | 100 |
| | Acid anhydride-based curing agent | 123 | 109 | 132 | 126 | 81 | 115 |
| | Curing accelerator (IV C-1) | 2 | 2 | 2 | 2 | 1 | 1 |
| | Compound containing hydroxyl group | 5 | 5 | 5 | 5 | | |
| | Water absorption rate (%) | 0.33 | 0.29 | 0.44 | 0.45 | 0.18 | 0.6 |
| | Heat resistance (° C.) | 179 | 161 | 197 | 191 | 158 | 233 |
| | Overall evaluation | ○ | ○ | ○ | ○ | x | x | x: The resulting cured product has a water absorption rate of 0.50% or more and/or a heat resistance of less than 160° C., and thus has problems in practical use.

(2) Examples IV 1-2 to IV 1-4

Curable compositions were obtained in the same manner as in Example IV 1, except that the compositions of the curable compositions were changed to those shown in Table IV-1.

Cured products were obtained in the same manner as in Example IV 1 from the curable compositions prepared as described above, and then the water absorption rate and the glass transition temperature of each of the cured products were measured. The measurement results are summarized in Table IV-1.

(3) Comparative Example IV 1-1

A curable composition was obtained in the same manner as in Example IV 1, except that the composition of the curable composition was changed to that shown in Table IV-1.

The curable composition obtained as described above was heated in a hot air circulating oven at 100° C. for two hours, and then at 160° C. for four hours, to obtain a cured product.

The respective components used for the preparation of the respective curable compositions shown in Table IV-1 are as follows.

the other epoxy compound (IV B-2): 3,4-epoxycyclohexylmethyl 3,4-epoxycyclohexane carboxylate, manufactured by Daicel Corporation, trade name: CELLOXIDE 2021P.

IV-2. Examples IV 2: Preparation of Curable Compositions Containing Epoxy Compound (A-3) and Evaluation Thereof (Part 2: Combination with Various Types of the Other Epoxy Compounds and Acid Anhydride-based Curing Agent)

(1) Examples IV 2-1 to IV 2-13 and Comparative Examples IV 2-1 to IV 2-14

Curable compositions were obtained in the same manner as in Example IV 1-1 except that the following components were used at the compositions shown in Tables IV-2 to IV-4.

(i) Epoxy Compound (A-3)

The epoxy compound (A-3) obtained by the method described in the above Preparation Example 3 was used.

(ii) The Other Epoxy Compound (IV B-1)

A bisphenol A-type liquid epoxy resin, manufactured by Nippon Steel & Sumikin Chemical Co., Ltd., trade name: YD-128, was used.

(iii) The Other Epoxy Compound (IV B-2)

3',4'-Epoxycyclohexylmethyl 3,4-epoxycyclohexane carboxylate, manufactured by Daicel Corporation, trade name: CELLOXIDE 2021P, was used.

(iv) The Other Epoxy Compound (IV B-3)
A cresol novolac type epoxy resin, manufactured by DIC Corporation, trade name: N-660, was used.
(v) The Other Epoxy Compound (IV B-4)
A phenol novolac type epoxy resin, manufactured by Nippon Steel & Sumikin Chemical Co., Ltd., trade name: YDPN-638, was used.
(vi) The Other Epoxy Compound (IV B-5)
A bisphenol F-type liquid epoxy resin, manufactured by Nippon Steel & Sumikin Chemical Co., Ltd., trade name: YDF-170, was used.
(vii) The Other Epoxy Compound (IV B-6)
A hydrogenated bisphenol A-type liquid epoxy resin, manufactured by Mitsubishi Chemical Corporation, trade name: YX8000, was used.
(viii) The Other Epoxy Compound (IV B-7)
Triglycidyl isocyanurate, manufactured by Nissan Chemical Industries, Ltd., trade name: TEPIC-S, was used.
(ix) The Other Epoxy Compound (IV B-8)
Tetramethylene glycol diglycidyl ether, a reagent manufactured by Tokyo Chemical Industry Co., Ltd., was used.
(x) The Other Epoxy Compound (IV B-9)
Cyclohexanedicarboxylic acid diglycidyl ester, a reagent manufactured by Tokyo Chemical Industry Co., Ltd., was used.
(xi) The Other Epoxy Compound (IV B-10)
Vinyl cyclohexene dioxide, a reagent manufactured by Sigma-Aldrich Co., was used.
(xii) The Other Epoxy Compound (IV B-11)
1,2-Epoxy-(2-oxiranyl)cyclohexane adduct of 2,2-bis(hydroxymethyl)-1-butanol, manufactured by Daicel Corporation, trade name: EHPE 3150, was used.
(xiii) The Other Epoxy Compound (IV B-12)
Limonene dioxide, a reagent manufactured by Sigma-Aldrich Co., was used.
(xiv) The Other Epoxy Compound (IV B-13)
(3,3',4,4'-Diepoxy)bicyclohexyl, manufactured by Daicel Corporation, trade name: CELLOXIDE 8000, was used.
(xv) The Other Epoxy Compound (IV B-14)
Tetrahydroindene diepoxide produced by the method described in JP 2012-116390 A was used.
(xvi) The Other Epoxy Compound (IV B-16)
The monoepoxy compound produced by the method described in Preparation Example 4 was used.
(xvii) Acid Anhydride-Based Curing Agent
A mixture of 4-methylhexahydrophthalic anhydride and hexahydrophthalic anhydride, manufactured by New Japan Chemical Co., Ltd., trade name: MH-700, was used.
(xviii) Curing Accelerator (IV C-1)
2-Ethyl-4-methylimidazole, manufactured by Shikoku Chemicals Corporation, trade name: 2E4MZ, was used.
(xix) Curing Accelerator (IV C-2)
1,8-Diazabicyclo(5,4,0)undecene-7, a reagent manufactured by Tokyo Chemical Industry Co., Ltd. was used.
(xx) Compound Containing Hydroxyl Group
Ethylene glycol, a reagent manufactured by Wako Pure Chemical Industries, Ltd. was used.

(2) Performance Evaluation (Heat Resistance of Cured Product from Curable Composition)
Each of the curable compositions obtained as described above was heated under each of the following conditions, to obtain a cured product.

(a) Example IV 2-1

The curable composition obtained as described above was heated in a hot air circulating oven at 100° C. for one hour, at 170° C. for one hour, and then at 240° C. for two hours, to obtain a cured product.

(b) Example IV 2-2

The curable composition obtained as described above was heated in a hot air circulating oven at 100° C. for one hour, at 150° C. for one hour, and then at 180° C. for two hours, to obtain a cured product.

(c) Example IV 2-3

The curable composition obtained as described above was heated in a hot air circulating oven at 90° C. for one hour, at 140° C. for one hour, and then at 180° C. for two hours, to obtain a cured product.

(d) Example IV 2-4

The curable composition obtained as described above was heated in a hot air circulating oven at 90° C. for one hour, at 130° C. for one hour, and then at 160° C. for two hours, to obtain a cured product.

(e) Example IV 2-5

The curable composition obtained as described above was heated in a hot air circulating oven at 90° C. for one hour, at 130° C. for one hour, and then at 170° C. for two hours, to obtain a cured product.

(f) Example IV 2-6

The curable composition obtained as described above was heated in a hot air circulating oven at 100° C. for one hour, at 140° C. for one hour, and then at 240° C. for two hours, to obtain a cured product.

(g) Example IV 2-7

The curable composition obtained as described above was heated in a hot air circulating oven at 70° C. for one hour, at 120° C. for one hour, at 170° C. for one hour, and then at 230° C. for two hours, to obtain a cured product.

(h) Example IV 2-8

The curable composition obtained as described above was heated in a hot air circulating oven at 90° C. for one hour, at 130° C. for one hour, and then at 160° C. for two hours, to obtain a cured product.

(i) Example IV 2-9

The curable composition obtained as described above was heated in a hot air circulating oven at 70° C. for one hour, at 120° C. for one hour, at 170° C. for one hour, and then at 210° C. for two hours, to obtain a cured product.

(j) Example IV 2-10

The curable composition obtained as described above was heated in a hot air circulating oven at 70° C. for one hour, at 130° C. for one hour, and then at 140° C. for two hours, to obtain a cured product.

(k) Example IV 2-11

The curable composition obtained as described above was heated in a hot air circulating oven at 90° C. for one hour, at 140° C. for one hour, and then at 240° C. for two hours, to obtain a cured product.

(l) Example IV 2-12

The curable composition obtained as described above was heated in a hot air circulating oven at 90° C. for one hour, at 140° C. for one hour, at 180° C. for one hour, and then at 240° C. for two hours, to obtain a cured product.

(m) Example IV 2-13

The curable composition obtained as described above was heated in a hot air circulating oven at 90° C. for one hour, and then at 180° C. for two hours, to obtain a cured product.

(a') Comparative Example IV 2-1

The curable composition obtained as described above was heated in a hot air circulating oven at 130° C. for one hour, at 160° C. for one hour, and then at 180° C. for two hours, to obtain a cured product.

(b') Comparative Example IV 2-2

The curable composition obtained as described above was heated in a hot air circulating oven at 120° C. for one hour, at 150° C. for one hour, and then at 170° C. for two hours, to obtain a cured product.

(c') Comparative Example IV 2-3

The curable composition obtained as described above was heated in a hot air circulating oven at 90° C. for one hour, at 140° C. for one hour, and then at 180° C. for two hours, to obtain a cured product.

(d') Comparative Example IV 2-4

The curable composition obtained as described above was heated in a hot air circulating oven at 90° C. for one hour, at 130° C. for one hour, and then at 160° C. for two hours, to obtain a cured product.

(e') Comparative Example IV 2-5

The curable composition obtained as described above was heated in a hot air circulating oven at 80° C. for one hour, at 130° C. for one hour, and then at 170° C. for two hours, to obtain a cured product.

(f') Comparative Example IV 2-6

The curable composition obtained as described above was heated in a hot air circulating oven at 100° C. for one hour, at 140° C. for one hour, and then at 240° C. for two hours, to obtain a cured product.

(g') Comparative Example IV 2-7

The curable composition obtained as described above was heated in a hot air circulating oven at 60° C. for one hour, at 110° C. for one hour, at 160° C. for one hour, and then at 240° C. for two hours, to obtain a cured product.

(h') Comparative Example IV 2-8

The curable composition obtained as described above was heated in a hot air circulating oven at 80° C. for one hour, at 120° C. for one hour, and then at 150° C. for two hours, to obtain a cured product.

(i') Comparative Example IV 2-9

The curable composition obtained as described above was heated in a hot air circulating oven at 70° C. for one hour, at 100° C. for one hour, at 190° C. for one hour, and then at 240° C. for two hours, to obtain a cured product.

(j') Comparative Example IV 2-10

The curable composition obtained as described above was heated in a hot air circulating oven at 70° C. for one hour, at 130° C. for one hour, and then at 240° C. for two hours, to obtain a cured product.

(k') Comparative Example IV 2-11

The curable composition obtained as described above was heated in a hot air circulating oven at 90° C. for one hour, at 140° C. for one hour, and then at 240° C. for two hours, to obtain a cured product.

(l') Comparative Example IV 2-12

The curable composition obtained as described above was heated in a hot air circulating oven at 90° C. for one hour, at 140° C. for one hour, and then at 180° C. for two hours, to obtain a cured product.

(m') Comparative Example IV 2-13

The curable composition obtained as described above was heated in a hot air circulating oven at 90° C. for one hour, at 140° C. for one hour, and then at 180° C. for two hours, to obtain a cured product.

(n') Comparative Example IV 2-14

The curable composition obtained as described above was heated in a hot air circulating oven at 90° C. for one hour, and then at 180° C. for two hours, to obtain a cured product.

The heat resistance (glass transition temperature) of each of the thus obtained cured products was measured in the same manner as in Example IV 1-1. The measurement results are summarized in Tables IV-2 to IV-4.

TABLE 26

| Table IV-2 | | Example IV 2-1 | Example IV 2-2 | Example IV 2-3 | Example IV 2-4 | Example IV 2-5 | Comparative Example IV 2-1 | Comparative Example IV 2-2 | Comparative Example IV 2-3 | Comparative Example IV 2-4 | Comparative Example IV 2-5 |
|---|---|---|---|---|---|---|---|---|---|---|---|
| Composition of curable composition (parts by mass) | Epoxy compound (A-3) | 50 | 50 | 50 | 50 | 50 | | | | | |
| | the other epoxy compound (IV B-2) | | | | | 25 | | | | | 50 |
| | the other epoxy compound (IV B-3) | 50 | | | | | 100 | | | | |
| | the other epoxy compound (IV B-4) | | 50 | | | | | 100 | | | |
| | the other epoxy compound (IV B-6) | | | 50 | | | | | 100 | | |
| | the other epoxy compound (IV B-7) | | | | 50 | | | | | 100 | |
| | the other epoxy compound (IV B-11) | | | | | 25 | | | | 100 | 50 |
| | Acid anhydride-based curing agent | 106 | 111 | 107 | 144 | 118 | 74 | 84 | 76 | 151 | 99 |
| | Curing accelerator (IV C-1) | 2 | 2 | 2 | 2 | 2 | 2 | 2 | 2 | 2 | 2 |
| | Compound containing hydroxyl group | 5 | 5 | 5 | 5 | 5 | 5 | 5 | | | |
| Heat resistance (° C.) | | 186 | 132 | 257 | 253 | 283 | 149 | 113 | 220 | 209 | 232 |

TABLE 27

| Table IV-3 | | Example IV 2-6 | Example IV 2-7 | Example IV 2-8 | Example IV 2-9 | Comparative Example IV 2-6 | Comparative Example IV 2-7 | Comparative Example IV 2-8 | Comparative Example IV 2-9 |
|---|---|---|---|---|---|---|---|---|---|
| Composition of curable composition (parts by mass) | Epoxy compound (A-3) | 50 | 50 | 50 | 50 | | | | |
| | the other epoxy compound (IV B-5) | 50 | | | | 100 | | | |
| | the other epoxy compound (IV B-9) | | | 50 | | | | 100 | |
| | the other epoxy compound (IV B-10) | | 50 | | | | 100 | | |
| | the other epoxy compound (IV B-14) | | | | 50 | | | | 100 |
| | Acid anhydride-based curing agent | 113 | 177 | 122 | 162 | 89 | 216 | 106 | 187 |
| | Curing accelerator (IV C-1) | 2 | 2 | 2 | 2 | 2 | 2 | 2 | 2 |
| | Compound containing hydroxyl group | 5 | 5 | 5 | 5 | | | | |
| Heat resistance (° C.) | | 120 | 158 | 276 | 268 | 92 | 137 | 102 | 126 |

TABLE 28

| Table IV-4 | | Example IV 2-10 | Example IV 2-11 | Example IV 2-12 | Example IV-13 | Comparative Example IV 2-10 | Comparative Example IV 2-11 | Comparative Example IV 2-12 | Comparative Example IV-13 | Comparative Example IV 2-14 |
|---|---|---|---|---|---|---|---|---|---|---|
| Composition of curable composition (parts by mass) | Epoxy compound (A-3) | 50 | 50 | 67 | 50 | | | | | |
| | the other epoxy compound (IV B-1) | | | | | | | 67 | | |
| | the other epoxy compound (IV B-2) | | | | | | | | 67 | |
| | the other epoxy compound (IV B-8) | | 50 | | | 100 | | | | |

TABLE 28-continued

| Table IV-4 | Example IV 2-10 | Example IV 2-11 | Example IV 2-12 | Example IV-13 | Comparative Example IV 2-10 | Comparative Example IV 2-11 | Comparative Example IV 2-12 | Comparative Example IV-13 | Comparative Example IV 2-14 |
|---|---|---|---|---|---|---|---|---|---|
| the other epoxy compound (IV B-12) | | | | 50 | | | | | 100 |
| the other epoxy compound (IV B-13) | 50 | | | | 100 | | | | |
| the other epoxy compound (IV B-16) | | | 33 | | | | | 33 | 33 |
| Acid anhydride-based curing agent | 147 | 144 | 118 | 159 | 156 | 150 | 80 | 104 | 180 |
| Curing accelerator (IV C-1) | | 2 | 2 | 2 | | 2 | 2 | 2 | 2 |
| Curing accelerator (IV C-2) | 2 | | | | 2 | | | | |
| Compound containing hydroxyl group | 5 | 5 | 5 | 5 | 2 | | 5 | 5 | 5 |
| Heat resistance (° C.) | 207 | 95 | 161 | 81 | 152 | 86 | 101 | 105 | 57 |

V. Examples of Aspect V of the Present Invention

V-1. Examples V 1: Preparation of Curable Compositions Containing Epoxy Compound (A-1) or Epoxy Compound (A-2) and Evaluation Thereof (Part 1: Comparison with the Other Epoxy Compounds)

(1) Example V 1-1

Production of Curable Composition

The epoxy compound (A-1) obtained as described above, a photo-cationic polymerization Initiator (V D-1) and the other epoxy compound (V B-2) were mixed to achieve the following composition, to prepare a curable composition.
<Composition of Curable Composition>

| | |
|---|---|
| Epoxy compound (A-1) | 25 parts by mass (the epoxy compound produced by the method described in Preparation Example 1) |
| the other epoxy compound (V B-2) | 75 parts by mass (a bisphenol A-type liquid epoxy resin, manufactured by Nippon Steel & Sumikin Chemical Co., Ltd., trade name: YD-128) |
| Photo-cationic polymerization initiator (V D-1) | 10 parts by mass (a 50% propylene carbonate solution of an aromatic sulfonium salt: diphenyl-4-(phenylthio)phenylsulfonium hexafluorophosphate, manufactured by San-Apro Ltd., trade name: CPT-100P) |

(2) Example V 1-2

Production of Curable Composition

A curable composition was obtained in the same manner as in Example V 1-1, except that the epoxy compound (A-2) (the epoxy compound produced by the method described in Preparation Example 2) was used instead of the epoxy compound (A-1).

(3) Comparative Example V 1-1

A curable composition was obtained in the same manner as in Example V 1-1, except that the epoxy compound (A-1) was not incorporated, and the other epoxy compound (V B-2) was used in an amount of 100 parts by mass in the composition.

(4) Comparative Example V 1-2

A curable composition was obtained in the same manner as in Example V 1-1, except that that the epoxy compound (A-1) was not incorporated, and 75 parts by mass of the other epoxy compound (V B-2) and 25 parts by mass of the other epoxy compound (V B-3) (3,4-epoxycyclohexylmethyl 3,4-epoxycyclohexane carboxylate, manufactured by Daicel Corporation, trade name: CELLOXIDE 2021P) were used in the composition.

(5) Comparative Example V 1-3

A curable composition was obtained in the same manner as in Example V 1-1, except that that the epoxy compound (A-1) was not incorporated, and 25 parts by mass of the other epoxy compound (V B-2) and 75 parts by mass of the other epoxy compound (V B-3) were used in the composition.

(6) Comparative Example V 1-4

A curable composition was obtained in the same manner as in Example V 1-1, except that the other epoxy compound (V B-1) (dicyclopentadiene diepoxide) represented by the following Formula was used instead of the epoxy compound (A-1).

[Chem. 17]

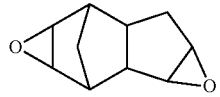

(7) Evaluation of Curable Compositions

<Heat Resistance (Weight Reduction Temperature)>
Each of the curable compositions obtained in the above described Examples V 1-1 and V 1-2, and Comparative Examples V 1-1 to V 1-4 was coated on a glass substrate to a coating thickness of 50 µm. Each coated substrate was Irradiated with UV light at room temperature (23° C.) such that the accumulated amount of light was 3,000 mJ/cm². The curable composition was cured. Next, the cured product was scraped off from each glass substrate, and the measurement of the weight reduction temperature was carried out using a simultaneous thermogravimetric analyzer (manufactured by Hitachi High-Tech Science Corporation, trade name: TG/DTA 7200). About 10 mg of the cured product was heated from room temperature to 550° C. at a constant temperature increase rate of 10° C./min in dry air, and the 1% weight reduction temperature, 3% weight reduction temperature, 5% weight reduction temperature and 10% weight reduction temperature of each cured product were measured. The measurement results are summarized in Table V-1.

TABLE 29

| Table V-1 | | Example V 1-1 | Example V 1-2 | Comparative Example V 1-1 | Comparative Example V 1-2 | Comparative Example V 1-3 | Comparative Example V 1-4 |
|---|---|---|---|---|---|---|---|
| Composition of curable composition (parts by mass) | Epoxy compound (A-1) | 25 | | | | | |
| | Epoxy compound (A-2) | | 25 | | | | |
| | the other epoxy compound (V B-1) | | | | | | 25 |
| | the other epoxy compound (V B-2) | 75 | 75 | 100 | 75 | 25 | 75 |
| | the other epoxy compound (V B-3) | | | | 25 | 75 | |
| | Photo-cationic polymerization initiator (V D-1) | 10 | 10 | 10 | 10 | 10 | 10 |
| 1% Weight reduction temperature (° C.) | | 135 | 141 | 112 | 115 | 110 | 100 |
| 3% Weight reduction temperature (° C.) | | 230 | 235 | 172 | 180 | 190 | 134 |
| 5% Weight reduction temperature (° C.) | | 288 | 286 | 268 | 219 | 271 | 188 |
| 10% Weight reduction temperature (° C.) | | 320 | 319 | 325 | 261 | 313 | 288 |

V-2. Examples V 2: Preparation of Curable Compositions Containing Epoxy Compound (A-1) or Epoxy Compound (A-2) and Evaluation Thereof (Part 2: Comparison with the Other Epoxy Compound)

(1) Example V 2-1

Production of Curable Composition

The epoxy compound (A-1) obtained as described above, the photo-cationic polymerization initiator (V D-1) and the other epoxy compound (V B-3) were mixed to achieve the following composition, to prepare a curable composition.

<Composition of Curable Composition>

| Epoxy compound (A-1) | 25 parts by mass (the epoxy compound produced by the method described in Preparation Example 1) |
| the other epoxy compound (V B-3) | 75 parts by mass (3',4'-epoxycyclohexylmethyl 3,4-epoxycyclohexane carboxylate, manufactured by Daicel Corporation, trade name: CELLOXIDE 2021P) |
| Photo-cationic polymerization initiator (V D-1) | 10 parts by mass (a 50% propylene carbonate solution of an aromatic sulfonium salt: diphenyl-4-(phenylthio) phenylsulfonium hexafluorophosphate, manufactured by San-Apro Ltd., trade name: CPI-100P) |

(2) Example V 2-2

Production of Curable Composition

A curable composition was obtained in the same manner as in Example V 2-1, except that the epoxy compound (A-2) (the epoxy compound produced by the method described in Preparation Example 2) was used instead of the epoxy compound (A-1).

(3) Comparative Example V 2-1

A curable composition was obtained in the same manner as in Example V 2-1, except that the epoxy compound (A-1) was not incorporated, and 100 parts by mass of the other epoxy resin (V B-3) was used in the composition.

(4) Comparative Example V 2-2

A curable composition was obtained in the same manner as in Example V 2-1, except that the other epoxy compound (V B-1) (dicyclopentadiene diepoxide) was used instead of the epoxy compound (A-1).

(5) Evaluation of Curable Compositions

<Heat Resistance (Weight Reduction Temperature)>

Each of the curable compositions obtained in the above described Examples V 2-1 and V 2-2, and Comparative Examples V 2-1 and V 2-2 was coated on a glass substrate to a coating thickness of 50 µm. Each coated substrate was Irradiated with UV light at room temperature (23° C.) such that the accumulated amount of light was 3,000 mJ/cm². The curable composition was cured. Next, the cured product was scraped off from each glass substrate, and the measurement of the weight reduction temperature was carried out using a simultaneous thermogravimetric analyzer (manufactured by Hitachi High-Tech Science Corporation, trade name: TG/DTA 7200). About 10 mg of the cured product was heated from room temperature to 550° C. at a constant temperature increase rate of 10° C./min in dry air, and the 1% weight reduction temperature, 3% weight reduction temperature, 5% weight reduction temperature and 10% weight reduction temperature of each cured product were measured. The measurement results are summarized in Table V-2.

TABLE 30

| Table V-2 | | Example V 2-1 | Example V 2-2 | Comparative Example V 2-1 | Comparative Example V 2-2 |
|---|---|---|---|---|---|
| Composition of curable composition (parts by mass) | Epoxy compound (A-1) | 25 | | | |
| | Epoxy compound (A-2) | | 25 | | |
| | the other epoxy compound (V B-1) | | | | 25 |
| | the other epoxy compound (V B-3) | 75 | 75 | 100 | 75 |
| | Photo-cationic polymerization initiator (V D-1) | 10 | 10 | 10 | 10 |
| 1% Weight reduction temperature (° C.) | | 142 | 139 | 120 | 110 |
| 3% Weight reduction temperature (° C.) | | 197 | 196 | 172 | 140 |
| 5% Weight reduction temperature (° C.) | | 240 | 227 | 197 | 164 |
| 10% Weight reduction temperature (° C.) | | 276 | 275 | 242 | 247 |

V-3. Examples V 3: Preparation of Curable Compositions Containing Epoxy Compound (A-1) or Epoxy Compound (A-2) and Evaluation Thereof (Part 3: Combination with Oxetane Compound and Photo-Cationic Polymerization Initiator)

(1) Example V 3-1

Production of Curable Composition

The epoxy compound (A-1) obtained as described above, the photo-cationic polymerization initiator (V D-1) and an oxetane compound (V C-1) were mixed to achieve the following composition, to prepare a curable composition.

<Composition of Curable Composition>

| Epoxy compound (A-1) | 25 parts by mass (the epoxy compound produced by the method described in Preparation Example 1) |
|---|---|
| Oxetane compound (V C-1) | 75 parts by mass (1,4-bis[(3-ethyl-3-oxetanylmethoxy)methyl]benzene, manufactured by Toagosei Co., Ltd., trade name: ARONE OXETANE OXT-121) |
| Photo-cationic polymerization initiator (V D-1) | 10 parts by mass (a 50% propylene carbonate solution of an aromatic sulfonium salt: diphenyl-4-(phenylthio)phenylsulfonium hexafluorophosphate, manufactured by San-Apro Ltd., trade name: CPI-100P) |

(2) Example V 3:2

Production of Curable Composition

A curable composition was obtained in the same manner as in Example V 3-1, except that the epoxy compound (A-2) (the epoxy compound produced by the method described in Preparation Example 2) was used instead of the epoxy compound (A-1).

(3) Comparative Example V 3-1

Production of Curable Composition

A curable composition was obtained in the same manner as in Example V 3-1, except that the other epoxy compound (V B-2) was used instead of the epoxy compound (A-1).

(4) Comparative Example V 3-2

Production of Curable Composition

A curable composition was obtained in the same manner as in Example V 3-1, except that the other epoxy compound (V B-3) was used instead of the epoxy compound (A-1).

(5) Evaluation of Curable Compositions

<Heat Resistance (Weight Reduction Temperature)>

Each of the curable compositions obtained in the above described Examples V 3-1 and V 3-2, and Comparative Examples V 3-1 and V 3-2 was coated on a glass substrate to a coating thickness of 50 μm. Each coated substrate was irradiated with UV light at room temperature (23° C.) such that the accumulated amount of light was 3,000 mJ/cm². The curable composition was cured. Next, the cured product was scraped off from each glass substrate, and the measurement of the weight reduction temperature was carried out using a simultaneous thermogravimetric analyzer (manufactured by Hitachi High-Tech Science Corporation, trade name: TG/DTA 7200). About 10 mg of the cured product was heated from room temperature to 550° C. at a constant temperature increase rate of 10° C./min in dry air, and the 1% weight reduction temperature, 3% weight reduction temperature, 5% weight reduction temperature and 10% weight reduction temperature of each cured product were measured. The measurement results are summarized in Table V-3.

TABLE 31

| Table V-3 | | Example V 3-1 | Example V 3-2 | Comparative Example V 3-1 | Comparative Example V 3-2 |
|---|---|---|---|---|---|
| Composition of curable composition (parts by mass) | Epoxy compound (A-1) | 25 | | | |
| | Epoxy compound (A-2) | | 25 | | |
| | the other epoxy compound (V B-2) | | | 25 | |
| | the other epoxy compound (V B-3) | | | | 25 |
| | Oxetane compound (V C-1) | 75 | 75 | 75 | 75 |
| | Photo-cationic polymerization initiator (V D-1) | 10 | 10 | 10 | 10 |

TABLE 31-continued

| Table V-3 | Example V 3-1 | Example V 3-2 | Comparative Example V 3-1 | Comparative Example V 3-2 |
|---|---|---|---|---|
| 1% Weight reduction temperature (° C.) | 96 | 99 | 81 | 94 |
| 3% Weight reduction temperature (° C.) | 173 | 160 | 119 | 137 |
| 5% Weight reduction temperature (° C.) | 252 | 231 | 227 | 193 |
| 10% Weight reduction temperature (° C.) | 318 | 263 | 256 | 238 |

V-4. Examples V 4: Preparation of Curable Compositions Containing Epoxy Compound (A-1) or Epoxy Compound (A-2) and Evaluation Thereof (Part 4: Combination with the Other Epoxy Compounds and Photo-Cationic Polymerization Initiator)

(1) Example V 4-1

Production of Curable Composition

The epoxy compound (A-1) obtained as described above, the photo-cationic polymerization initiator (V D-1) and the other epoxy compound (V B-16) were mixed to achieve the following composition, to prepare a curable composition.
<Composition of Curable Composition>

| Epoxy compound (A-1) | 25 parts by mass (the epoxy compound produced by the method described in Preparation Example 1) |
| the other epoxy compound (V B-16) | 75 parts by mass (1,2-epoxy-4-vinylcyclohexane, manufactured by Daicel Corporation, trade name: CELLOXIDE 2000) |
| Photo-cationic polymerization initiator (V D-1) | 10 parts by mass (a 50% propylene carbonate solution of an aromatic sulfonium salt: diphenyl-4-(phenylthio) phenylsulfonium hexafluorophosphate, manufactured by San-Apro Ltd., trade name: CPI-100P) |

(2) Example V 4-2

Production of Curable Composition

A curable composition was obtained in the same manner as in Example V 3-1, except that the epoxy compound (A-2) (the epoxy compound produced by the method described in Preparation Example 2) was used instead of the epoxy compound (A-1).

(3) Comparative Example V 4-1

Production of Curable Composition

A curable composition was obtained in the same manner as in Example V 3-1, except that the other epoxy compound (V B-2) was used instead of the epoxy compound (A-1).

(4) Comparative Example V 4-2

Production of Curable Composition

A curable composition was obtained in the same manner as in Example V 3-1, except that the other epoxy compound (V B-3) was used instead of the epoxy compound (A-1).

(5) Evaluation of Curable Compositions

<Heat Resistance (Weight Reduction Temperature)>

Each of the curable compositions obtained in the above described Examples V 4-1 and V 4-2, and Comparative Examples V 4-1 and V 4-2 was coated on a glass substrate to a coating thickness of 50 μm. Each coated substrate was irradiated with UV light at room temperature (23° C.) such that the accumulated amount of light was 3,000 mJ/cm². The curable composition was cured. Next, the cured product was scraped off from each glass substrate, and the measurement of the weight reduction temperature was carried out using a simultaneous thermogravimetric analyzer (manufactured by Hitachi High-Tech Science Corporation, trade name: TG/DTA 7200). About 10 mg of the cured product was heated from room temperature to 550° C. at a constant temperature increase rate of 10° C./min in dry air, and the 1% weight reduction temperature, 3% weight reduction temperature, 5% weight reduction temperature and 10% weight reduction temperature of each cured product were measured. The measurement results are summarized in Table V-4.

TABLE 32

| Table V-4 | | Example V 4-1 | Example V 4-2 | Comparative Example V 4-1 | Comparative Example V 4-2 |
|---|---|---|---|---|---|
| Composition of curable composition (parts by mass) | Epoxy compound (A-1) | 25 | | | |
| | Epoxy compound (A-2) | | 25 | | |
| | the other epoxy compound (V B-2) | | | 25 | |
| | the other epoxy compound (V B-3) | | | | 25 |
| | the other epoxy compound (V B-16) | 75 | 75 | 75 | 75 |
| | Photo-cationic polymerization initiator (V D-1) | 10 | 10 | 10 | 10 |
| 1% Weight reduction temperature (° C.) | | 117 | 139 | 102 | 118 |
| 3% Weight reduction temperature (° C.) | | 182 | 214 | 138 | 155 |
| 5% Weight reduction temperature (° C.) | | 219 | 241 | 170 | 186 |
| 10% Weight reduction temperature (° C.) | | 264 | 284 | 250 | 246 |

V-5. Examples V 5: Preparation of Curable Compositions Containing Epoxy Compound (A-1) or Epoxy Compound (A-2) and Evaluation Thereof (Part 5: Combination with Various Types of the Other Epoxy Compounds and Photo-Cationic Polymerization Initiator)

(1) Examples V 5-1 to V 5-10 and Comparative Examples V 5-1 to V 5-6

Curable compositions were obtained in the same manner as in Example V 1-1, except that the following components were used, at the compositions shown in Tables V-5 to V-7.

(i) Epoxy Compound (A-1)
The epoxy compound produced by the method described in Preparation Example 1 was used.
(ii) Epoxy Compound (A-2)
The epoxy compound produced by the method described in Preparation Example 2 was used.
(iii) The Other Epoxy Compound (V B-3)
3',4'-Epoxycyclohexylmethyl 3,4-epoxycyclohexane carboxylate, manufactured by Daicel Corporation, trade name: CELLOXIDE 2021P, was used.
(iv) The Other Epoxy Compound (V B-6)
A bisphenol F-type liquid epoxy resin, manufactured by Nippon Steel & Sumikin Chemical Co., Ltd., trade name: YDF-170, was used.
(v) The Other Epoxy Compound (V B-7)
A hydrogenated bisphenol A-type liquid epoxy resin, manufactured by Mitsubishi Chemical Corporation, trade name: YX8000, was used.
(vi) The Other Epoxy Compound (V B-9)
Tetramethylene glycol diglycidyl ether, a reagent manufactured by Tokyo Chemical Industry Co., Ltd., was used.
(vii) The Other Epoxy Compound (V B-10)
Cyclohexanedicarboxylic acid diglycidyl ester, a reagent manufactured by Tokyo Chemical Industry Co., Ltd., was used.
(viii) The Other Epoxy Compound (V B-12)
1,2-Epoxy-(2-oxiranyl)cyclohexane adduct of 2,2-bis(hydroxymethyl)-1-butanol, manufactured by Daicel Corporation, trade name: EHPE 3150, was used.
(ix) The Other Epoxy Compound (V B-17)
The monoepoxy compound produced by the method described in Preparation Example 4 was used.
(x) Photo-Cationic Polymerization Initiator (V D-1)
A 50% propylene carbonate solution of diphenyl-4-(phenylthio)phenylsulfonium hexafluorophosphate, manufactured by San-Apro Ltd., trade name: CPI-100P, was used.

(2) Evaluation of Curable Compositions

<Heat Resistance (Weight Reduction Temperature)>

Each of the curable compositions obtained in the above described Examples V 5-1 to V 5-10 and Comparative Examples V 5-1 to V 5-6 was coated on a glass substrate to a coating thickness of 50 μm. Each coated substrate was irradiated with UV light at room temperature (23° C.) such that the accumulated amount of light was 3,000 mJ/cm². The curable composition was cured. Next, the cured product was scraped off from each glass substrate, and the measurement of the weight reduction temperature was carried out using a simultaneous thermogravimetric analyzer (manufactured by Hitachi High-Tech Science Corporation, trade name: TG/DTA 7200). About 10 mg of the cured product was heated from room temperature to 550° C. at a constant temperature increase rate of 10° C./min in dry air, and the 1% weight reduction temperature, 3% weight reduction temperature, 5% weight reduction temperature and 10% weight reduction temperature of each cured product were measured. The measurement results are summarized in Tables V-5 to V-7.

TABLE 33

| Table V-5 | | Example V 5-1 | Example V 5-2 | Example V 5-3 | Comparative Example V 5-1 | Comparative Example V 5-2 |
|---|---|---|---|---|---|---|
| Composition of curable composition (parts by mass) | Epoxy compound (A-1) | 25 | | 25 | | |
| | Epoxy compound (A-2) | | 25 | | | |
| | the other epoxy compound (V B-6) | 75 | | | 100 | |
| | the other epoxy compound (V B-7) | | 75 | 75 | | 100 |
| | Photo-cationic polymerization initiator (V D-1) | 10 | 10 | 10 | 10 | 10 |
| | 1% Weight reduction temperature (° C.) | 100 | 96 | 95 | 98 | 78 |
| | 3% Weight reduction temperature (° C.) | 177 | 145 | 144 | 156 | 112 |
| | 5% Weight reduction temperature (° C.) | 263 | 226 | 234 | 263 | 201 |
| | 10% Weight reduction temperature (° C.) | 306 | 278 | 279 | 323 | 268 |

TABLE 34

| Table V-6 | | Example V 5-4 | Example V 5-5 | Example V 5-6 | Example V 5-7 | Comparative Example V 5-3 | Comparative Example V 5-4 |
|---|---|---|---|---|---|---|---|
| Composition of curable composition (parts by mass) | Epoxy compound (A-1) | | 25 | | 12.5 | | |
| | Epoxy compound (A-2) | 25 | | 12.5 | | | |
| | the other epoxy compound (V B-3) | | | 75 | 75 | | 75 |
| | the other epoxy compound (V B-9) | 75 | 75 | | | 100 | |
| | the other epoxy compound (V B-10) | | | 12.5 | 12.5 | | 25 |
| | Photo-cationic polymerization initiator (V D-1) | 10 | 10 | 10 | 10 | 10 | 10 |
| | 1% Weight reduction temperature (° C.) | 84 | 88 | 112 | 114 | 40 | 111 |
| | 3% Weight reduction temperature (° C.) | 142 | 155 | 167 | 178 | 47 | 161 |
| | 5% Weight reduction temperature (° C.) | 215 | 225 | 219 | 227 | 61 | 223 |
| | 10% Weight reduction temperature (° C.) | 280 | 276 | 274 | 275 | 193 | 273 |

TABLE 35

| Table V7 | | Example V 5-8 | Comparative Example V 5-5 | Example V 5-9 | Example V 5-10 | Comparative Example V 5-6 |
|---|---|---|---|---|---|---|
| Composition of curable composition (parts by mass) | Epoxy compound (A-1) | 12.5 | | | 25 | |
| | Epoxy compound (A-2) | | | 25 | | |
| | the other epoxy compound (V B-3) | 75 | 75 | | | 25 |
| | the other epoxy compound (V B-12) | 12.5 | 25 | | | |
| | the other epoxy compound (V B-17) | | | 75 | 75 | 15 |
| | Photo-cationic polymerization initiator (V D-1) | 10 | 10 | 10 | 10 | 10 |
| 1% Weight reduction temperature (° C.) | | 115 | 99 | 118 | 114 | 105 |
| 3% Weight reduction temperature (° C.) | | 163 | 148 | 235 | 170 | 152 |
| 5% Weight reduction temperature (° C.) | | 198 | 178 | 255 | 212 | 183 |
| 10% Weight reduction temperature (° C.) | | 238 | 208 | 289 | 270 | 241 |

V-6. Examples V 6: Preparation of Curable Compositions Containing Epoxy Compound (A-1) or Epoxy Compound (A-2) and Evaluation Thereof (Part 6: Combination with Various Types of Oxetane Compounds and Photo-Cationic Polymerization Initiator)

(1) Example V 6-1 and Comparative Example V 6-1

Curable compositions were obtained in the same manner as in Example V 1-1, except that the following components were used, at the compositions shown in Table V-8.
(i) Epoxy Compound (A-2)
The epoxy compound produced by the method described in Preparation Example 2 was used.
(ii) The Other Epoxy Compound (V B-3)
3',4'-Epoxycyclohexylmethyl-3,4-epoxycyclohexane carboxylate, manufactured by Daicel Corporation, trade name: CELLOXIDE 2021P was used.
(iii) Oxetane Compound (V C-3)
Di[(3-ethyl-3-oxetanyl)methyl]ether, manufactured by Toagosei Co., Ltd., trade name: ARONE OXETANE OXT-221, was used.
(iv) Photo-Cationic Polymerization Initiator (V D-1)
A 50% propylene carbonate solution of diphenyl-4-(phenylthio)phenylsulfonium hexafluorophosphate, manufactured by San-Apro Ltd., trade name: CPI-100P, was used.

(2) Evaluation of Curable Compositions

<Heat Resistance (Weight Reduction Temperature)>
Each of the curable compositions obtained in the above described Example V 6-1 and Comparative Example V 6-1 was coated on a glass substrate to a coating thickness of 50 µm. Each coated substrate was irradiated with UV light at room temperature (23° C.) such that the accumulated amount of light was 3,000 mJ/cm². The curable composition was cured. Next, the cured product was scraped off from each glass substrate, and the measurement of the weight reduction temperature was carried out using a simultaneous thermogravimetric analyzer (manufactured by Hitachi High-Tech Science Corporation, trade name: TG/DTA 7200). About 10 mg of the cured product was heated from room temperature to 550° C. at a constant temperature increase rate of 10° C./min in dry air, and the 1% weight reduction temperature, 3% weight reduction temperature, 5% weight reduction temperature and 10% weight reduction temperature of each cured product were measured. The measurement results are summarized in Table V-8.

TABLE 36

| Table V-8 | | Example V 6-1 | Comparative Example V 6-1 |
|---|---|---|---|
| Composition of curable composition (parts by mass) | Epoxy compound (A-2) | 25 | |
| | the other epoxy compound (V B-3) | | 25 |
| | Oxetane compound (V C-3) | 75 | 75 |
| | Photo-cationic polymerization initiator (V D-1) | 10 | 10 |
| 1% Weight reduction temperature (° C.) | | 145 | 109 |
| 3% Weight reduction temperature (° C.) | | 204 | 178 |
| 5% Weight reduction temperature (° C.) | | 248 | 234 |
| 10% Weight reduction temperature (° C.) | | 283 | 263 |

V-7. Examples V 7: Preparation of Curable Compositions Containing Epoxy Compound (A-1) or Epoxy Compound (A-2) and Evaluation Thereof (Part 7: Combination with Various Types. of Photo-Cationic Polymerization Initiators)

(1) Examples V 7-1 to V 7-3, and Comparative Examples V 7-1 and V 7-2

Curable compositions were obtained in the same manner as in Example V 1-1, except that the following components were used, at the compositions shown in Table V-9.
(i) Epoxy Compound (A-1)
The epoxy compound produced by the method described in Preparation Example 1 was used.
(ii) Epoxy Compound (A-2)
The epoxy compound produced by the method described in Preparation Example 2 was used.
(iii) The Other Epoxy Compound (V B-3)
3',4'-Epoxycyclohexylmethyl 3,4-epoxycyclohexane carboxylate, manufactured by Daicel Corporation, trade name: CELLOXIDE 2021P, was used.
(iv) Photo-Cationic Polymerization Initiator (V D-2)
Diphenyl-4-(phenylthio)phenylsulfonium hexafluoroantimonate, manufactured by San-Apro Ltd., CPI-101A, was used.

(v) Photo-Cationic Polymerization Initiator (V D-3)

Bis[4-(di(4-(2-hydroxyethoxy))phenylsulfonio)phenyl] sulfide bishexafluoroantimonate, manufactured by ADEKA CORPORATION, ADEKA ARKLS SP-170, was used.

(2) Evaluation of Curable Compositions

<Heat Resistance (Weight Reduction Temperature)>

Each of the curable compositions obtained in the above described Examples V 7-1 to V 7-3 and Comparative Examples V 7-1 and V 7-2 was coated on a glass substrate to a coating thickness of 50 μm. Each coated substrate was irradiated with UV light at room temperature (23° C.) such that the accumulated amount of light was 3,000 mJ/cm². The curable composition was cured. Next, the cured product was scraped off from each glass substrate, and the measurement of the weight reduction temperature was carried out using a simultaneous thermogravimetric analyzer (manufactured by Hitachi High-Tech Science Corporation, trade name: TG/DTA 7200). About 10 mg of the cured product was heated from room temperature to 550° C. at a constant temperature increase rate of 10° C./min in dry air, and the 1% weight reduction temperature, 3% weight reduction temperature, 5% weight reduction temperature and 10% weight reduction temperature of each cured product were measured. The measurement results are summarized in Table V-9.

TABLE 37

| Table V-9 | | Example V 7-1 | Example V 7-2 | Example V 7-3 | Comparative Example V 7-1 | Comparative Example V 7-2 |
|---|---|---|---|---|---|---|
| Composition of curable composition (parts by mass) | Epoxy compound (A-1) | 25 | | 25 | | |
| | Epoxy compound (A-2) | | 25 | | | |
| | the other epoxy compound (V B-3) | 75 | 75 | 75 | 100 | 100 |
| | Photo-cationic polymerization initiator (V D-2) | 10 | | | 10 | |
| | Photo-cationic polymerization initiator (V D-3) | | 10 | 10 | | 10 |
| 1% Weight reduction temperature (° C.) | | 119 | 109 | 110 | 117 | 107 |
| 3% Weight reduction temperature (° C.) | | 153 | 151 | 163 | 141 | 143 |
| 5% Weight reduction temperature (° C.) | | 188 | 188 | 207 | 162 | 167 |
| 10% Weight reduction temperature (° C.) | | 260 | 270 | 275 | 260 | 262 |

The invention claimed is:

1. A curable composition comprising:
an epoxy compound represented by the following Formula (1):

[Chem. 1]

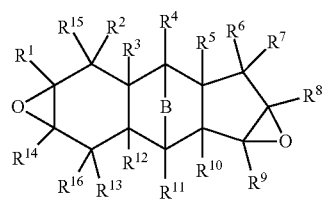

(1)

wherein
B represents $CR^{19}R^{20}$;
$R^1$ to $R^{20}$ each independently represents a substituent selected from the group consisting of a hydrogen atom, an alkyl group and an alkoxy group; and (ii) one selected from the group consisting of: a thermal cationic polymerization initiator, an acid anhydride-based curing agent and a curing accelerator, and a photo-cationic polymerization initiator.

2. The curable composition according to claim 1, further comprising one kind, or two or more kinds selected from the group consisting of (i) an epoxy compound other than the epoxy compound represented by the Formula (1), an oxetane compound and a vinyl ether.

3. The curable composition according to claim 1, wherein the thermal cationic polymerization initiator is selected from the group consisting of aromatic sulfonium salt-based thermal cationic polymerization initiators, and aluminum complex-based thermal cationic polymerization initiators.

4. The curable composition according to claim 3, wherein the thermal cationic polymerization initiator is an aromatic sulfonium salt-based thermal cationic polymerization initiator.

5. The curable composition according to claim 2, wherein, in cases where the curable composition does not contain any of the epoxy compound other than the epoxy compound represented by the Formula (1), the oxetane compound or the vinyl ether, the content of the thermal cationic polymerization initiator is from 0.1 to 15 parts by mass with respect to 100 parts by mass of the epoxy compound represented by the Formula (1) contained in the curable composition; and in cases where the curable composition contains one kind, or two or more kinds selected from the group consisting of the epoxy compound other than the epoxy compound represented by the Formula (1), the oxetane compound and the vinyl ether, the content of the thermal cationic polymerization initiator is from 0.1 to 15 parts by mass with respect to 100 parts by mass of the total amount of the epoxy compound represented by the Formula (1), the epoxy compound other than the epoxy compound represented by the Formula (1), the oxetane compound and the vinyl ether.

6. The curable composition according to claim 2, wherein, in cases where the curable composition does not contain the epoxy compound other than the epoxy compound represented by the Formula (1), the content of the acid anhydride-based curing agent is from 0.6 to 1.2 equivalent with respect to one equivalent of the epoxy compound represented by the Formula (1) contained in the curable composition; and in cases where the curable composition contains the epoxy compound other than the epoxy compound represented by the Formula (1), the content of the acid anhydride-based curing agent is from 0.6 to 1.2 equivalent with respect to one equivalent of a mixture of epoxy compounds composed of the epoxy compound represented by the Formula (1) and the epoxy compound other than the epoxy compound represented by the Formula (1).

7. The curable composition according to claim 2, wherein, in cases where the curable composition does not contain the epoxy compound other than the epoxy compound represented by the Formula (1), the content of the curing accelerator is from 0.1 to 10 parts by mass with respect to 100 parts by mass of the epoxy compound represented by the Formula (1) contained in the curable composition; and in cases where the curable composition contains the epoxy compound other than the epoxy compound represented by the Formula (1), the content of the curing accelerator is from 0.1 to 10 parts by mass with respect to 100 parts by mass of the total amount of the epoxy compound represented by the Formula (1) and the epoxy compound other than the epoxy compound represented by the Formula (1).

8. The curable composition according to claim 1, wherein the curing accelerator is an imidazole-based curing accelerator.

9. The curable composition according to claim 3, wherein the content of the epoxy compound represented by the Formula (1) is from 10 to 99% by mass.

10. The curable composition according to claim 1, wherein the photo-cationic polymerization initiator is an aromatic sulfonium salt-based photo-cationic polymerization initiator.

11. The curable composition according to claim 2, wherein, in cases where the curable composition does not contain any of the epoxy compound other than the epoxy compound represented by the Formula (1), the oxetane compound or the vinyl ether, the content of the photo-cationic polymerization initiator is from 0.1 to 20 parts by mass with respect to 100 parts by mass of the epoxy compound represented by the Formula (1) contained in the curable composition; and in cases where the curable composition contains one kind, or two or more kinds selected from the group consisting of the epoxy compound other than the epoxy compound represented by the Formula (1), the oxetane compound and the vinyl ether, the content of the photo-cationic polymerization initiator is from 0.1 to 20 parts by mass with respect to 100 parts by mass of the total amount of the epoxy compound represented by the Formula (1), the epoxy compound other than the epoxy compound represented by the Formula (1), the oxetane compound and the vinyl ether.

12. The curable composition according to claim 10, wherein the content of the epoxy compound represented by the Formula (1) is from 1 to 50% by mass.

13. The curable composition according to claim 2, wherein the epoxy compound other than the epoxy compound represented by the Formula (1) is selected from the group consisting of glycidyl ether-type epoxides, glycidyl ester-type epoxides and alicyclic epoxides.

14. A method of producing a cured product, the method comprising the step of curing the curable composition according to claim 1.

15. A cured product from the curable composition according to claim 1.

16. The curable composition according to claim 1, wherein the epoxy compound is represented by the following Formula (4)

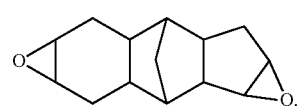

(4)

* * * * *